(12) United States Patent
Miura

(10) Patent No.: US 11,592,314 B2
(45) Date of Patent: Feb. 28, 2023

(54) INFORMATION PROCESSING DEVICE, PATH GUIDANCE DEVICE, INFORMATION PROCESSING METHOD, AND COMPUTER-READABLE STORAGE MEDIUM

(71) Applicant: HONDA MOTOR CO., LTD., Tokyo (JP)

(72) Inventor: Naoki Miura, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 172 days.

(21) Appl. No.: 17/213,224

(22) Filed: Mar. 26, 2021

(65) Prior Publication Data

US 2021/0302195 A1 Sep. 30, 2021

(30) Foreign Application Priority Data

Mar. 30, 2020 (JP) .............................. JP2020-060964

(51) Int. Cl.
*G01C 21/00* (2006.01)
*G01C 21/36* (2006.01)
*H04W 4/021* (2018.01)
*H04W 4/40* (2018.01)

(52) U.S. Cl.
CPC ....... *G01C 21/3848* (2020.08); *G01C 21/367* (2013.01); *G01C 21/387* (2020.08); *G01C 21/3815* (2020.08); *H04W 4/021* (2013.01); *H04W 4/40* (2018.02)

(58) Field of Classification Search
None
See application file for complete search history.

(56) References Cited

U.S. PATENT DOCUMENTS

2011/0282575 A1 * 11/2011 Masuda ................. G01C 21/32
701/533

FOREIGN PATENT DOCUMENTS

JP 2010197311 A * 9/2010
JP 4816175 B2 11/2011
JP 2016125952 A * 7/2016

OTHER PUBLICATIONS

Machine translation of JP-2016125952-A (Year: 2016).*
Machine translation of KR JP-2010197311-A (Year: 2010).*

* cited by examiner

*Primary Examiner* — Anne Marie Antonucci
*Assistant Examiner* — Kyle S Park

(57) ABSTRACT

An information processing device includes: a first storage unit configured to store a local map data set created or updated at a first time; a map information acquisition unit configured to acquire at least a part of a distribution map data set from a map data distribution system via a wireless communication network; a second storage unit configured to associate and store (i) data that is acquired by the map information acquisition unit, from among data constituting a first distribution map data set created or updated at a second time, and (ii) information indicating a first acquisition time when the data is acquired, or information indicating the second time; and a second determination unit configured to determine whether the map data distribution system has stored a second distribution map data set created or updated at a third time.

20 Claims, 26 Drawing Sheets

| 2200 | | | | |
|---|---|---|---|---|
| DISTRIBUTION TIME 2220 | GENERATION INFORMATION 2230 | PARCEL LEVEL 2240 | PARCEL ID 2250 | |
| 2020/01/03 | 2019_12 UPDATE VERSION | 0~5 | aaa, bbb | 2262 |
| 2020/01/03 | 2019_12 UPDATE VERSION | −1 | aaa, bbb | 2262 |
| 2020/01/09 | 2019_12 UPDATE VERSION | 0~5 | ddd, fff,···,*** | 2262 |
| 2020/02/08 | 2020_02 UPDATE VERSION | 0~5 | *, *,···,*** | 2264 |
| 2020/02/10 | 2020_02 UPDATE VERSION | −1 | *, *,···,*** | 2264 |

FIG. 22

| SITUATION OF NAVIGATION DEVICE | | LOCATION OF PARCEL | | | |
|---|---|---|---|---|---|
| | | AROUND HOST VEHICLE LOCATION | AROUND SET ROUTE | AROUND PAST TRAVEL ROUTE | AROUND DESIGNATED PLACE |
| DESTINATION IS SET (DURING ROUTE GUIDANCE) | | PARCEL LEVELS 0 TO 5 | PARCEL LEVELS 0 TO 5 | — | PARCEL LEVELS 0 TO 5 |
| DESTINATION IS NOT SET (DURING FREE TRAVEL) | HOST VEHICLE LOCATION IS ON PAST TRAVEL ROUTE | PARCEL LEVELS 0 TO 5 | — | — | PARCEL LEVELS 0 TO 5 |
| | DEVIATION BETWEEN HOST VEHICLE LOCATION AND PAST TRAVEL ROUTE IS MODERATE | PARCEL LEVELS 0 TO 5 | — | PARCEL LEVEL 0 | PARCEL LEVELS 0 TO 5 |
| | DEVIATION BETWEEN HOST VEHICLE LOCATION AND PAST TRAVEL ROUTE IS LARGE | PARCEL LEVELS 0 TO 5 | — | PARCEL LEVEL 0 | PARCEL LEVELS 0 TO 5 |
| | | | | — | PARCEL LEVELS 0 TO 5 |

FIG. 25

INFORMATION PROCESSING DEVICE, PATH GUIDANCE DEVICE, INFORMATION PROCESSING METHOD, AND COMPUTER-READABLE STORAGE MEDIUM

The contents of the following Japanese application are incorporated herein by reference:
NO. 2020-060964 filed in JP on Mar. 30, 2020.

BACKGROUND

1. Technical Field

The present invention relates to an information processing device, a path guidance device, an information processing method, and a computer-readable storage medium.

2. Related Art

Patent document 1 discloses a vehicle support system including: location detection means for detecting a current location of a vehicle; map information storage means for storing map information which includes a plurality of pre-determined areas divided in a mesh shape; and vehicle support means for supporting the vehicle, based on the current location of the vehicle detected by the location detection means and the map information stored by the map information storage means.

CITATION LIST

Patent Document

[Patent Document 1] Japanese Patent No. 4816175

BRIEF DESCRIPTION OF THE DRAWINGS

FIG. 22 schematically shows an example of a data structure of distribution history data 2200.
FIG. 25 schematically shows an example of a parcel that is a distribution target.

DESCRIPTION OF EXEMPLARY EMBODIMENTS

Figure 1:
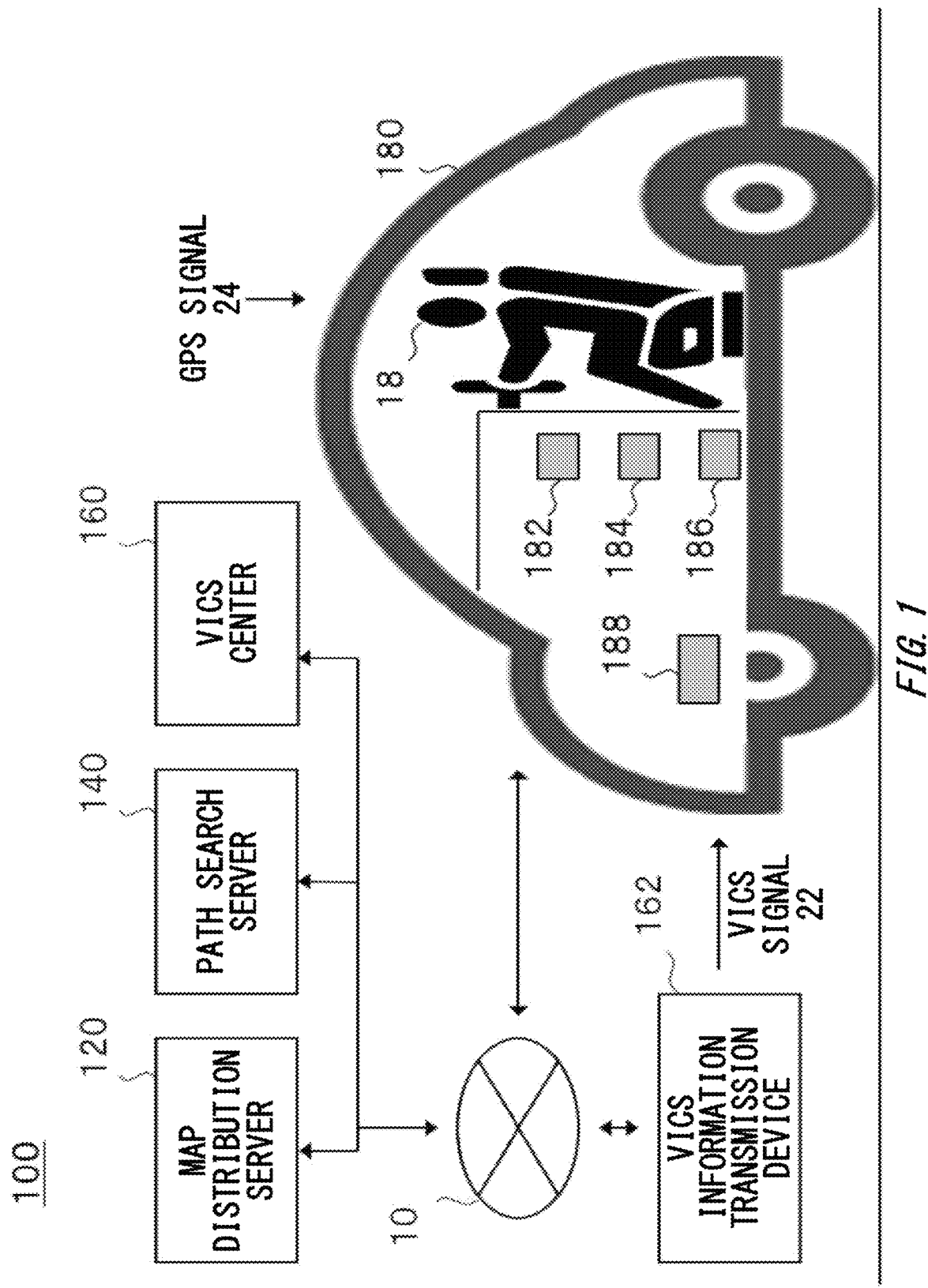
FIG. 1 schematically shows an example of a system configuration of a navigation system 100.

Hereinafter, the invention will be described through embodiments of the invention, but the following embodiments do not limit the invention according to claims. Further, not all of the combinations of features described in the embodiments are essential for means to solve the problem in the invention. Note that in the drawings, the same or similar parts may be given the same reference number to omit duplicate descriptions.

[Outline of Navigation System 100]

FIG. 1 schematically shows an example of a system configuration of a navigation system 100. In the present embodiment, the navigation system 100 includes a map distribution server 120, a path search server 140, a VICS (registered trademark) Center 160, a VICS information transmission device 162, and a vehicle 180. In the present embodiment, the vehicle 180 includes a navigation device 182, a communication device 184, a receiving device 186, and an in-vehicle sensor 188.

Units of the navigation system 100 may transmit and receive information to and from each other via a communication network 10. In the present embodiment, the communication network 10 may be a transmission channel of a wired communication, may be a transmission channel of a wireless communication, or may be a combination of the transmission channel of the wireless communication and the transmission channel of the wired communication. The communication network 10 may include a wireless packet communication network, the Internet, a P2P network, a dedicated line, a VPN, a power line communication line, a vehicle-to-vehicle communication line, inter-road communication line, or the like.

The communication network 10 may include (i) a mobile communication network such as a mobile phone line network, or may include (ii) a wireless communication network such as a wireless MAN (for example, a WiMAX (registered trademark)), a wireless LAN (for example, a WiFi (registered trademark), Bluetooth (registered trademark), a Zigbee (registered trademark), and an NFC (Near Field Communication). The wireless LAN, Bluetooth (registered trademark), Zigbee (registered trademark), and NFC may be examples of short-range wireless communication.

In the present embodiment, the map distribution server 120 provides a distribution service of distributing map data to a user of the navigation system 100. For example, the map distribution server 120 stores the map data of various regions. The above-mentioned map data is, for example, regularly updated. This makes it possible to provide the map data with a high precision and freshness.

For example, the map distribution server 120 transmits, to the navigation device 182 in response to a request from the navigation device 182 mounted on the vehicle 180, map data of a region indicated by the request. The navigation device 182 in the related art has a limited opportunity to be able to update a map installed at a time of product shipment (sometimes referred to as a pre-installed map), and there has been a desire to shorten an update interval of the pre-installed map. In contrast, with the present embodiment, necessary map data is distributed at a timing of request by the navigation device 182. This makes it possible for the navigation device 182 to use a highly fresh map distributed from the map distribution server 120 (sometimes referred to as a distribution map) so as to present an occupant 18 with the map or guide the occupant 18 through a path.

In the present embodiment, the path search server 140 provides a guidance service to guide the user of the navigation system 100 through a path to a destination. For example, the path search server 140 transmits, to the navigation device 182 in response to the request from the navigation device 182 mounted on the vehicle 180, path data showing the path to the destination indicated by the request.

The above-mentioned path data may be point sequence data that represents the path to the destination by a collection of location information on a plurality of points on the path. The path data may include at least one of (a) the point sequence data, (b) (i) road traffic information on at least some points or zones on the path, (ii) traffic law and regulation information indicating traffic laws and regulations applied to at least some points or zones on the path, (iii) attribute information indicating attributes of roads arranged at least some points or zones on the path, and (iv) identification information of navigation guidance data for presenting the occupant 18 with detailed guidance information on at least some points on the path.

An example of a content of the road traffic information includes a traffic jam, a traffic restriction, a required time, availability of a parking lot, or the like. An example of the traffic restriction includes a restriction caused by an accident, a construction, a disaster, a weather condition, or the like. An example of the guidance information includes a guidance image illustrating details of an intersection, a guidance image illustrating details of an entry path from an ordinary road to a highway, or the like. An example of the road attribute includes a type of a road, laws and regulations applied to a road, a width of a road, a structure of a road, or the like.

In the present embodiment, the VICS Center 160 provides the user of the navigation system 100 with the road traffic information on roads of various regions. The above-mentioned road traffic information may be VICS (vehicle information and communication system) (registered trademark) information. With the present embodiment, the VICS information is provided to the user of the navigation system 100 via the VICS information transmission device 162. An example of the VICS information transmission device 162 includes a broadcasting device, an optical beacon transmission device, a radio wave beacon transmission device, or the like.

In the present embodiment, the vehicle 180 carries the occupant 18. The vehicle 180 may be moved by a drive of the occupant 18, or may be moved by an autonomous driving system or a drive support system mounted on the vehicle 180. The occupant 18 may be a driver who drives the vehicle 180, or may be a manipulator who manipulates the navigation device 182. The manipulator may be a driver, or may be an occupant other than the driver.

An example of the vehicle 180 includes a bicycle, an automobile, a motorized bicycle, a streetcar, or the like. An example of the motorized bicycle includes (i) a bike, (ii) a three-wheeled bike, and (iii) a standing-ride two-wheeled or three-wheeled vehicle having a power unit such as Segway (registered trademark), Kickboard (registered trademark) with a power unit, a skateboard with a power unit.

In the present embodiment, the navigation device 182 provides the vehicle 180 or the occupant 18 with map information. The navigation device 182 provides the vehicle 180 or the occupant 18 with various types of information on the path to the destination. Details of the navigation device 182 will be described below.

In the present embodiment, the communication device 184 transmits and receives information between the navigation device 182 and the map distribution server 120 via the communication network 10. The communication device 184 may transmit and receive information between the navigation device 182 and the path search server 140 via the communication network 10.

In the present embodiment, the receiving device 186 receives various signals. For example, the receiving device 186 receives a VICS signal 22 which is output by the VICS information transmission device 162. The receiving device 186 may receive a GPS signal 24. The signal received by the receiving device 186 is, for example, output to the navigation device 182.

In the present embodiment, the in-vehicle sensor 188 is mounted on the vehicle 180 and acquires various types of data on the vehicle 180. The in-vehicle sensor 188 may output the acquired data to the navigation device 182. For example, the in-vehicle sensor 188 includes one or more external sensors for recognizing an external environment of the vehicle 180. The in-vehicle sensor 188 may include one or more internal sensors that measure a physical quantity relating to the vehicle 180. An example of the external sensor includes a camera, a distance measurement sensor, or the like. An example of the internal sensor includes a rotary encoder, a speed sensor, an accelerometer sensor, an angular velocity sensor, an angular acceleration sensor, or the like.

The communication network 10 may be an example of a wireless communication network. The map distribution server 120 may be an example of a map data distribution system. The vehicle 180 may be an example of a moving object. The vehicle 180 may be an example of an information processing device or a path guidance device. The navigation device 182 may be an example of an information processing device or a path guidance device. The receiving device 186 may be an example of a location information acquisition unit. The in-vehicle sensor 188 may be an example of a location information acquisition unit. The road traffic information may be an example of additional information superimposed and displayed on a map.

[Specific Configuration of Each Unit of Vehicle 180]

Each unit of the vehicle 180 may be realized by hardware, may be realized by software, or may be realized by hardware and software. Each unit of the vehicle 180 may be, at least partially, realized by a control unit such as an ECU (Electronic Control Unit). Each unit of the vehicle 180 may be, at least partially, realized by a personal computer or a mobile terminal. For example, the personal computer or the mobile terminal can be used as a user interface of the navigation device 182. An example of the mobile terminal includes a mobile phone, a smartphone, a PDA, a tablet, a notebook computer or a laptop computer, a wearable computer, or the like.

When at least some components that constitute the vehicle 180 are realized by software, the components realized by the software may be realized by starting a program which specifies operations related to components in an information processing device of common configuration. The above-mentioned information processing device includes, for example, (i) a data processing device having various processors (as a processor, a CPU, a GPU, or the like is exemplified), a ROM, a RAM, a communication interface, or the like, and (ii) a storage device such as a memory and an HDD (including an external storage device). The above-mentioned information processing device may include (iii) an input device such as a keyboard, a touch panel, a camera, a microphone, various sensors, and a GPS receiver, or may include (iv) an output device such as a display device, a speaker, and a vibration device.

In the above-mentioned information processing device, a program may be stored in the above-mentioned data processing device or storage device. For example, information processing written in the above-mentioned program functions, by the program being read by a computer, as specific means by which software relating to the program, and various hardware resources of the vehicle 180 cooperate with each other. Then, the above-mentioned specific means realizes calculation or processing of information according to a purpose of use of a computer in the present embodiment such that the vehicle 180 or each unit of the vehicle 180 is configured according to the purpose of use.

The above-mentioned program may be stored on a computer-readable medium. The above-mentioned program may be stored on a non-transitory computer-readable recording medium. The above-mentioned program may be stored in a computer-readable medium such as a CD-ROM, a DVD-ROM, a memory, or a hard disk, or may be stored in a storage device connected to a network. The above-mentioned program may be installed into a computer that constitutes at least a part of the vehicle 180 from a computer-readable medium or a storage device connected to a network.

By the above-mentioned program being executed, the computer mounted on the vehicle 180 may function as at least a part of each unit of the vehicle 180. By the above-mentioned program being executed, the computer mounted on the vehicle 180 may execute an information processing method on at least a part of each unit of the vehicle 180.

A program for causing the computer mounted on the vehicle 180 to function as at least a part of each unit of the vehicle 180 includes, for example, a module specifying an operation of at least a part of each unit of the vehicle 180. When the above-mentioned program or module is executed, the above-mentioned program or module works on the data processing device, the input device, the output device, the storage device, or the like to cause the computer to function as each unit of the vehicle 180, or cause the computer to execute the information processing method on each unit of the vehicle 180.

In one embodiment, for example, the above-mentioned information processing method includes acquiring at least a part of a distribution map data set from a map data distribution system via a wireless communication network, the map data distribution system being configured to associate and store (i) the distribution map data set created or updated at a time which is later than a first time when a local map data set is created or updated to be stored in a first storage device, and (ii) information indicating a creation time or an update time of the distribution map data set. For example, the above-mentioned information processing method includes secondly associating and storing (i) data that is acquired from the map data distribution system at the acquiring, from among data constituting a first distribution map data set created or updated at a second time which is later than the first time, and (ii) information indicating a first acquisition time when the data is acquired or information indicating the second time.

For example, the above-mentioned information processing method includes secondly determining whether the map data distribution system has stored a second distribution map data set created or updated at a third time which is later than the first acquisition time and the second time.

In the above-mentioned information processing method, for example, (a) the acquiring includes acquiring, from among data constituting the second distribution map data set stored in the map data distribution system, data corresponding to the data of the first distribution map data set acquired at the acquiring during a specific period in the past, (A) when it is determined that the map data distribution system has stored the second distribution map data set. In the above-mentioned information processing method, for example, (b) the secondly storing includes (i) associating and storing the data that is acquired at the acquiring and that constitutes the second distribution map data set, and information indicating a second acquisition time when the data is acquired or information indicating the third time. In the above-mentioned information processing method, for example, (b) the secondly storing includes (ii) deleting, from among the data constituting the second distribution map data set, the data constituting the first distribution map data set stored at the secondly storing at least after acquisition processing of data that satisfies a predetermined acquisition condition is completed.

In another embodiment, for example, the above-mentioned information processing method includes acquiring at least a part of at least one distribution map data set of a plurality of distribution map data sets from a map data distribution system via a wireless communication network, the map data distribution system being configured to associate and store (i) the plurality of distribution map data sets created or updated at a time which is later than a first time when a local map data set is created or updated to be stored in a first storage device, and (ii) information indicating a creation time or an update time of each of the plurality of distribution map data sets. For example, the above-mentioned information processing method includes secondly associating and storing, in a storage device, (i) data that is acquired from the map data distribution system at the acquiring, from among data constituting a first distribution map data set created or updated at a second time which is later than the first time, and (ii) information indicating a first acquisition time when the data is acquired, or information indicating the second time. For example, the above-mentioned information processing method includes firstly determining whether the map data distribution system has stored the first distribution map data set. For example, the above-mentioned information processing method includes secondly determining whether the map data distribution system has stored the second distribution map data set created or updated at a third time which is later than the first acquisition time and the second time.

In the above-mentioned information processing method, for example, (a) the acquiring includes acquiring, from among data constituting the second distribution map data set stored in the map data distribution system, data corresponding to the data of the first distribution map data set acquired at the acquiring during a specific period in the past, (A) when it is determined that the map data distribution system has stored the first distribution map data set and the second distribution map data set. Further, (b) the secondly storing includes (i) associating and storing the data that is acquired at the acquiring and that constitutes the second distribution map data set, and information indicating a second acquisition time when the data is acquired or information indicating the third time, and (ii) deleting, from among the data constituting the second distribution map data set, the data of the first distribution map data set stored in the storage device at least after acquisition processing of data that satisfies a predetermined acquisition condition is completed.

In still another embodiment, the above-mentioned information processing method may be a path guidance method. For example, the above-mentioned path guidance method includes acquiring at least a part of a distribution map data set from a map data distribution system via a wireless communication network, the distribution map data set being configured to associate and store (i) the distribution map data set created or updated at a time which is later than a first time when a local map data set is created or updated to be stored in a first storage device, and (ii) information indicating a creation time or an update time of the distribution map data set. For example, the above-mentioned path guidance method includes secondly storing, in a second storage device, data that is acquired from the map data distribution system at the acquiring, from among data constituting a first distribution map data set created or updated at a second time which is later than the first time. For example, the above-mentioned path guidance method includes display controlling of causing a display device to display a screen based on the data stored in the first storage device or the second storage device. For example, the above-mentioned path guidance method includes guiding a user through a path based on the data stored in the first storage device or the second storage device.

In the above-mentioned path guidance method, the display controlling includes, for example, (a) causing the display device to display a screen based on data of the local map data set stored in the first storage device, until a predetermined switching condition is established after the data acquisition processing from the map data distribution system at the acquiring is completed. In the above-mentioned path guidance method, the display controlling includes, for example, (b) causing the display device to display a screen based on the data of the first distribution map data set stored in the second storage device, after the data acquisition processing from the map data distribution system at the acquiring is completed and a predetermined switching condition is established.

In the present embodiment, an example of the navigation device 182 has been described by using, as an example, the case where the navigation device 182 is mounted on the vehicle 180. However, the navigation device 182 is not limited to the present embodiment. In another embodiment, the navigation device 182 may be mounted on a moving object.

An example of the moving object includes a marine vessel, a flying object, or the like, in addition to the vehicle. An example of the marine vessel includes a ship, a hovercraft, a water scooter, a submarine, a submersible vessel, an underwater scooter, or the like. An example of the flying object includes an airplane, an airship or a balloon, a hot air balloon, a helicopter, a drone, or the like.

Figure 2:
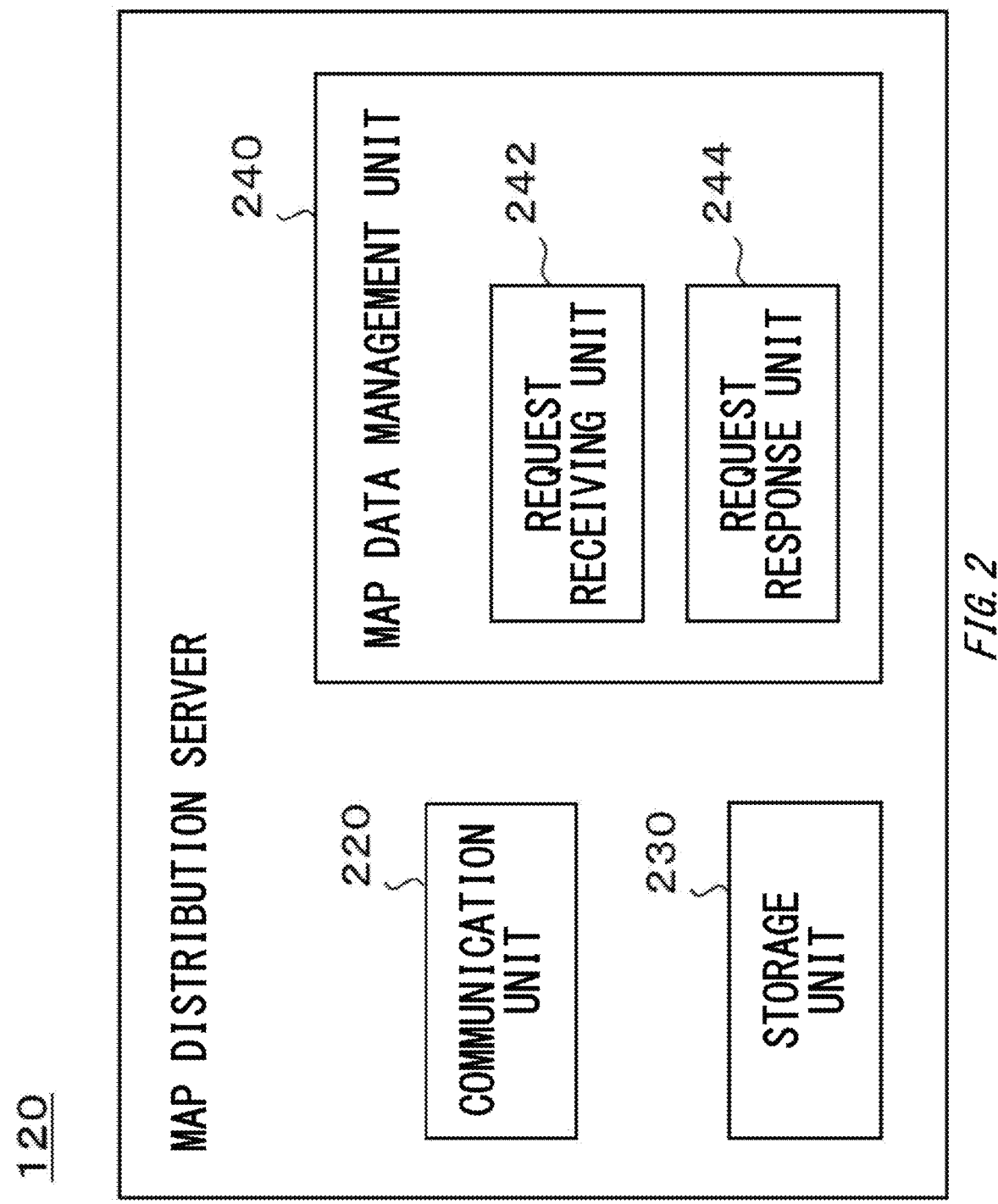
FIG. 2 schematically shows an example of a system configuration of a map distribution server 120.

FIG. 2 schematically shows an example of a system configuration of a map distribution server 120. In the present embodiment, the map distribution server 120 includes a communication unit 220, a storage unit 230, and a map data management unit 240. In the present embodiment, the map data management unit 240 has a request receiving unit 242 and a request response unit 244.

In the present embodiment, the communication unit 220 transmits and receives information between the map distribution server 120 and the vehicle 180 via the communication network 10. The communication unit 220 may transmit and receive information between the map distribution server 120 and the path search server 140 via the communication network 10.

In the present embodiment, the storage unit 230 stores various types of map information. Details of the storage unit 230 and details of the map information will be described below.

In the present embodiment, the map data management unit 240 manages the map information stored in the storage unit 230. For example, the map data management unit 240 performs a new creation, update, distribution enablement, distribution stop, deletion, or the like of the map information. The map data management unit 240 may manage a generation of the map information. The map data management unit 240 may manage a distribution of the map information.

As will be described below, the storage unit 230 may store a plurality of types of map information having different creation times or update times. The creation time or the update time may be referred to as a generation or a version. In this case, the map data management unit 240 manages the map information for each generation. For example, in a case where the map distribution server 120 distributes the map information for two generations, when the map information of a new generation is added with the update of the map, the map data management unit 240 sets the map information of the latest generation and the map information of an immediately previous generation to be in a state in which the distribution is possible, while stopping the distribution of the map information of a generation that is two generations prior to the latest generation.

Note that a minimum unit for managing the creation time and the update time is not particularly limited. An example of the above-mentioned minimum unit includes a second, a minute, an hour, a day, a week, a month, or the like.

Further, as will be described below, when the map information is updated, the map distribution server 120 does not transmit data of all regions included in coverage of the map at once, but transmits data of a region which is determined according to a situation of the navigation device 182 each time when the region is determined. For example, the map distribution server 120 transmits, to the navigation device 182, the data of the region which is determined according to a location of the navigation device 182, and does not transmit data of a region other than the region. When the vehicle 180 moves and the location of the navigation device 182 changes, the map distribution server 120 transmits, to the navigation device 182, the data of the region which is determined according to the new location. In this way, the map data management unit 240 manages the transmission (sometimes referred to as a distribution) of the data to the navigation device 182.

Note that in the present embodiment, details of the map distribution server 120 is described by using, as an example, the case where the map distribution server 120 transmits the data according to the situation of the navigation device 182. However, the map distribution server 120 is not limited to the present embodiment. In another embodiment, the map distribution server 120 transmits, for example, data according to contents of a contract between a service provider of a map distribution service provided by the map distribution server 120, and a user of the service. For example, at least one of a type, a range, precision or accuracy, and freshness of the map which is provided to the user may be adjusted according to the contents of the contract. An example of the above-mentioned type of the map includes a map represented by vector data, a map represented by raster data, or the like.

In the present embodiment, the request receiving unit 242 receives the request from the navigation device 182. In the present embodiment, the request response unit 244 responds to the request from the navigation device 182.

In one embodiment, the request receiving unit 242 receives, from the navigation device 182, a generation transmission request for requesting a transmission of information on a generation of the map which can be distributed by the map distribution server 120. When the request receiving unit 242 receives the generation transmission request, the request response unit 244 transmits the information on the generation of the map which can be distributed by the map distribution server 120 to the navigation device 182 that has transmitted the generation transmission request.

In another embodiment, the request receiving unit 242 receives, from the navigation device 182, a map transmission request for requesting a transmission of a map of a specific region. When the request receiving unit 242 receives the map transmission request, the request response unit 244 transmits map information of a region indicated by the map transmission request, to the navigation device 182 that has transmitted the map transmission request. Note that as will be described below, the map information includes various types of information. The map transmission request may request a transmission of a specific type of information among a plurality of types of information included in the map information.

Figure 3:
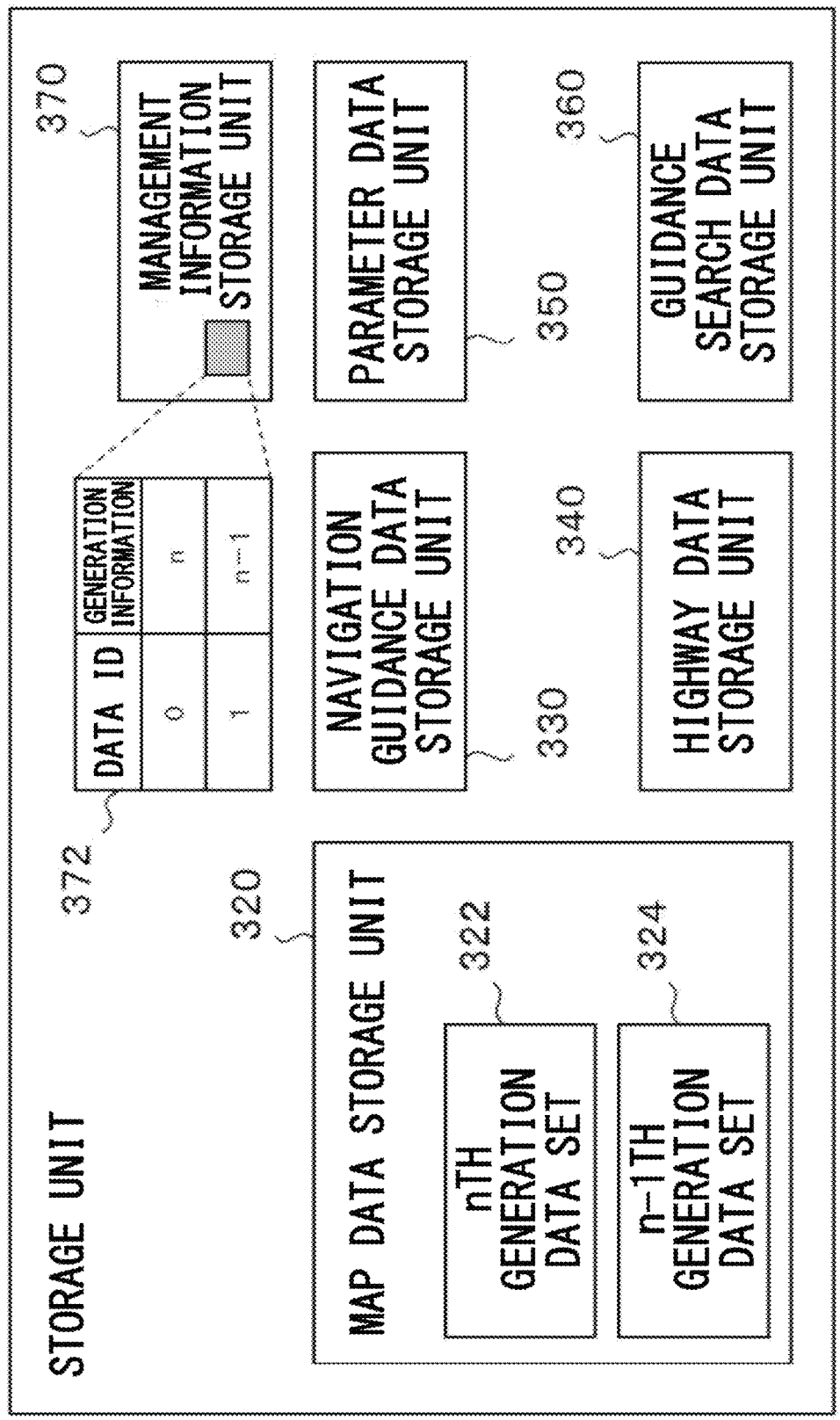
FIG. 3 schematically shows an example of an internal configuration of a storage unit 230.

FIG. 3 schematically shows an example of an internal configuration of a storage unit 230. An example of the map information stored in the storage unit 230 will be described with reference to FIG. 3 by using, as an example, a case where map information of an nth generation and map information an n−1th generation are in a state in which the distributions are possible. Note that n is an integer of two or more.

In the present embodiment, the storage unit 230 stores the map data and various types of data relating to the map data (a term "data" may be simply used as a generic term for both). In the present embodiment, the coverage of the map is divided into a plurality of zones, in which a plurality of pieces of map data for representing a feature (including virtual one such as a district boundary line) that is arranged in each zone are prepared. The storage unit 230 stores a map data set which is a collection of a plurality of pieces of map data corresponding to each of the plurality of zones constituting the coverage of the map.

The various types of data relating to the map data include information on at least one of one or more features recorded in the map data. An example of the various types of data relating to the map data includes navigation guidance data, highway data, parameter data, guidance search data, or the like. The navigation guidance data is, as described above, used to present the occupant 18 with detailed guidance information on a specific point on the map. The navigation guidance data may be image data, or may be voice data.

The highway data is used to present the occupant 18 with information on the highway or limited highway included in the coverage of the map. The highway data includes a node ID for identifying a node allocated to each of a plurality of points on the highway, a link ID for identifying each of links connecting two adjacent nodes, and information indicating a name of at least some node. For example, the highway data includes information indicating the names of the nodes allocated to a service area, a parking area, an interchange, a junction, and the like which are arranged on the highway.

The parameter data stores various parameters used to plot the feature on the map. For example, the parameters for plotting the feature on the map as a bird's-eye view map or a three-dimensional map are stored.

The guidance search data is used to search for a specific point by an address, a facility name, or the like. The guidance search data may include index information for selecting a destination. The guidance search data may include a search frame for narrowing down the data, and point information for storing information of a search result. In the point information, for example, information on a point (sometimes referred to as POI) registered by the occupant 18 is stored. An example of the point information includes information indicating a location of the POI, information indicating the name of the POI, or the like.

In the present embodiment, the storage unit 230 includes a map data storage unit 320, a navigation guidance data storage unit 330, a highway data storage unit 340, a parameter data storage unit 350, a guidance search data storage unit 360, and a management information storage unit 370. In the present embodiment, the map data storage unit 320 stores an nth generation data set 322 and an n−1th generation data set 324. In the present embodiment, the management information storage unit 370 stores generation management information 372.

In the present embodiment, the map data storage unit 320 stores a plurality of map data sets (sometimes referred to as distribution data sets) having different creation times or update times from each other. In the present embodiment, the nth generation data set 322 may be a map data set which is created or updated at a time later than a creation time or an update time of the n−1th generation data set 324. The n−1th generation data set 324 may be a map data set which is created or updated at a time later than a creation time or an update time of a map data set (sometimes referred to as a pre-installed data set) installed at the time of product shipment of the navigation device 182.

In the present embodiment, the navigation guidance data storage unit 330 stores the navigation guidance data. The navigation guidance data storage unit 330 may associate and store one or more pieces of navigation guidance data, and data IDs for respectively identifying the one or more pieces of navigation guidance data. This enables, for example, the request response unit 244 to acquire the navigation guidance data by using, as a key, the data ID of the navigation guidance data.

In one embodiment, a file for storing a plurality of pieces of navigation guidance data, and a data ID of each piece of the navigation guidance data may be prepared for each generation of the map data sets. In this case, a single file for storing the plurality of pieces of navigation guidance data, and the data ID of each piece of the navigation guidance data corresponds to a map data set of a single generation.

In another embodiment, the single file for storing the plurality of pieces of navigation guidance data, and the data ID of each piece of the navigation guidance data may be prepared as a file for the navigation guidance data which corresponds to map data sets of multiple generations. Note that even in this case, a plurality of files for storing the plurality of pieces of navigation guidance data, and the data ID of each piece of the navigation guidance data may be prepared.

In the present embodiment, the highway data storage unit 340 stores the highway data. The highway data storage unit 340 may store a plurality of pieces of highway data corresponding to each of the plurality of map data sets stored in the map data storage unit 320.

In the present embodiment, the parameter data storage unit 350 stores the parameter data. The parameter data storage unit 350 may store a plurality of pieces of parameter data corresponding to each of the plurality of map data sets stored in the map data storage unit 320.

In the present embodiment, the guidance search data storage unit 360 stores the guidance search data. The guidance search data storage unit 360 may store a plurality of pieces of guidance search data corresponding to each of the plurality of map data sets stored in the map data storage unit 320.

In the present embodiment, the management information storage unit 370 stores various types of information used to manage various types of data stored in the storage unit 230. As described above, the management information storage unit 370 stores the generation management information 372 used to manage availability for distribution of the plurality of map data sets stored in the map data storage unit 320.

The generation management information 372 may be information in which a data ID for identifying each of one or more map data sets that can be distributed, and information indicating the generation of each map data set (sometimes referred to as generation information) are associated with each other. An example of the generation information includes information indicating a generation or version itself of the map data set, information indicating the creation time or the update time of the map data set, or the like.

With the present embodiment, the map data storage unit 320 stores the multiple generations of map data sets. This enables the map distribution server 120 to distribute data constituting a part of the multiple generations of map data sets.

The distribution data set may be an example of a second map data set or the distribution map data set. The pre-installed data set may be an example of a first map data set or the local map data set. The nth generation data set 322 may be an example of the second map data set or the distribution map data set. The n−1th generation data set 324 may be an example of the second map data set or the distribution map data set.

Note that the nth generation data set 322 may be an example of the first distribution map data set which is created or updated at a time later than the creation time or the update time of the pre-installed data set. The nth generation data set 322 may be an example of the second distribution map data set which is created or updated at a time later than the creation time or the update time of the n−1th generation data set 324. The n−1th generation data set 324 may be an example of the first distribution map data set which is created or updated at a time later than the creation time or the update time of the pre-installed data set. Each map data constituting the nth generation data set 322 may be an example of the second map data. Each map data constituting the n−1th generation data set 324 may be an example of the first map data.

The creation time or the update time of the pre-installed data set may be an example of the first time. The creation time or the update time of the n−1th generation data set 324 may be an example of the second time which is a time later than the first time. The creation time or the update time of the nth generation data set 322 may be an example of the third time which is a time later than the second time. The generation information may be an example of the information indicating the creation time or the update time.

Note that in the present embodiment, the storage unit 230 stores the map data set. Details of the distribution map have been illustrated by using, as an example, the case where the map data, the navigation guidance data, the highway data, the parameter data, and the guidance search data are each stored in different storage units. However, the distribution map is not limited to the present embodiment. In another embodiment, at least one of (i) the map data, and (ii) the navigation guidance data, the highway data, the parameter data, and the guidance search data may constitute a data set stored in a single data file.

Details of data structures of the nth generation data set 322 will be described by using FIG. 4, FIG. 5, FIG. 6, FIG. 7, FIG. 8, and FIG. 9. Note that another map data set such as the n−1th generation data set 324 may have a data structure similar to that of the nth generation data set 322.

Figure 4:
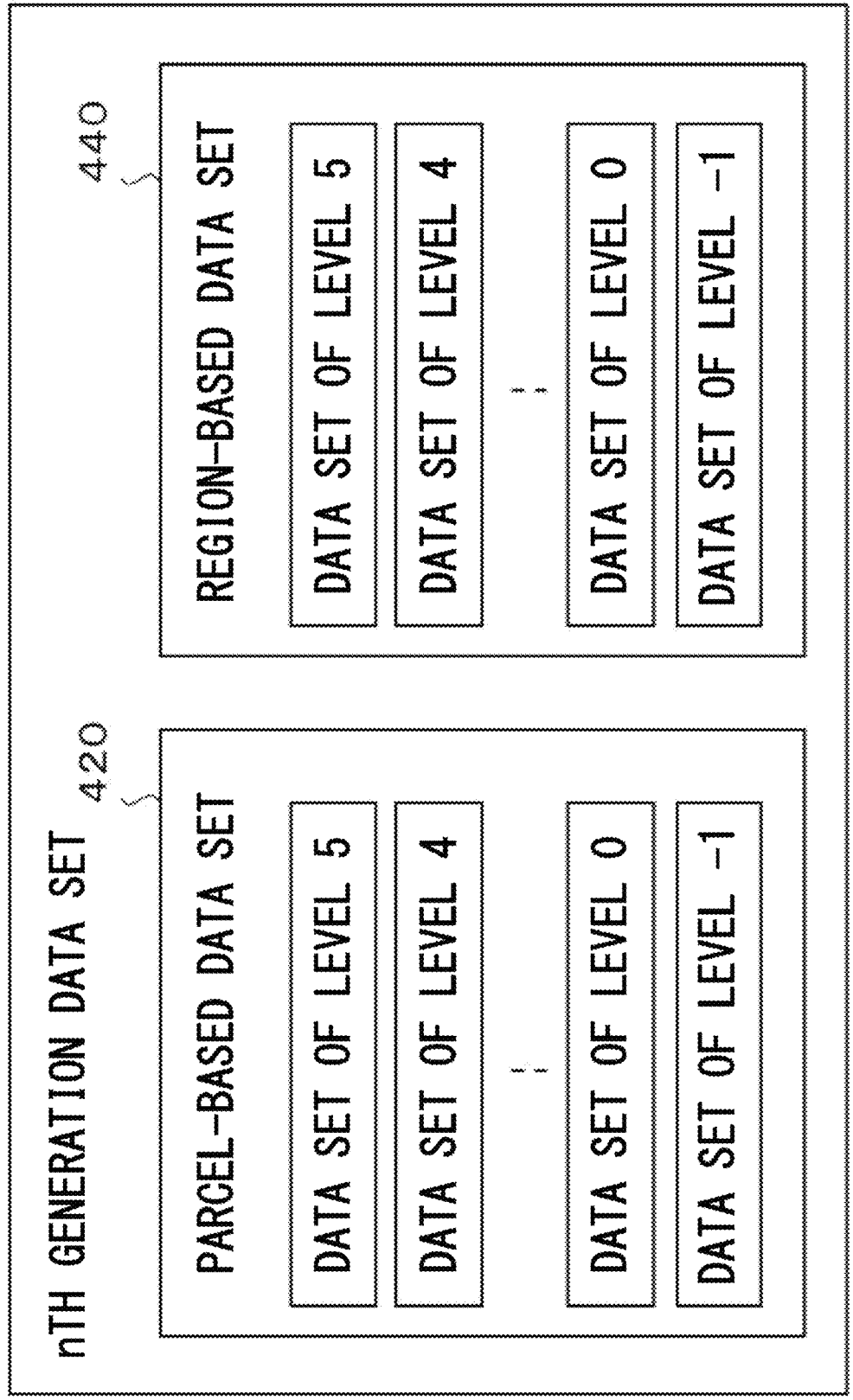
FIG. 4 schematically shows an example of a data structure of an nth generation data set 322.

FIG. 4 schematically shows an example of a data structure of an nth generation data set 322. In the present embodiment, the nth generation data set 322 includes a parcel-based data set 420 and a region-based data set 440.

The parcel-based data set 420 is used for plotting of a map, navigation through a path, or the like in the navigation device 182. The parcel-based data set 420 includes a plurality of data sets having different representation modes from each other. Each data set includes a plurality of pieces of map data. An example of the representation mode includes a size of scale, or the like.

In the present embodiment, the parcel-based data set 420 has a hierarchical structure. With the present embodiment, the map data constituting the parcel-based data set 420 is classified into seven levels of level 5, level 4, level 3, level 2, level 1, level 0, and level −1 (sometimes referred to as a parcel level).

In the present embodiment, a data set of level 5 has a small scale of each piece of the map data, and the number of pieces of the map data constituting the data set is small. As the level decreases, the scale of each piece of the map data increases, and the number of pieces of the map data constituting the data set also increases. Details of the hierarchical structure of the parcel-based data set 420 will be described below.

The region-based data set 440 is used to calculate the path in the navigation device 182. In the present embodiment, the region-based data set 440 has a hierarchical structure. With the present embodiment, path calculation data constituting the region-based data set 440 is classified into seven levels of level 5, level 4, level 3, level 2, level 1, level 0, and level −1 (sometimes referred to as a region level).

Figure 5:
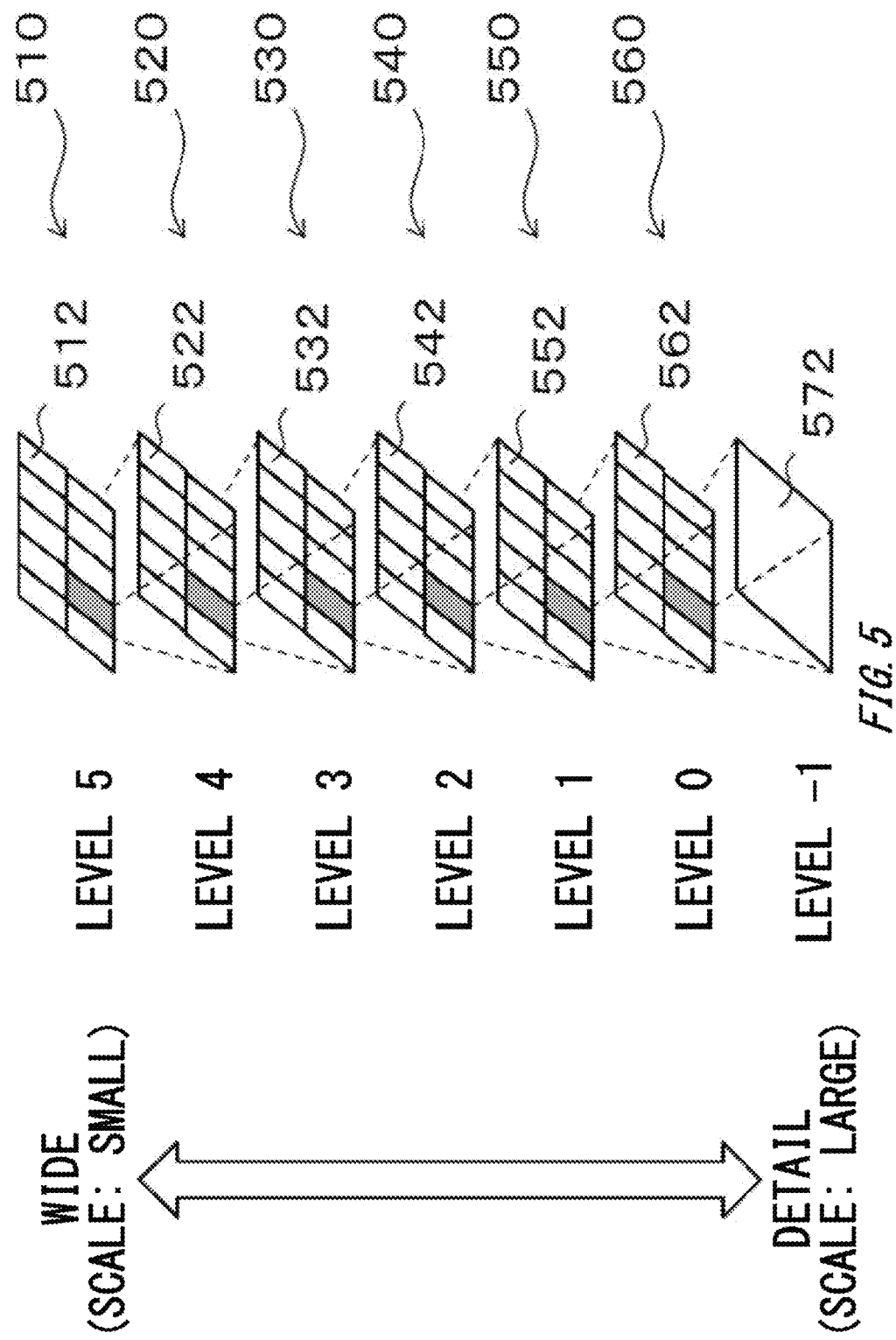
FIG. 5 schematically shows an example of a hierarchical structure of a parcel-based data set 420.

FIG. 5 schematically shows an example of a hierarchical structure of a parcel-based data set 420. With the present embodiment, the coverage of the map is, for example, divided into a plurality of zones (sometimes referred to as a basic parcel) having substantially the same shape and size based on latitude and longitude. The shape and the size of the basic parcel are different depending on the level.

For example, in the data set of level 5, a shape and a size of a basic parcel 512 are determined such that the entire coverage of the map is covered by a block 510 with a plurality of basic parcels 512. A plurality of pieces of map data constituting the data set of level 5 respectively correspond to the plurality of basic parcels 512. Each piece of the map data may be data for representing a map of a geographic range corresponding to the basic parcel 512.

As shown in FIG. 5, each of the basic parcels 512 of level 5 is covered by a block 520 with a plurality of basic parcels 522 in a data set of level 4. A plurality of pieces of map data constituting the data set of level 4 respectively correspond to the plurality of basic parcels 522.

Similarly, each of the basic parcels 522 of level 4 is covered by a block 530 with a plurality of basic parcels 532 in a data set of level 3. A plurality of pieces of map data constituting the data set of level 3 respectively correspond to the plurality of basic parcels 532.

Similarly, each of the basic parcels 532 of level 3 is covered by a block 540 with a plurality of basic parcels 542 in a data set of level 2. A plurality of pieces of map data constituting the data set of level 2 respectively correspond to the plurality of basic parcels 542.

Similarly, each of the basic parcels 542 of level 2 is covered by a block 550 with a plurality of basic parcels 552 in a data set of level 1. A plurality of pieces of map data constituting the data set of level 1 respectively correspond to the plurality of basic parcels 552.

Similarly, each of the basic parcels 552 of level 1 is covered by a block 560 with a plurality of basic parcels 562 in a data set of level 0. A plurality of pieces of map data constituting the data set of level 0 respectively correspond to the plurality of basic parcels 562.

In the present embodiment, a basic parcel 562 of level 0, and a basic parcel 572 of level −1 cover substantially the same geographic range. A plurality of pieces of map data constituting a data set of level −1 may respectively be enlarged maps or detailed maps of the plurality of pieces of map data constituting the data set of level 0.

As shown in FIG. 5, with the present embodiment, each of the plurality of pieces of map data constituting the parcel-based data set 420 belongs to one of the plurality of levels determined by the scale, and corresponds to one of one or more basic parcels determined for each level. Further, map data which belongs to two or more levels among the plurality of levels may be vector map data (sometimes referred to as vector data). On the other hand, map data which belongs to at least one level among the plurality of levels may be raster map data (sometimes referred to as raster data). For example, in the present embodiment, the map data from level 5 to level 0 is the vector map data, and the map data of level −1 is the raster map data.

For example, the map distribution server 120 distributes the map data from level 5 to level 0 unless an instruction is not given from the user. This greatly reduces a communication volume. Further, an amount of resources of the navigation device 182 used to update the map is greatly reduced. On the other hand, the map distribution server 120 distributes map data of level−1 in response to a request from the user. This makes it possible, each time when the map is updated, to reduce the communication volume without significantly compromising a user experience, and to effectively use the resources of the navigation device 182 in comparison with a case where all pieces of the map data included in the coverage of the map are distributed.

The parcel level may be an example of a hierarchy in the data having the hierarchical structure. The basic parcel may be an example of a zone having a predetermined geographic range.

Figure 6:
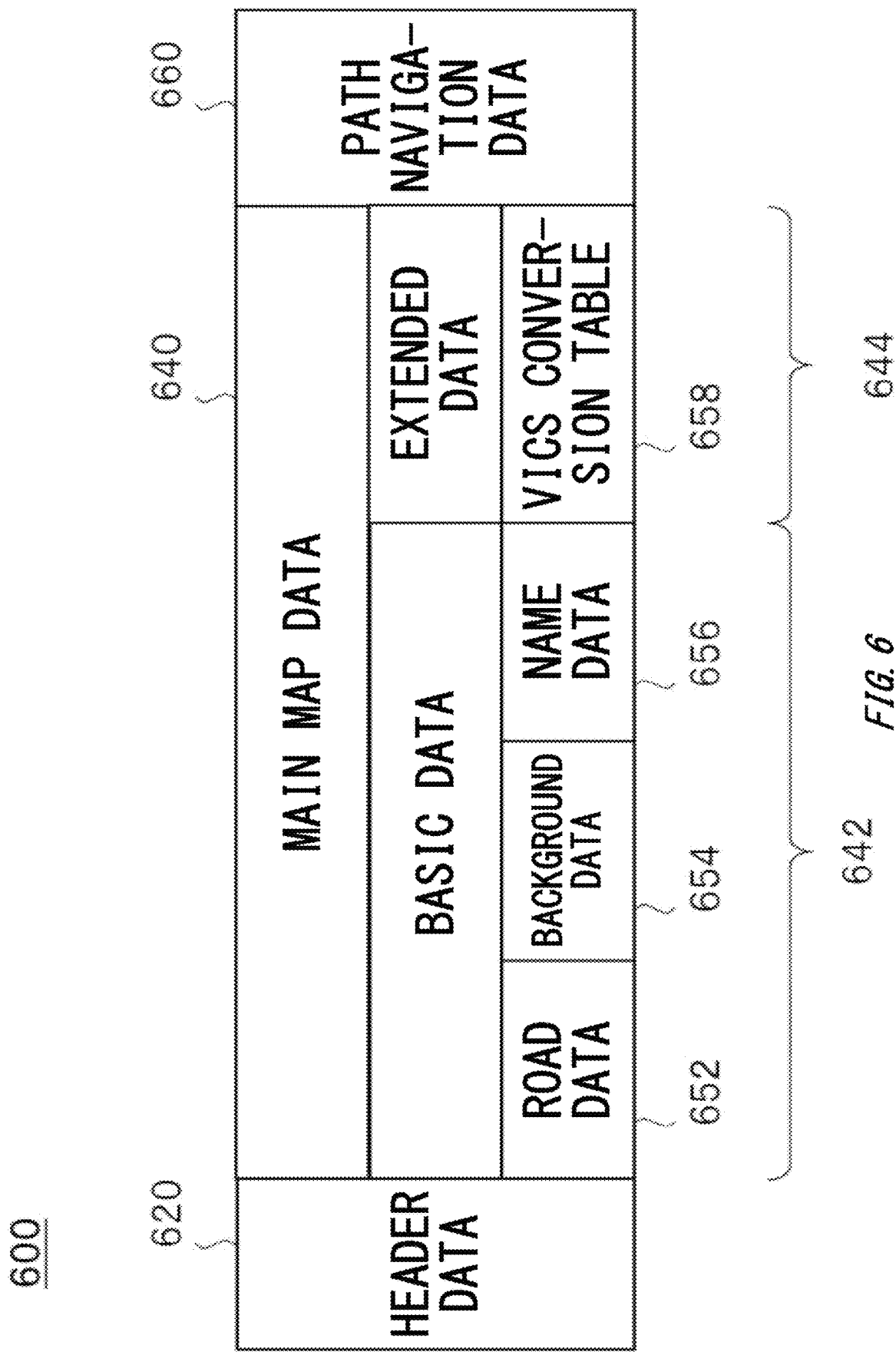
FIG. 6 schematically shows an example of a data configuration of vector map data 600.

FIG. 6 schematically shows an example of a data configuration of vector map data 600. As mentioned above, the map data included in the data sets from level 5 to level 0 may be the vector map data 600. In the present embodiment, the vector map data 600 may be an example of the map data corresponding to each basic parcel.

In the present embodiment, the vector map data 600 includes header data 620, main map data 640, and path navigation data 660. In the present embodiment, the main map data 640 has basic data 642 and extended data 644. In the present embodiment, the basic data 642 includes road data 652, background data 654, and name data 656. In the present embodiment, the extended data 644 includes a VICS conversion table 658.

The header data 620 includes information (sometimes referred to as a management record) for the navigation device 182 to handle the vector map data 600. An example of the management record includes a data size of various types of data constituting the vector map data 600, or the like.

The main map data 640 indicates a map of a geographic range allocated to the vector map data 600. The main map data 640 includes information for plotting the map of the geographic range allocated to the vector map data 600 or the basic parcel. The path navigation data 660 includes information in which information indicating a point at which the navigation guidance data is output, and a data ID of the navigation guidance data which is output at the point are associated with each other.

The basic data 642 includes basic data necessary for the navigation device 182 to plot a map. The extended data 644 includes various types of data used by the navigation device 182 for a function other than plotting the map (sometimes referred to as an extended function). An example of the extended function includes a function of superimposing and displaying the road traffic information on the map, or the like.

The road data 652 includes various types of data on a road included in each map. Details of the road data 652 will be described below. The background data 654 includes data that is a background of a map such as a river, a boundary of an administrative district, and a railway. The name data 656 includes data in which information indicating a name of a feature included in each map, and information indicating the location at which the name is displayed are associated with each other.

The VICS conversion table 658 shows a corresponding relationship between a VICS link ID used to identify each of a plurality of road links in the VICS Center 160, and a road link ID used to identify each of a plurality of road links (sometimes referred to as parcel links) in each map data set. Details of the VICS conversion table 658 will be described below.

Thereby, even when the road link ID allocated to at least some road link included in the coverage of the map changes with the update of the map data set stored in the map distribution server 120, it is possible for the navigation device 182 to associate the road link ID in the map data set, and the VICS link ID by using the VICS conversion table 658. As a result, for example, the navigation device 182 can reflect, on the map, the road traffic information transmitted by the VICS signal 22.

The vector map data 600 may be an example of the first distribution map data or the second distribution map data. The main map data 640 may be an example of the first map data or the second map data. The road data 652 may be an example of first drive support information or second drive support information. The VICS conversion table 658 may be an example of corresponding relationship information indicating the corresponding relationship between the road link ID and the VICS link ID. The VICS link ID may be an example of identification information used to identify each of the plurality of road links in a service for distributing additional information superimposed and displayed on the map. The road link ID may be an example of identification information used to identify each of the plurality of road links in the map data set.

Figure 7:
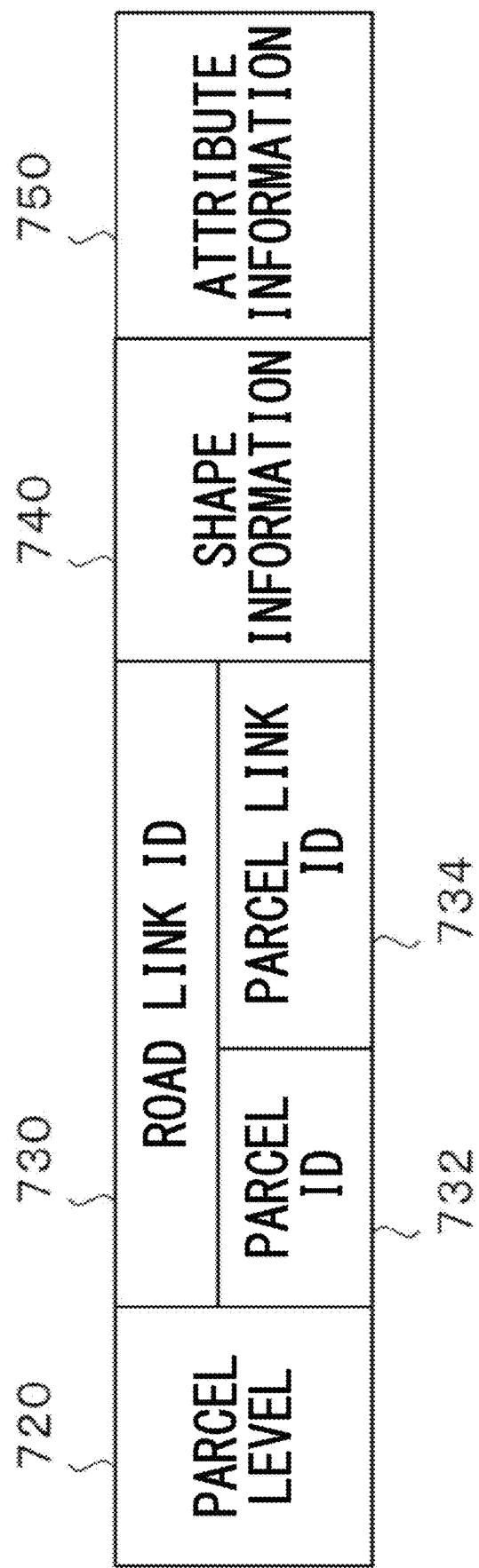
FIG. 7 schematically shows an example of a data structure of road data 652.

FIG. 7 schematically shows an example of a data structure of road data 652 included in the vector map data 600. The road data 652 includes various types of information on each of one or more roads included in each basic parcel. In the road data 652 in the present embodiment, a parcel level 720, a road link ID 730, shape information 740, and attribute information 750 are associated with each other and stored. In the present embodiment, the road link ID 730 is, for example, represented by a parcel ID 732 and a parcel link ID 734.

The parcel ID 732 is identification information for identifying each basic parcel. The parcel link ID 734 is identification information for identifying a road link representing each of a plurality of roads arranged in each basic parcel.

The shape information 740 is information for representing a shape of each road arranged in each basic parcel. An example of the shape information includes information indicating a start point node, an end point node, a link length, or the like of a road link corresponding to each road.

The attribute information 750 is information for representing an attribute of each road arranged in each basic parcel. An example of the attribute of the road includes at least one of a type of the road, a type of the link, a structure of the road, laws and regulations applied to the road, and statistics about a speed of the vehicle moving on the road.

An example of the type of the road includes an ordinary road, a highway, a ferry route, or the like. The type of the road may be subdivided into a national expressway, an urban highway, an ordinary national road, a main local road (a prefectural road), a main local road (a designated city road), an ordinary prefectural road, an ordinary city road in a designated city, an entry road, a narrow road, a road in relation to a destination, and a road in relation to a parking lot, or the like. The ordinary road may be subdivided into a trunk road, and a guidance road other than the trunk road.

An example of the type of the link includes a dummy link, a link of a main road in which inbound and outbound lanes are not separated, a link of a main road in which inbound and outbound lanes are separated, a link of a connecting road connecting the main roads, a link in an intersection, and ramp links, a link of a frontage road on the same road as the main road, a link of a service road such as a service area, or the like.

An example of the laws and regulations applied to the road includes one regarding a travel direction, an upper speed limit, whether activation of an autonomous driving system or a drive support system is permitted, or the like. An example of the structure of the road includes a width, the number of lanes, a separation method of the inbound and outbound lanes, slope, or the like.

The autonomous driving system or the drive support system of the vehicle 180 may control the vehicle 180 by using information indicating the type of the road, the number of the lanes of the road, the upper speed limit of the road, the structure of the road, or the like. For example, activation of an automated lane change function of the vehicle 180 may be permitted only on a road which is a limited highway, has two or more lanes, and in which the inbound and outbound lanes are structurally separated.

In this case, it is conceivable that the navigation device 182 analyzes an image captured by the camera mounted on the vehicle 180 to determine whether the above-described requirements are met. However, the more complex the requirements become, the more precisely and quickly the determination is desired regarding whether the above-described requirements are met. With the present embodiment, the navigation device 182 can precisely and quickly determine whether the above-described requirements are met since the map data distributed from the map distribution server 120 includes the attribute information 750.

The attribute information 750 may be an example of the first drive support information or the second drive support information. The attribute information 750 included in each piece of the map data constituting the nth generation data set 322 may be an example of the second drive support information. The attribute information 750 included in each piece of the map data constituting the n–1th generation data set 324 may be an example of the first drive support information.

Figure 8:
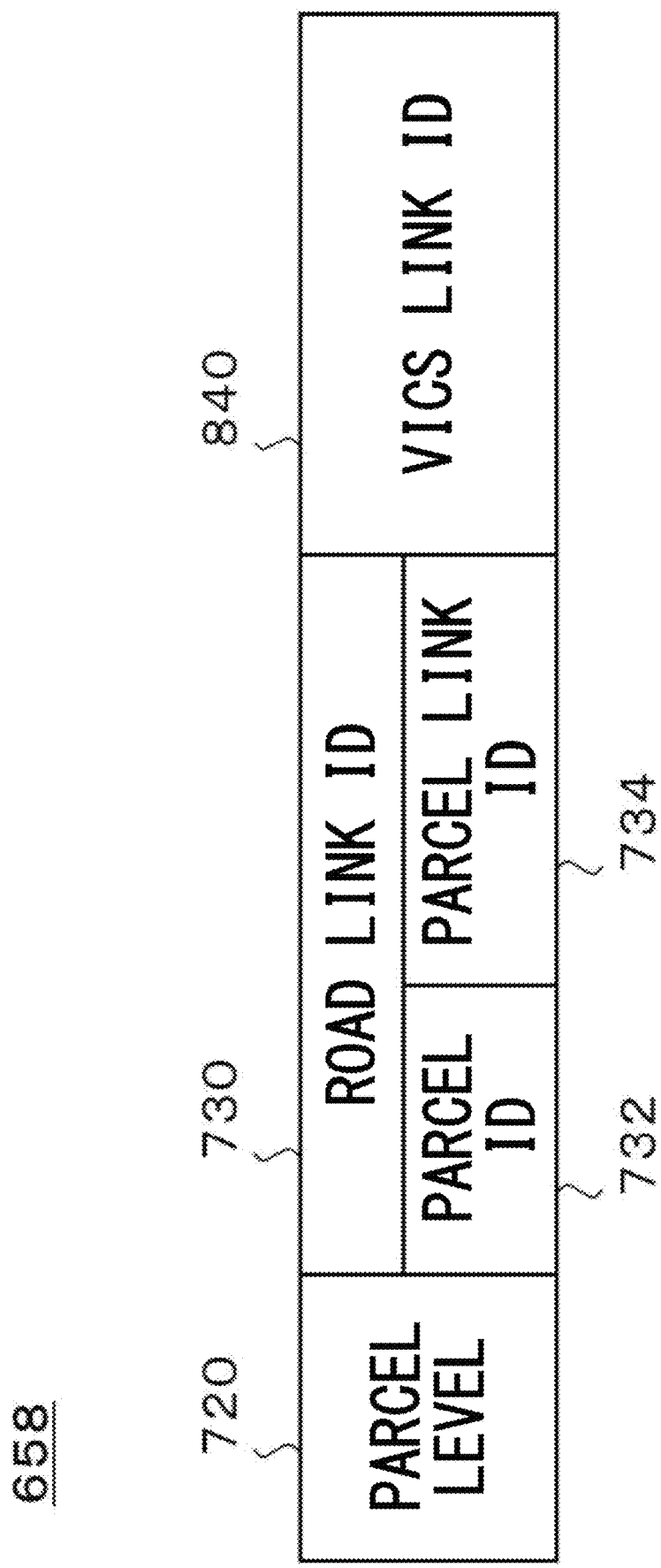
FIG. 8 schematically shows an example of a data structure of a VICS (registered trademark) conversion table 658.

FIG. 8 schematically shows an example of a data structure of a VICS conversion table 658 included in the vector map data 600. In the VICS conversion table 658 in the present embodiment, the parcel level 720, the road link ID 730, and a VICS link ID 840 are associated with each other and stored. This enables the road link ID of the road link representing each of one or more roads included in each basic parcel, and the VICS link ID of the road link to be associated with each other.

Figure 9:
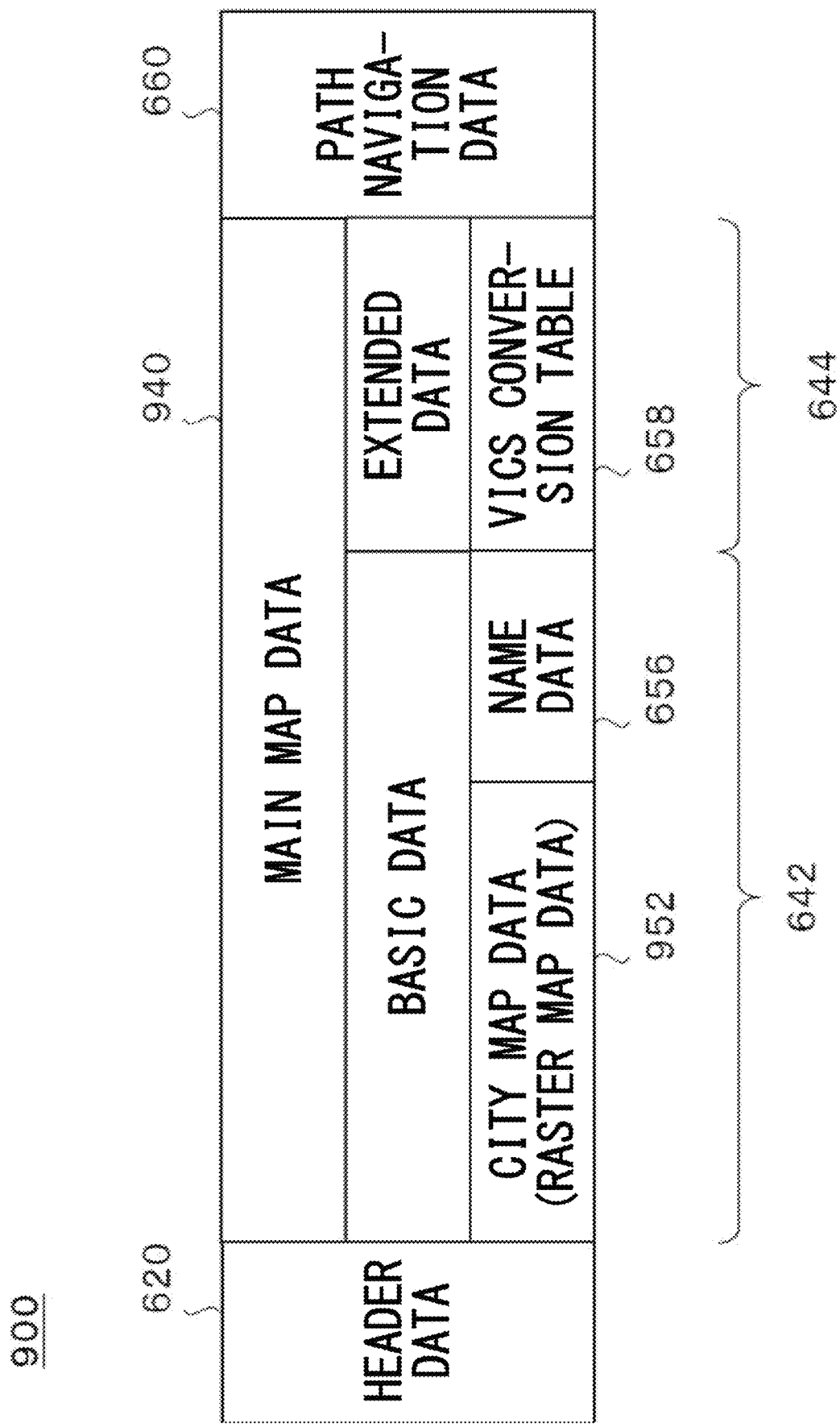
FIG. 9 schematically shows an example of a data configuration of raster map data 900.

FIG. 9 schematically shows an example of a data configuration of raster map data 900. As mentioned above, the map data included in the data set of level –1 may be raster map data 900. The raster map data 900 is different from the vector map data 600 in that the raster map data 900 includes a main map data 940 instead of the main map data 640. The main map data 940 is different from the main map data 640 in that the main map data 940 includes a city map data 952 instead of road data 652 and background data 654. The city map data 952 may be raster map data in which a feature included in the geographic range that is indicated by each basic parcel of level 0 is plotted in detail.

Figure 10:
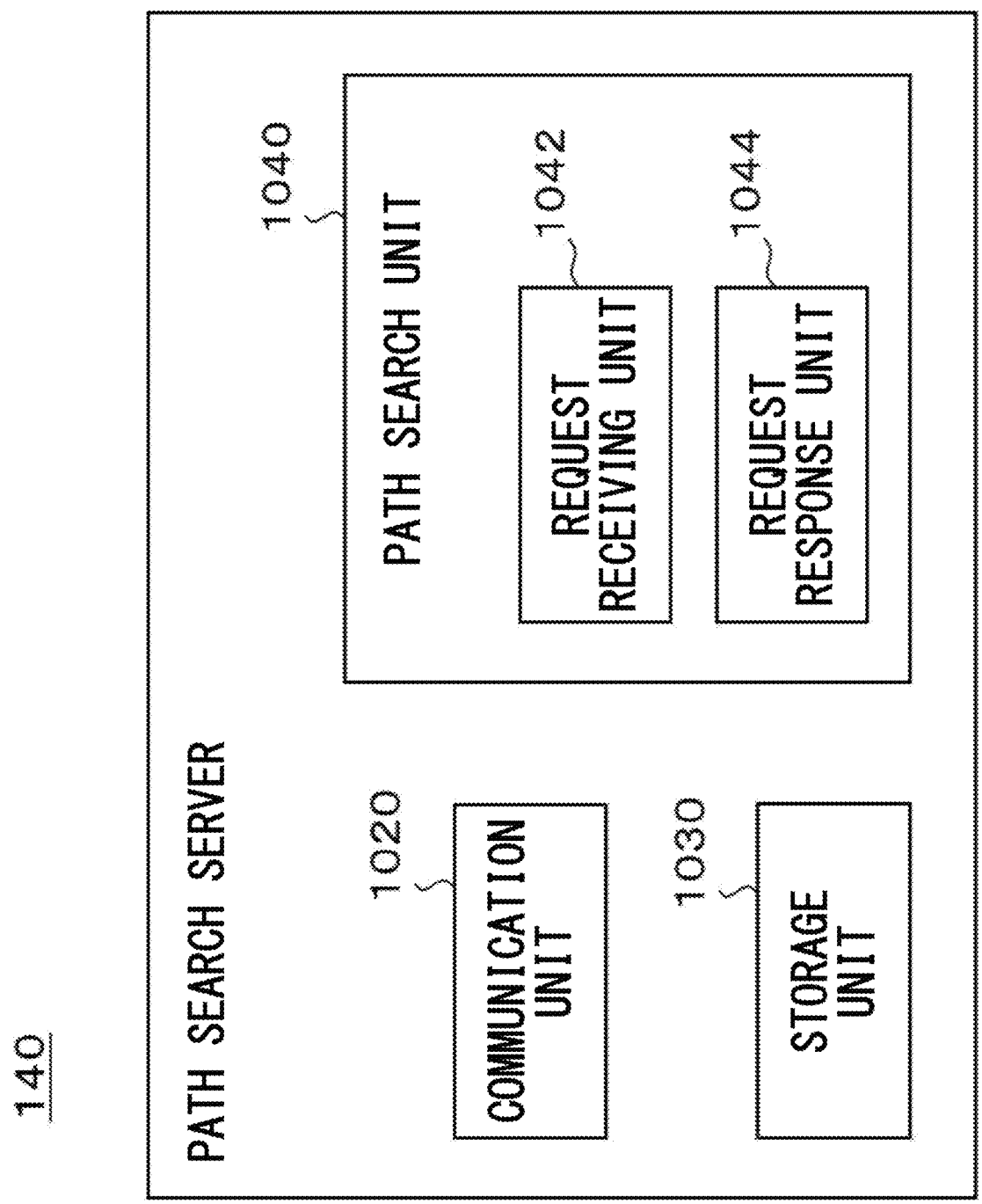
FIG. 10 schematically shows an example of a system configuration of a path search server 140.

FIG. 10 schematically shows an example of a system configuration of a path search server 140. In the present embodiment, the path search server 140 includes a communication unit 1020, a storage unit 1030, and a path search unit 1040. In the present embodiment, the path search unit 1040 has a request receiving unit 1042 and a request response unit 1044.

In the present embodiment, the communication unit 1020 transmits and receives information between the path search unit 1040 and the vehicle 180 via the communication network 10. The communication unit 1020 may transmit and receive information between the map distribution server 120 and the path search server 140 via the communication network 10.

In the present embodiment, the storage unit 1030 stores various types of map information. The storage unit 1030 acquires and stores the map data set distributed by the map distribution server 120. When the map data set is updated, the storage unit 1030 acquires the entire updated map data set in a comparatively short period of time. The storage unit 1030 may acquire a new map data set collectively, or may acquire the map data set in a dividing manner. Details of the storage unit 1030 and details of the map information will be described below.

The path search unit 1040 searches for the path to the destination by using the map data stored in the storage unit 1030 in response to the request from the navigation device 182. Specifically, the request receiving unit 1042 receives, from the navigation device 182, a path search request for requesting the path search to the destination. When the request receiving unit 1042 receives the path search request, the request response unit 1044 transmits the path data indicating the path to the destination to the navigation device 182 that has transmitted the path search request.

As described above, the path data may include the point sequence data. When at least a part of the path to the destination includes the highway or the limited highway, the path data may include the above-described highway data.

Figure 11:
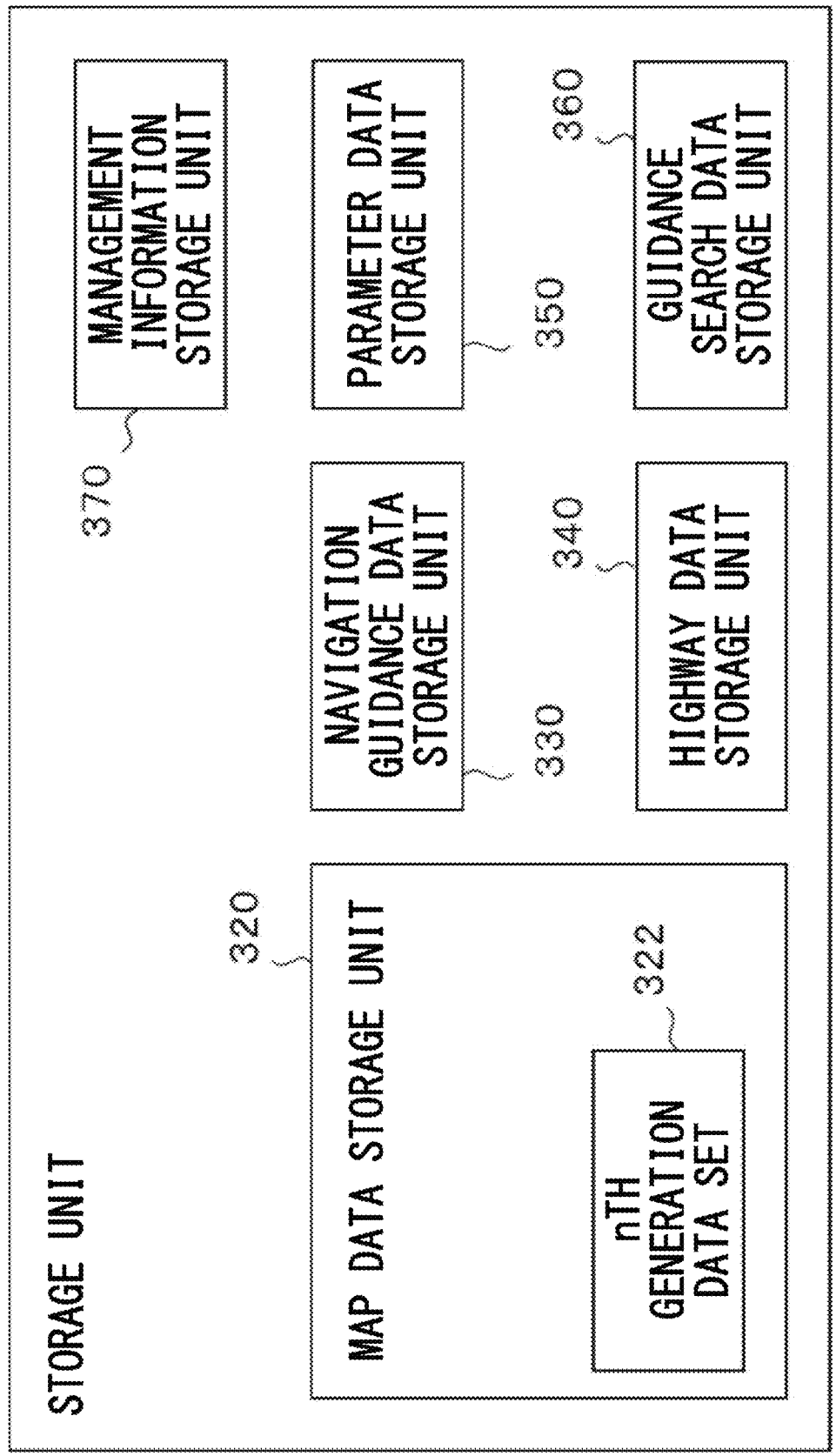
FIG. 11 schematically shows an example of an internal configuration of a storage unit 1030.

FIG. 11 schematically shows an example of an internal configuration of a storage unit 1030. In the present embodiment, the storage unit 1030 includes the map data storage unit 320, the navigation guidance data storage unit 330, the highway data storage unit 340, the parameter data storage unit 350, the guidance search data storage unit 360, and the management information storage unit 370.

In the present embodiment, the storage unit 1030 is different from the storage unit 230 of the map distribution server 120 described with reference to FIG. 3 in that the map data storage unit 320 has stored the nth generation data set 322 which is the latest map data set, and has not stored the n−1th generation data set 324 which is the map data set of the immediately previous generation. Regarding other features, the storage unit 1030 and each unit of the storage unit 1030 may have configurations similar to those of the storage unit 230 and each unit of the storage unit 230. Note that the storage unit 1030 may have stored the n−1th generation data set 324 similarly to the storage unit 230.

Figure 12:
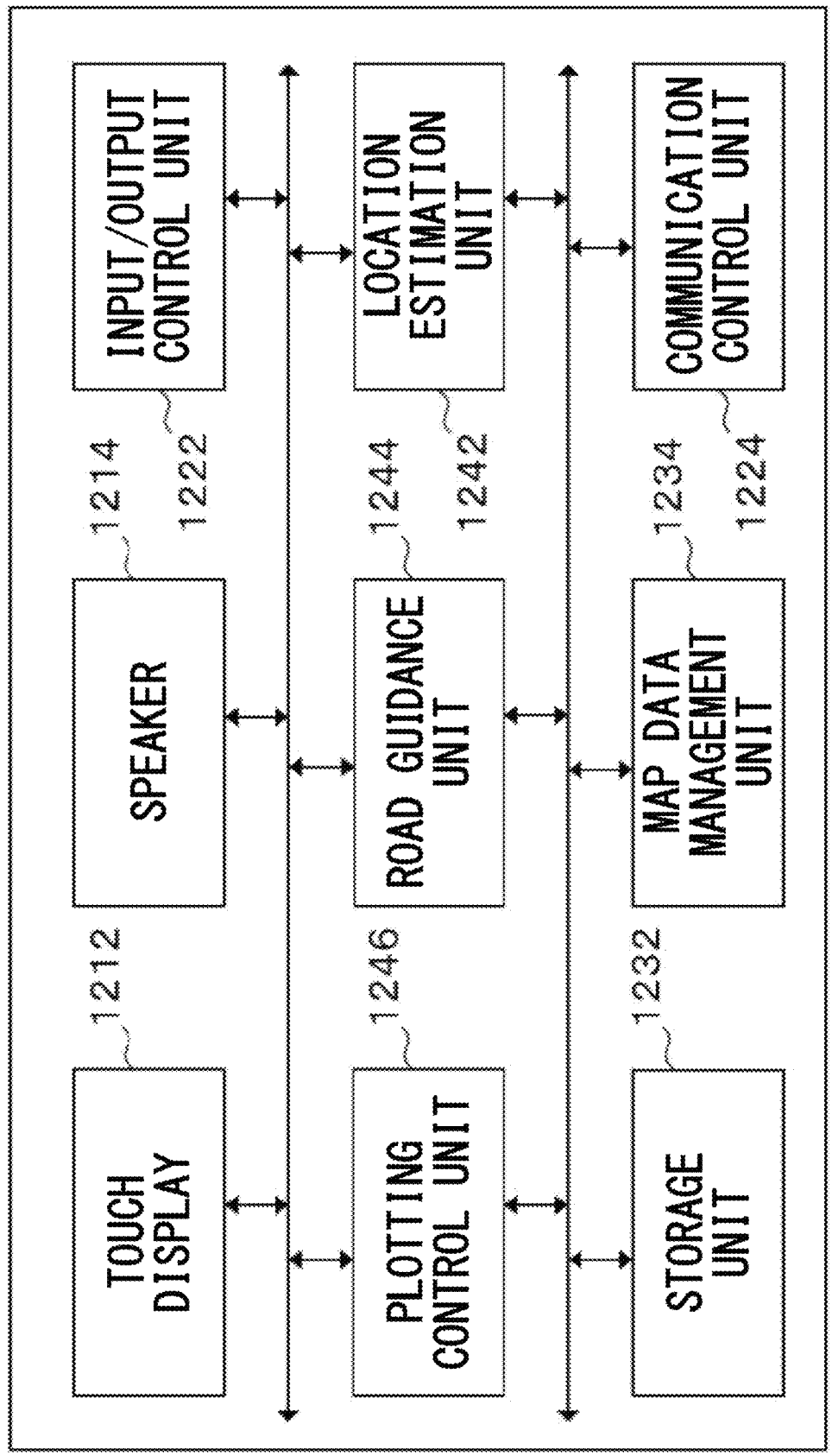
FIG. 12 schematically shows an example of a system configuration of a navigation device 182.

FIG. 12 schematically shows an example of a system configuration of a navigation device 182. In the present embodiment, the navigation device 182 includes, for example, a touch display 1212 and a speaker 1214. The navigation device 182 may include an input/output control unit 1222, and a communication control unit 1224. The navigation device 182 may include a storage unit 1232 and a map data management unit 1234. The navigation device 182 may include a location estimation unit 1242, a road guidance unit 1244, and a plotting control unit 1246.

In the present embodiment, the touch display 1212 displays various screens. For example, the touch display 1212 displays a screen including an image of a map. On the above-mentioned screen, the path to the destination may be displayed so as to be superimposed on the above-mentioned map. On the above-mentioned screen, various icons for the occupant 18 to manipulate the navigation device 182 may be arranged. The touch display 1212 may display various screens based on an instruction from the plotting control unit 1246.

The touch display 1212 may have a touch panel for receiving an input from the occupant 18. The touch display 1212 may receive a touch input of the occupant 18. The touch display 1212 receives, for example, an input for manipulating the navigation device 182 from the occupant 18.

In one embodiment, the occupant 18 selects an icon displayed on the touch display 1212 for input by the touch input. Thereby, processing associated with the above-mentioned icon is executed. In another embodiment, by the touch input, the occupant 18 may input an instruction for scrolling the map displayed on the touch display 1212, or may input an instruction for enlarging the map displayed on the touch display 1212.

In still another embodiment, the occupant 18 may input, by the touch input, a location of a specific point (sometimes referred to as a designated place). An example of the designated place includes a destination, a departure place, an intermediate place, a POI, or the like. A location of the designated place may be represented by coordinates, may be represented by an address or a part thereof, or may be represented by a facility name or a building name.

Note that an input method of the instruction from the occupant 18 is not limited to the touch input. In another embodiment, the instruction from the occupant 18 may be input by a keyboard, a pointing device, a voice input system, a line-of-sight input system, a gesture input system, or the like.

In the present embodiment, the speaker 1214 may output various types of guidance information by a voice. The speaker 1214 may output various types of guidance information based on an instruction from the road guidance unit 1244.

The input/output control unit 1222 controls an input of information to the navigation device 182. Further, the input/output control unit 1222 controls an output of information from the navigation device 182.

For example, the input/output control unit 1222 acquires, from the touch display 1212, information indicating coordinates (sometimes referred to as touch location coordinates) of a location for which the touch input is made on the touch display 1212. For example, the input/output control unit 1222 outputs information indicating the touch location coordinates to at least one of the map data management unit 1234 and the road guidance unit 1244. The input/output control unit 1222 may output, to at least one of the map data management unit 1234 and the road guidance unit 1244, information indicating a content of the instruction which is from the occupant 18 and is indicated by the touch input.

The input/output control unit 1222 may adjust setting of the touch display 1212. For example, the input/output control unit 1222 sets a sensitivity of the touch panel of the touch display 1212. More specifically, the input/output control unit 1222 may adjust a detection sensitivity of the touch input at each location of the touch display 1212. For example, this enables a dead area where the touch input is not detected to be arranged in at least a part of the touch display 1212.

The input/output control unit 1222 may acquire, from the receiving device 186, the VICS signal 22 and the GPS signal 24 received by the receiving device 186. The input/output control unit 1222 may output, for example, the VICS signal 22 to the road guidance unit 1244. The input/output control unit 1222 may output, for example, the GPS signal 24 to the location estimation unit 1242.

The input/output control unit 1222 may acquire, from the in-vehicle sensor 188, various types of data output by the in-vehicle sensor 188. For example, the input/output control unit 1222 outputs, to the road guidance unit 1244, image data output by a camera that captures images surroundings of the vehicle 180. For example, the input/output control unit 1222 outputs, to the location estimation unit 1242, data such as acceleration and angular acceleration output by the internal sensor.

The input/output control unit 1222 may control an image output of the touch display 1212. The input/output control unit 1222 may control a voice output of the speaker 1214.

In the present embodiment, the communication control unit 1224 controls communication between the communication device 184, and at least one of the map distribution server 120 and the path search server 140. The communication control unit 1224 may be a communication interface.

The communication control unit 1224 may acquire information (sometimes referred to as communication information) indicating a communication state of the communication network 10 when the map data management unit 1234 acquires the map data from the map distribution server 120. The communication control unit 1224 may output information indicating the communication state of the communication network 10 to the map data management unit 1234. An example of the communication state includes a radio wave strength, a communication speed, a delay, stability of the communication, or the like.

Similarly, the communication control unit 1224 may acquire the information indicating the communication state of the communication network 10 when the road guidance unit 1244 acquires the path data from the path search server 140. The communication control unit 1224 may output the information indicating the communication state of the communication network 10 to the road guidance unit 1244.

The storage unit 1232 stores various types of map information. The storage unit 1232 stores the pre-installed data set described above. When the map data management unit 1234 acquires the data constituting the distribution data set from the map distribution server 120, the storage unit 1232 may store the data. Details of the storage unit 1232 will be described below.

The map data management unit 1234 manages the map information stored in the storage unit 1232. In one embodiment, the map data management unit 1234 manages the update of the map information. For example, the map data management unit 1234 updates the map information by acquiring at least a part of the distribution data set stored in the map distribution server 120.

In another embodiment, the map data management unit 1234 manages the map data used for the path guidance by the road guidance unit 1244. In still another embodiment, the map data management unit 1234 manages the map data used for the map display by the plotting control unit 1246. Details of the map data management unit 1234 will be described below.

The location estimation unit 1242 estimates the location of the navigation device 182. The location estimation unit 1242 may estimate, for example, the location of the navigation device 182 based on at least one of (i) the GPS signal 24 and (ii) various types of data output by the in-vehicle sensor 188.

In the present embodiment, the road guidance unit 1244 presents the occupant 18 with various types of information for guidance for a road. The above-mentioned information may be presented to the occupant 18 by displaying the guidance image on the touch display 1212, or may be presented to the occupant 18 by outputting the guidance voice from the speaker 1214.

In the present embodiment, the road guidance unit 1244 has (i) a free driving mode in which a route to the destination is not set, and information on a road around the vehicle 180 is presented to occupant 18 by using a location of the vehicle 180 and the map of the vicinity of the vehicle 180, and (ii) a route guidance mode in which the route to the destination is set, and the information on the road around the vehicle 180 is presented to the occupant 18 by using the route, the location of the vehicle 180, and the map of the vicinity of the vehicle 180.

In the route guidance mode, the road guidance unit 1244 provides the guidance for the path to the destination. For example, the road guidance unit 1244 (i) acquires at least information indicating the destination of the occupant 18 to search for the path to the destination. The road guidance unit 1244 (ii) may acquire the information indicating the destination of the occupant 18, and information indicating at least one of one or more intermediate places and the departure place to search for the path to the destination based on these pieces of information.

In one embodiment, the road guidance unit 1244 guides the occupant 18 through the path based on the data stored in the storage unit 1232. In another embodiment, the road guidance unit 1244 guides the occupant 18 through the path based on the path data transmitted from the path search server 140.

The plotting control unit 1246 plots an image on the touch display 1212. The plotting control unit 1246 controls the plotting of the screen displayed on the touch display 1212. The plotting control unit 1246 may control the touch display 1212 to cause the touch display 1212 to display a map image. For example, the plotting control unit 1246 causes the touch display 1212 to display the screen based on the data stored in the storage unit 1232. The plotting control unit 1246 may have (i) a first plotting mode in which the map image is plotted based on the map data stored in a pre-installed data storage unit 1314, and (ii) a second plotting mode in which the map image is plotted based on the map data stored in a distribution data storage unit 1316.

The plotting control unit 1246 may control the touch display 1212 to cause the touch display 1212 to display the guidance image. For example, the plotting control unit 1246 may cause the touch display 1212 to display the guidance image corresponding to the location of the vehicle 180 in accordance with the instruction from the road guidance unit 1244.

The occupant 18 may be an example of the user. The touch display 1212 may be an example of the display device. The input/output control unit 1222 may be an example of a location information acquisition unit, a display control unit, or a sensitivity setting unit. The communication control unit 1224 may be an example of a communication information acquisition unit. The storage unit 1232 may be an example of a first storage unit or a second storage unit. The map data management unit 1234 may be an example of a map information acquisition unit. The location estimation unit 1242 may be an example of a location information acquisition unit. The road guidance unit 1244 may be an example of a guidance unit that provides guidance through a path. The plotting control unit 1246 may be an example of a control device or a display control unit.

In the present embodiment, details of the navigation device 182 have been described by using, as an example, the case where the occupant 18 manipulates the navigation device 182 via the touch display 1212. However, the navigation device 182 is not limited to the present embodiment. In another embodiment, the occupant 18 may manipulate the navigation device 182 via a voice input system, a gesture input system, a line-of-sight input system, or the like.

Figure 13:
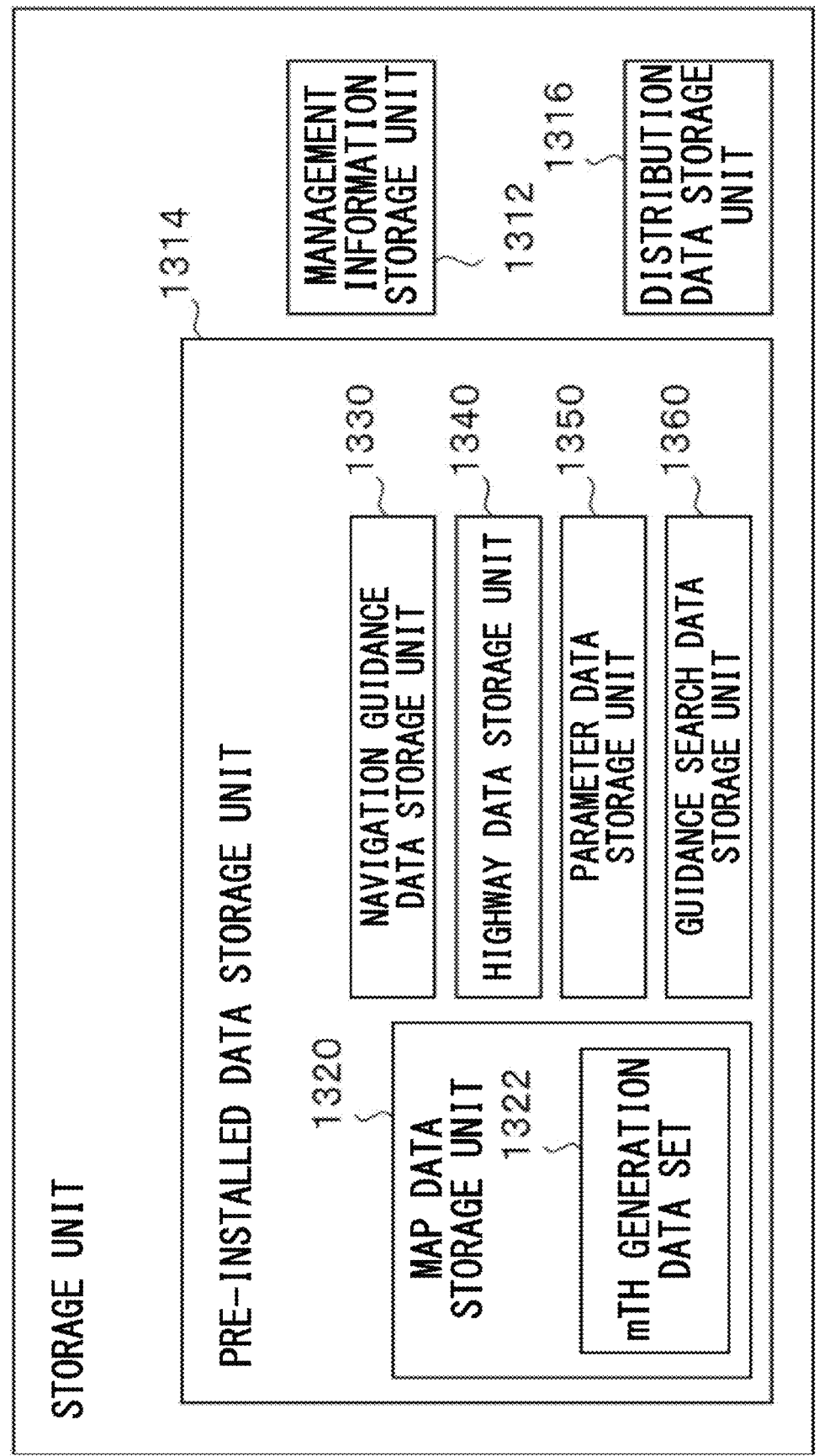
FIG. 13 schematically shows an example of an internal configuration of a storage unit 1232.

FIG. 13 schematically shows an example of an internal configuration of a storage unit 1232. In the present embodiment, the storage unit 1232 includes a management information storage unit 1312, the pre-installed data storage unit 1314, and the distribution data storage unit 1316. In the present embodiment, the pre-installed data storage unit 1314 includes a map data storage unit 1320, a navigation guidance data storage unit 1330, a highway data storage unit 1340, a parameter data storage unit 1350, and a guidance search data storage unit 1360.

In the present embodiment, the management information storage unit 1312 stores various types of information used to manage various types of data stored in the storage unit 1232. For example, the management information storage unit 1312 stores information indicating a creation time or an update time of an mth generation data set 1322. The management information storage unit 1312 may store information indicating a creation time, an update time, or an acquisition time of the map data stored in the distribution data storage unit 1316. As described above, the information indicating the creation time or the update time may be information indicating a generation or a version.

In the present embodiment, the pre-installed data storage unit 1314 stores pre-installed data. Details of each unit of the pre-installed data storage unit 1314 will be described below.

In the present embodiment, the distribution data storage unit 1316 stores data which is acquired from the map distribution server 120 by the map data management unit 1234 from among the data constituting the distribution data set stored in the map distribution server 120. With the present embodiment as described above, for example, the management information storage unit 1312 associates and stores identification information of the data acquired from the map distribution server 120 by the map data management unit 1234, and information indicating an acquisition time of the data acquired from the map distribution server 120 by the map data management unit 1234. This enables the data acquired from the map distribution server 120 by the map data management unit 1234 to be managed in association with the information indicating the time when the data is acquired.

In the present embodiment, the map data storage unit 1320 stores the mth generation data set 1322 as the pre-installed data set. The mth generation data set 1322 may have a data structure similar to that of the nth generation data set 322.

In the present embodiment, the navigation guidance data storage unit 1330 stores navigation guidance data corresponding to the mth generation data set 1322. In the present embodiment, the highway data storage unit 1340 stores highway data corresponding to the mth generation data set 1322. In the present embodiment, the parameter data storage unit 1350 stores parameter data corresponding to the mth generation data set 1322. In the present embodiment, the guidance search data storage unit 1360 stores guidance search data corresponding to the mth generation data set 1322.

The mth generation data set 1322 may be an example of the first map data set or the local map data set. The pre-installed data storage unit 1314 constituting the mth generation data set 1322 may be an example of the first storage unit. The distribution data storage unit 1316 may be an example of the second storage unit.

Figure 14:
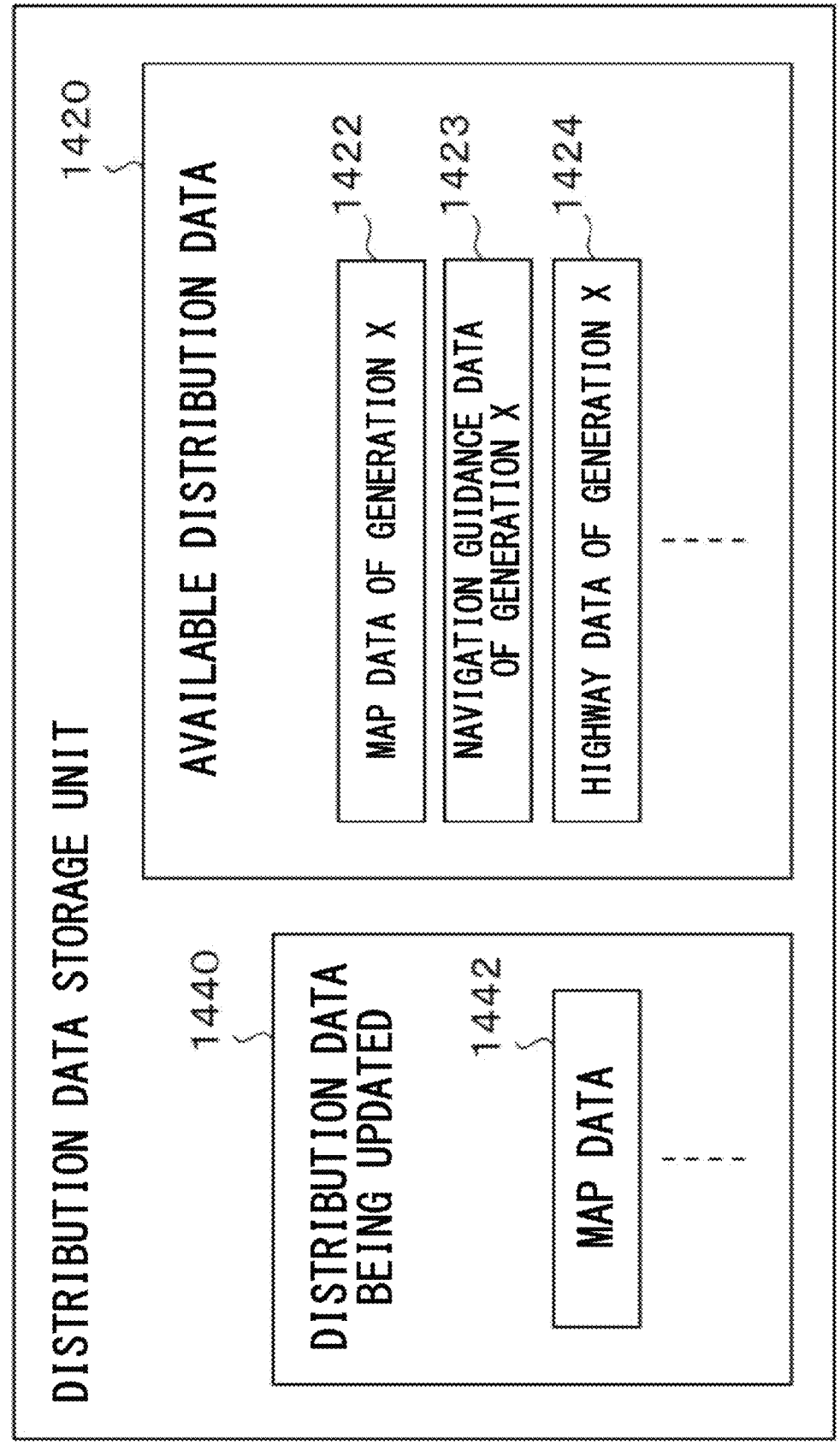
FIG. 14 schematically shows an example of an internal configuration of a distribution data storage unit 1316.

FIG. 14 schematically shows an example of an internal configuration of a distribution data storage unit 1316. In the present embodiment, the distribution data storage unit 1316 includes available distribution data 1420, and distribution data 1440 being updated. An example of the available distribution data 1420 includes, for example, map data 1422 of generation X, navigation guidance data 1423 of generation X, highway data 1424 of generation X, or the like. Another example of the available distribution data 1420 includes parameter data of generation X, guidance search data of generation X, or the like. For example, while update processing of the latest map data 1442 is being executed, the map data 1442 is not available until acquisition processing of the map data 1442 is completed. Data in the middle of such acquisition processing can be temporarily stored in the distribution data storage unit 1316 as the distribution data 1440 being updated.

Figure 15:
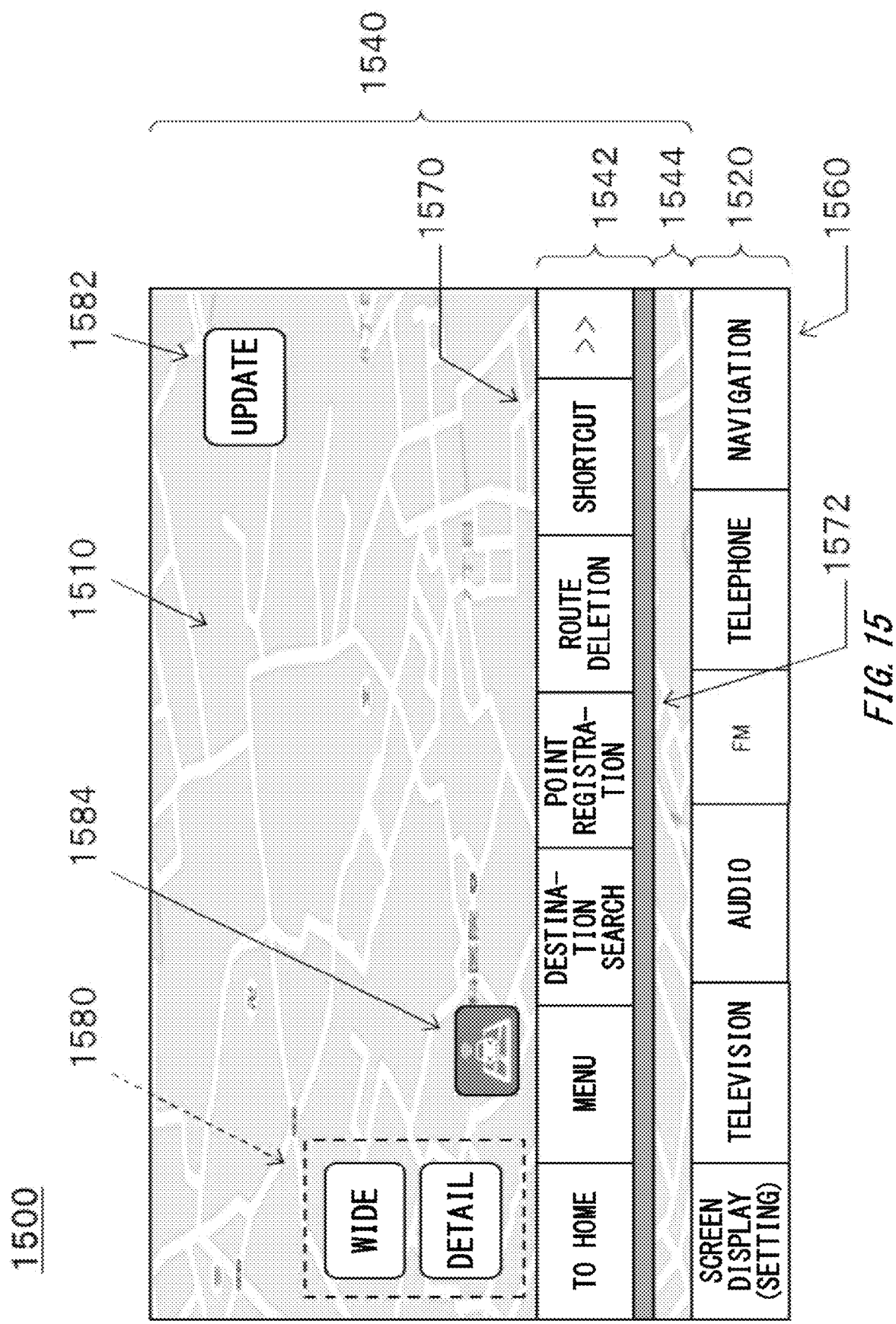
FIG. 15 schematically shows an example of a screen 1500.

FIG. 15 schematically shows an example of a screen 1500. In the present embodiment, the screen 1500 has a basic function selection area 1520 and a function-dependent area 1540. In the function-dependent area 1540 in the present embodiment, a manipulation selection area 1542 is arranged. Further, in the function-dependent area 1540 in the present embodiment, a scale change button 1580, a map update button 1582, and a map discrimination icon 1584 are arranged.

[Location Relationship of Each Element of Screen 1500]

In the present embodiment, the basic function selection area 1520 is arranged outside the function-dependent area 1540. A length of a lateral width of the basic function selection area 1520 may be greater than half a length of a lateral width of the screen.

In the present embodiment, the manipulation selection area 1542 is arranged between the basic function selection area 1520 and the function-dependent area 1540. A length of a lateral width of the manipulation selection area 1542 may be greater than half the length of the lateral width of the screen. The manipulation selection area 1542 may be displayed to be superimposed on the function-dependent area 1540. Note that in another embodiment, the manipulation selection area 1542 may be arranged in contact with or superimposed on an end portion of the function-dependent area 1540 on a side where the basic function selection area 1520 is arranged.

In the present embodiment, the basic function selection area 1520 and the manipulation selection area 1542 are arranged apart from each other. Therefore, with the present embodiment, a gap 1544 is provided between the basic function selection area 1520 and the manipulation selection area 1542. This greatly reduces a wrong manipulation of the occupant 18.

In the present embodiment, a demarcation line 1572 for separating the basic function selection area 1520 and the manipulation selection area 1542 to be displayed is arranged at an end portion of the manipulation selection area 1542 on a basic function selection area 1520 side. A color or a pattern of the demarcation line 1572 is preferably different from a color or a pattern of the manipulation selection area 1542. This enables a boundary between the basic function selection area 1520 and the manipulation selection area 1542 to be visually recognized more clearly. As a result, a wrong manipulation of the occupant 18 is greatly reduced.

Note that in another embodiment, the demarcation line 1572 is arranged between the basic function selection area 1520 and the manipulation selection area 1542. In still another embodiment, the demarcation line 1572 may be arranged at an end portion of the basic function selection area 1520 on a manipulation selection area 1542 side.

[Function of Each Element of Screen 1500]

In the present embodiment, the basic function selection area 1520 may be an area for the touch panel of the touch display 1212 to receive the touch input of the occupant 18. In the basic function selection area 1520 of the screen 1500, a basic function selection button 1560 for selecting a basic function of the navigation device 182 is arranged. In the basic function selection area 1520, a plurality of basic function selection buttons 1560 may be arranged. With the present embodiment, as the basic function selection button 1560, a button for calling each of a setting function for a screen display, a television broadcast reception function, an audio playback function, an FM broadcast reception function, a telephone function, and a navigation function is arranged.

In the function-dependent area 1540 of the screen 1500 in the present embodiment, the screen according to the basic function that is called is displayed. For example, when the navigation function is called, a map image 1510 is displayed in the function-dependent area 1540.

In the present embodiment, the manipulation selection area 1542 may be an area for the touch panel of the touch display 1212 to receive the touch input of the occupant 18. In the manipulation selection area 1542 of the screen 1500, a manipulation selection button 1570 for selecting a manipulation according to the basic function that is called is arranged. In the manipulation selection area 1542, a plurality of manipulation selection buttons 1570 may be arranged.

In the present embodiment, the scale change button 1580 is provided to receive the touch input for changing the scale of the map image 1510 displayed in the function-dependent area 1540. In the present embodiment, the map update button 1582 is provided to receive the touch input for executing the update processing of the distribution data set.

In the present embodiment, the map discrimination icon 1584 is provided to determine a basis on which the map image 1510 is displayed between (i) the pre-installed data set stored in the pre-installed data storage unit 1314 and (ii) the distribution data set stored in the distribution data storage unit 1316. Between a case where the map image 1510 is displayed based on the pre-installed data set stored in the pre-installed data storage unit 1314, and a case where the map image 1510 is displayed based on the distribution data set stored in the distribution data storage unit 1316, there may be a difference in at least one of color, pattern, shape, and size of the map discrimination icon 1584.

The basic function selection area 1520 may be an example of a first touch control area for the touch panel to receive the user's touch input. The function-dependent area 1540 may be an example of a map display area. The manipulation selection area 1542 may be an example of a second touch control area for the touch panel to receive the user's touch input. The demarcation line 1572 may be an example of a separating area for separating the first touch control area and the second touch control area to be displayed. The map discrimination icon 1584 may be an example of an icon.

In the present embodiment, details of an example of the screen 1500 have been described by using, as an example, the case where the gap 1544 is provided between the basic function selection area 1520 and the manipulation selection area 1542. However, the screen 1500 is not limited to the present embodiment. In another embodiment, the sensitivity of the touch panel of the touch display 1212 is adjusted. This suppresses a wrong input of the occupant 18.

More specifically, for example, the input/output control unit 1222 sets the sensitivity of the touch panel such that a sensitivity of (a) an area that is on the touch panel of the touch display 1212 and that is an area corresponding to at least one of (i) a portion between the basic function selection area 1520 and the manipulation selection area 1542, (ii) the vicinity of the end portion of the basic function selection area 1520 on the manipulation selection area 1542 side, and (iii) the vicinity of the end portion of the manipulation selection area 1542 on the basic function selection area 1520 side, is smaller than sensitivity of (b) an area that is on the touch panel of the touch display 1212 and that is an area corresponding to a portion, of the basic function selection area 1520, from which a distance to the end portion of the manipulation selection area 1542 on the basic function selection area 1520 side satisfies a predetermined condition. The portion, of the basic function selection area 1520, from which a distance to the end portion of the manipulation selection area 1542 on the basic function selection area 1520 side satisfies a predetermined condition is, for example, a portion, of the basic function selection area 1520, to which a distance from a lower end of the manipulation selection area 1542 is greater than a predetermined value.

The input/output control unit 1222 may set the sensitivity of the touch panel such that the dead area which does not receive the user's touch input is arranged in an area that is on the touch panel of the touch display 1212 and that is an area corresponding to at least one of (i) a portion between the basic function selection area 1520 and the manipulation selection area 1542, (ii) the vicinity of the end portion of the basic function selection area 1520 on the manipulation selection area 1542 side, and (iii) the vicinity of the end portion of the manipulation selection area 1542 on the basic function selection area 1520 side. For example, on the touch panel of the touch display 1212, the sensitivity of the touch panel is set such that an area corresponding to the gap 1544 of the screen 1500 is the dead area.

Figure 16:
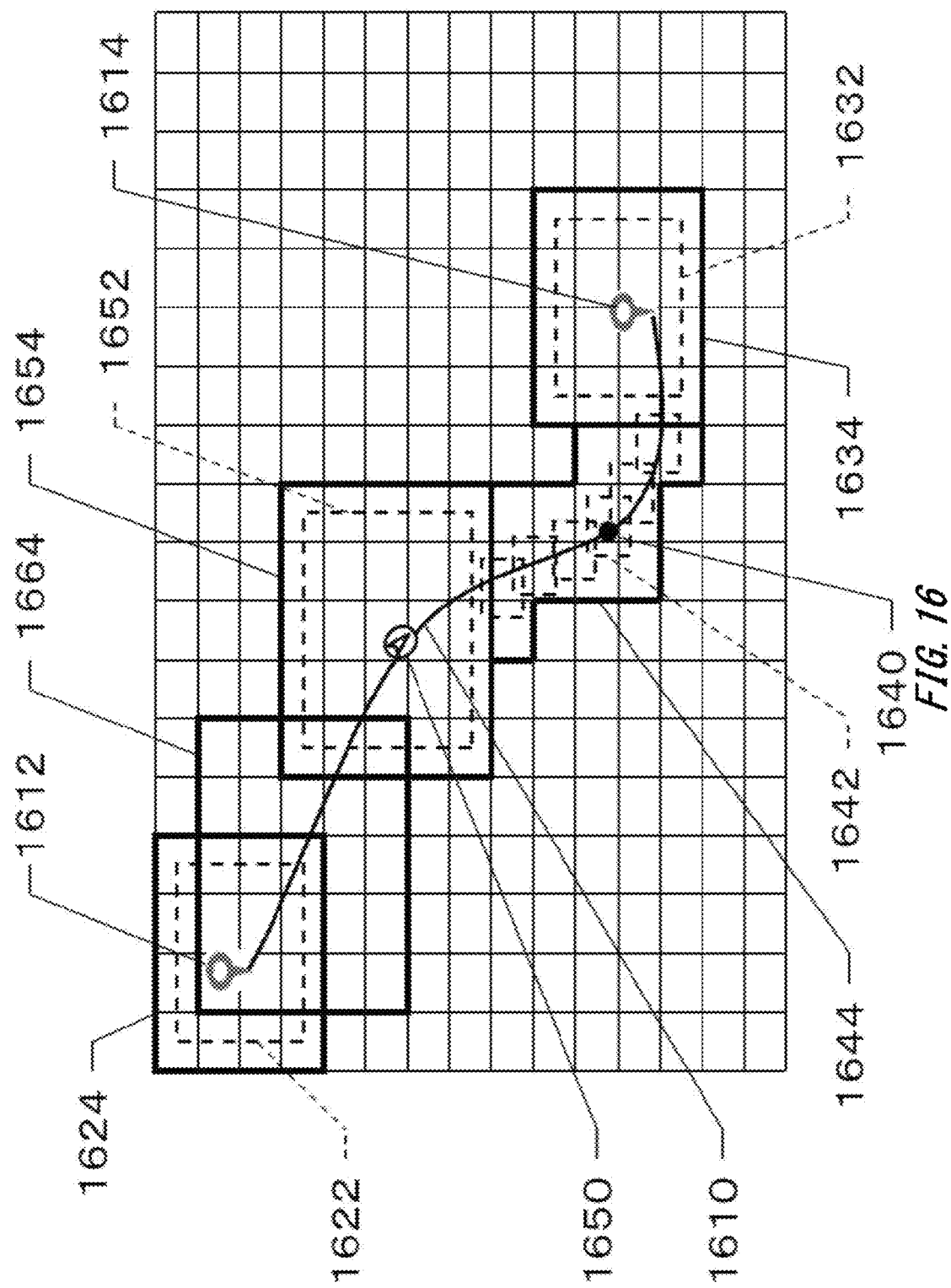
FIG. 16 schematically shows an example of an update method for map data.

FIG. 16 schematically shows an example of an update method for map data. FIG. 16 schematically shows an example of an update method for map data when the path guidance is provided based on a set route 1610.

With the present embodiment, a geographic range having a predetermined shape and size with respect to a departure point 1612 is set as a target area 1622 that is a target of the update processing of the map data. When the departure point 1612 is used as a reference, for example, the geographic range having a predetermined shape and size with the departure point 1612 as the center is set as the target area 1622. In this case, the center of the target area 1622 matches the departure point 1612. Note that the setting method for the target area 1622 is not limited to the present embodiment. In another embodiment, the target area 1622 may be set such that a specific location other than the center of the target area 1622 matches the departure point 1612. A similar method applies to a case where a point other than the departure point 1612 is used as a reference.

One or more basic parcels including the target area 1622 are determined as target parcels 1624 that are targets of the update processing of the map data. Note that among the one or more target parcels 1624, at least one of (i) a basic parcel for which the latest map data has already been acquired, and (ii) a basic parcel which belongs to a specific parcel level may be excluded from the target parcel 1624. Further, the basic parcel which belongs to a specific parcel level may be determined as the target parcel 1624 that is a target of the update processing of the map data.

Determination processing of the target parcel 1624 is, for example, executed within a predetermined period after the set route 1610 is determined. The determination processing of the target parcel 1624 may be executed at a point in time when the set route 1610 is determined. In the determination processing of the target parcel 1624, order of transmission from the map distribution server 120 to the navigation device 182 may be determined. For example, order in which each of a plurality of basic parcels included in the target parcel 1624 is transmitted is determined based on the parcel level to which each basic parcel belongs.

With the present embodiment, a geographic range having a predetermined shape and size with respect to a destination point 1614 is set as a target area 1632 that is a target of the update processing of the map data. Then, one or more basic parcels including the target area 1632 are determined as target parcels 1634 that are targets of the update processing of the map data. Note that among the one or more target parcels 1634, at least one of (i) a basic parcel for which the latest map data has already been acquired, and (ii) a basic parcel which belongs to a specific parcel level may be excluded from the target parcel 1634. Further, the basic parcel which belongs to a specific parcel level may be determined as the target parcel 1634 that is a target of the update processing of the map data.

Determination processing of the target parcel 1634 is, for example, executed within a predetermined period after the set route 1610 is determined. The determination processing of the target parcel 1634 may be executed at a point in time when the set route 1610 is determined. In the determination processing of the target parcel 1634, order of transmission from the map distribution server 120 to the navigation device 182 may be determined.

For example, order in which each of a plurality of basic parcels included in the target parcel 1634 is transmitted is determined based on the parcel level to which each basic parcel belongs.

The shape and size of the geographic range used to set the target area 1632 may be the same as the shape and size of the geographic range used to set the target area 1622. The shape or size of the geographic range used to set the target area 1632 may be different from the shape or size of the geographic range used to set the target area 1622.

With the present embodiment, a geographic range having a predetermined shape and size with respect to each of a plurality of points 1640 located on the set route 1610 is set as a target area 1642 that is a target of the update processing of the map data. Then, one or more basic parcels including the target area 1642 are determined as target parcels 1644 that are targets of the update processing of the map data. Note that among the one or more target parcels 1644, at least one of (i) a basic parcel for which the latest map data has already been acquired, and (ii) a basic parcel which belongs to a specific parcel level may be excluded from the target parcel 1644. Further, the basic parcel which belongs to a specific parcel level may be determined as the target parcel 1644 that is a target of the update processing of the map data.

Determination processing of the target parcel 1644 is, for example, executed within a predetermined period after the set route 1610 is determined. The determination processing of the target parcel 1644 may be executed at a point in time when the set route 1610 is determined. In the determination processing of the target parcel 1644, order of transmission from the map distribution server 120 to the navigation device 182 may be determined. For example, order in which each of a plurality of basic parcels included in the target parcel 1644 is transmitted is determined based on the parcel level to which each basic parcel belongs.

The shape and size of the geographic range used to set the target area 1642 may be the same as the shape and size of the geographic range used to set the target area 1622. The shape or size of the geographic range used to set the target area 1642 may be different from the shape or size of the geographic range used to set the target area 1622.

In the shape or size of the geographic range used to set the target area 1642, an area of the geographic range used to set the target area 1642 may be set to be smaller than an area of the geographic range used to set the target area 1622. This enables an amount of useless data to be reduced even when the route is changed.

In the present embodiment, a geographic range having a predetermined shape and size with respect to a host vehicle location 1650 is set as a target area 1652 that is a target of the update processing of the map data. Then, one or more basic parcels including the target area 1652 are determined as target parcels 1654 that are targets of the update processing of the map data. Note that among the one or more target parcels 1654, at least one of (i) a basic parcel for which the latest map data has already been acquired, and (ii) a basic parcel which belongs to a specific parcel level may be excluded from the target parcel 1654. Further, the basic parcel which belongs to a specific parcel level may be determined as the target parcel 1654 that is a target of the update processing of the map data.

Determination processing of the target parcel 1654 is, for example, executed within a predetermined period after the set route 1610 is determined. The determination processing of the target parcel 1654 may be executed at a point in time when the set route 1610 is determined. In the determination processing of the target parcel 1654, order of transmission from the map distribution server 120 to the navigation device 182 may be determined.

For example, order in which each of a plurality of basic parcels included in the target parcel 1654 is transmitted is determined based on the parcel level to which each basic parcel belongs.

The shape and size of the geographic range used to set the target area 1652 may be the same as the shape and size of the geographic range used to set the target area 1652. The shape or size of the geographic range used to set the target area 1652 may be different from the shape or size of the geographic range used to set the target area 1652.

In the shape or size of the geographic range used to set the target area 1652, an area of the geographic range used to set the target area 1652 may be set to be greater than an area of the geographic range used to set the target area 1622. This enables the map data in a wider range around the host vehicle location 1650 to be updated to the latest map data. Further, as the vehicle 180 travels, the map data stored in the distribution data storage unit 1316 of the navigation device 182 is updated to the latest map data.

For example, a target parcel 1664 indicates a basic parcel that became the target of the update processing of the map data at a time before the target parcel 1654 does. In this way with the present embodiment, from among the data constituting the latest distribution data set stored in the map distribution server 120, the data of the region which is determined according to the situation of the navigation device 182 is transmitted each time when the region is determined. This enables an amount of the data communication to be reduced while the user experience is maintained.

For example, in the determination processing of the target parcel 1654 in the present embodiment, details of the determination method for the target parcel 1654 have been described by using, as an example, the case where (i) first, the geographic range having a predetermined shape and size with respect to the host vehicle location 1650 is set as the target area 1652 that is a target of the update processing of the map data, and (ii) then all or a part of one or more basic parcels including the target area 1652 are determined as the target parcels 1654 that are targets of the update processing of the map data. However, the determination method for the target parcel 1654 is not limited to the present embodiment.

In other embodiments, (i) one or more basic parcels including the host vehicle location 1650 (sometimes referred to as a host vehicle location parcel), and (ii) a plurality of basic parcels adjacent to the basic parcel (sometimes referred to as adjacent parcels) are selected as the target parcels 1654 that are targets of the update processing of the map data. For example, a single basic parcel which is a basic parcel of a parcel level corresponding to the scale of the map image 1510 currently displayed on the touch display 1212, and which includes the host vehicle location 1650, and eight basic parcels adjacent to the host vehicle location parcel are selected as candidates for the target parcel 1654.

All of the nine basic parcels selected as the candidates for the target parcel 1654 may be determined as the target parcel 1654, or some of the above-mentioned nine basic parcels may be determined as the target parcel 1654. For example, from among the above-mentioned nine basic parcels, a basic parcel obtained by excluding at least one of (i) a basic parcel for which the latest map data has already been acquired and (ii) a basic parcel which belongs to a specific parcel level is determined as the target parcel 1654. Further, from among the above-mentioned nine basic parcels, the basic parcel which belongs to a specific parcel level may be determined as the target parcel 1654.

Note that in the above-mentioned embodiment, the host vehicle location parcel, and the eight basic parcels adjacent to the host vehicle location parcel (sometimes referred to as adjacent parcels of a first level) have been selected as the candidates for the target parcel 1654. However, the method of selecting the basic parcel adjacent to the host vehicle location parcel as the candidate for the target parcel 1654 is not limited to the above-mentioned embodiment.

In another embodiment, 16 basic parcels adjacent to the adjacent parcels of the first level (sometimes referred to as adjacent parcels of a second level) are selected as the candidates for the target parcel 1654 as the basic parcels adjacent to the host vehicle location parcel. As the basic parcels adjacent to the host vehicle location parcel, 24 basic parcels adjacent to the adjacent parcels of the second level (sometimes referred to as adjacent parcels of a third level) may be selected as the candidates for the target parcel 1654. Similarly, a plurality of basic parcels adjacent to adjacent parcels of an n−1th level (that is, adjacent parcels of an nth level) may be selected as the candidates for the target parcel 1654 as the basic parcels adjacent to the host vehicle location parcel. n may be an integer of two or more. An upper limit of n may be any positive integer which is predetermined.

The above-mentioned matters are not limited to the determination method for the target parcel 1654. For example, at least one of the target parcel 1624, the target parcel 1634, the target parcel 1644, and the target parcel 1664 described with reference to FIG. 16 is determined by a procedure similar to that of the determination method for the target parcel 1654 described with reference to the above-mentioned embodiment.

An example of a switching method for the map data for screen plotting will be described by using FIG. 17 and FIG. 18. As described above, the plotting control unit 1246 may have (i) a first plotting mode in which the map image 1510 of the screen 1500 is plotted based on the map data stored in the pre-installed data storage unit 1314, and (ii) a second plotting mode in which the map image 1510 of the screen 1500 is plotted based on the map data stored in the distribution data storage unit 1316.

Figure 17:
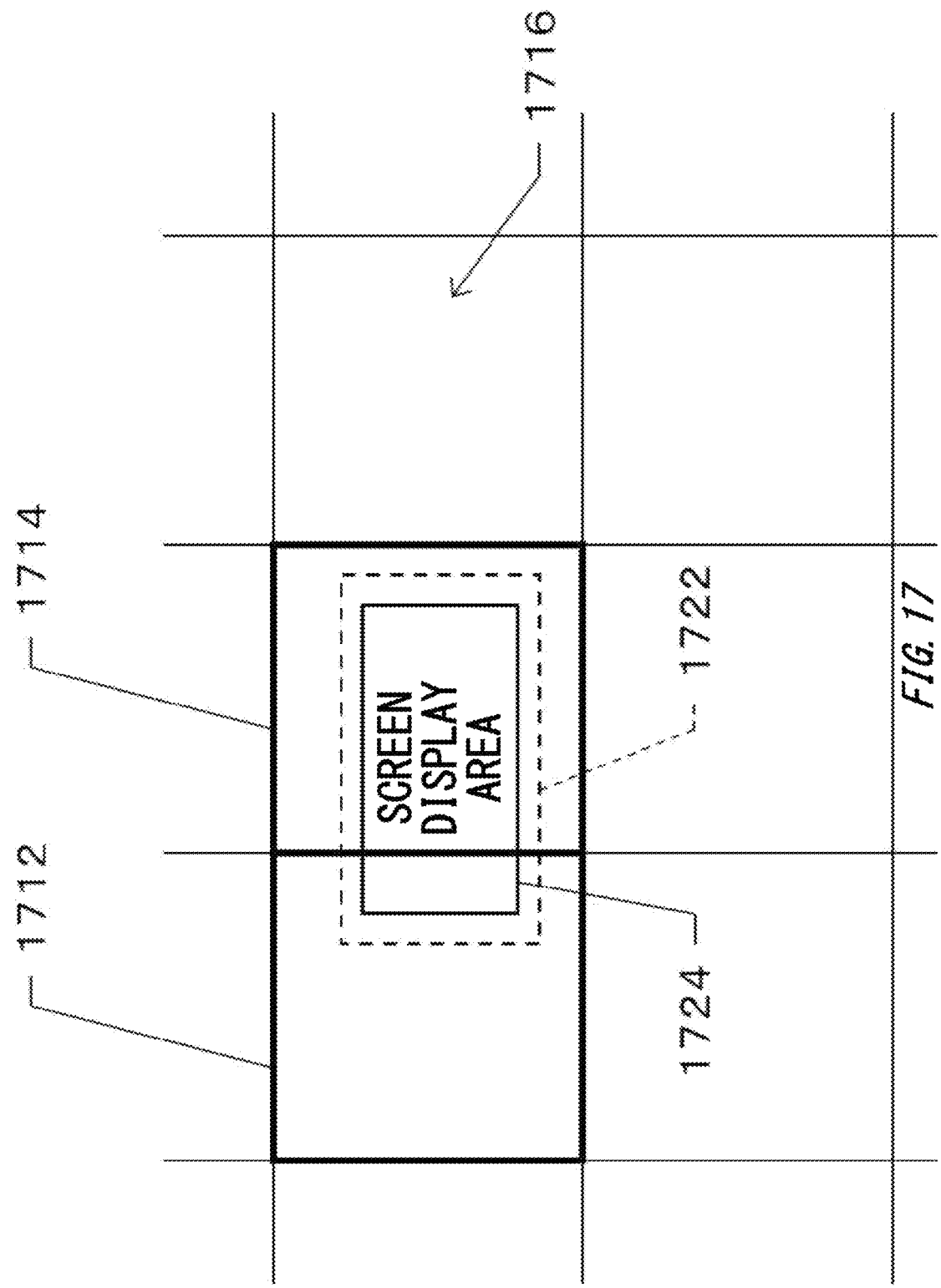
FIG. 17 schematically shows an example of a switching method for map data for screen plotting.
Figure 18:
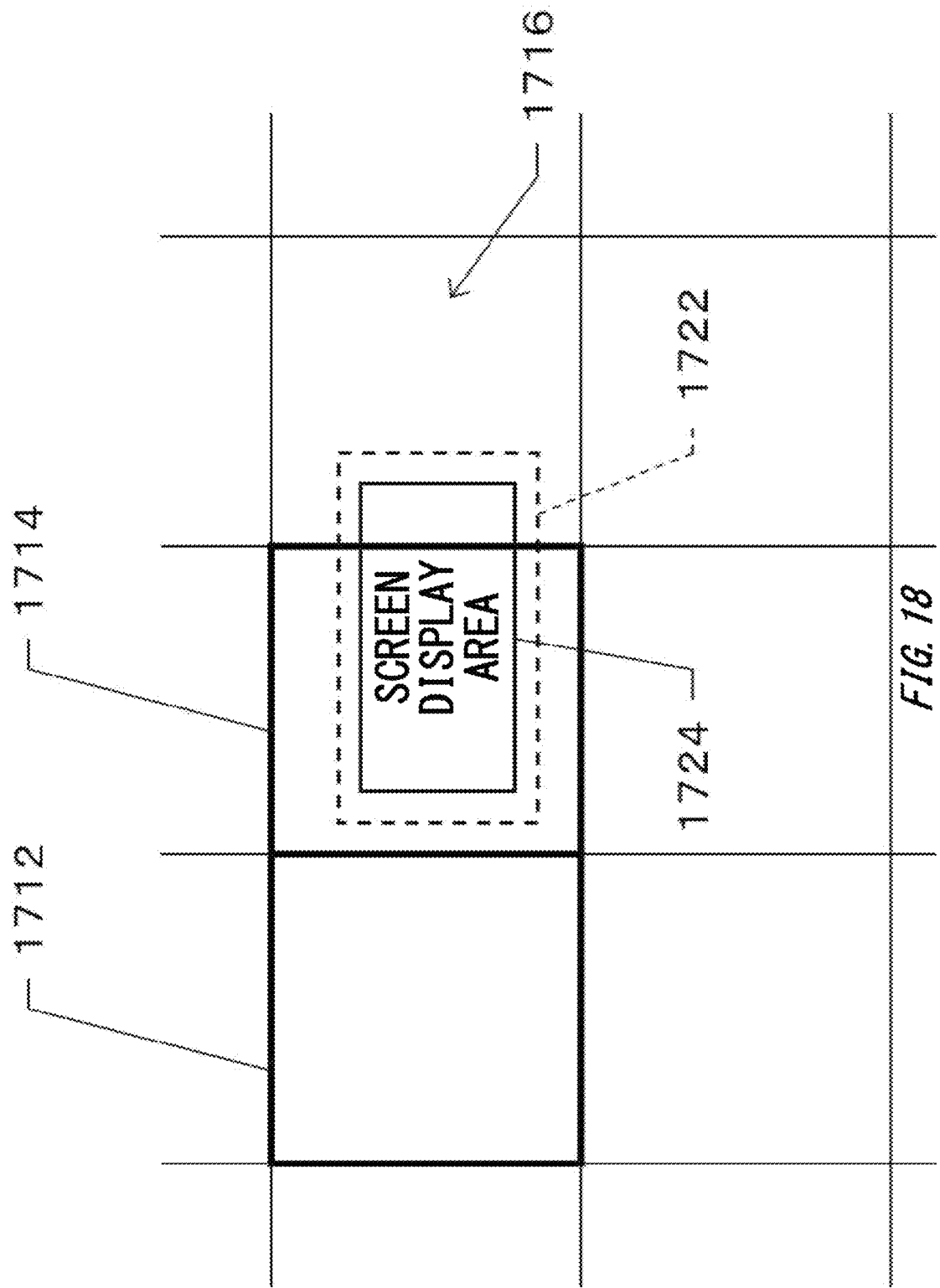
FIG. 18 schematically shows an example of a switching method for map data for screen plotting.

In FIG. 17 and FIG. 18, a basic parcel 1712 and a basic parcel 1714 indicate a basic parcel for which the latest map data is stored in the available distribution data 1420 of the distribution data storage unit 1316. On the other hand, a basic parcel 1716 indicates a basic parcel for which the latest map data is not stored in the available distribution data 1420 of the distribution data storage unit 1316. Note that for a purpose of simplifying the description, in the present embodiment, the switching method for the map data for screen plotting is described by using, as an example, a case where parcel levels of the basic parcel 1712, the basic parcel 1714, and the basic parcel 1716 are the same.

In FIG. 17 and FIG. 18, a determination area 1722 is used to determine a plotting mode in which the plotting control unit 1246 plots the map image 1510 between the first plotting mode and the second plotting mode. A shape and a size of the determination area 1722 are set for a screen display area 1724 to be included in the determination area 1722. The shape of the determination area 1722 may be determined based on an advance direction of the vehicle 180. The screen display area 1724 indicates a geographic range corresponding to the map displayed on the screen 1500.

As shown in FIG. 17, when the determination area 1722 is arranged inside the basic parcel 1712 and the basic parcel 1714, the plotting control unit 1246 plots the map image 1510 in the second plotting mode. On the other hand, as shown in FIG. 18, when at least a part of the determination area 1722 is arranged inside the basic parcel 1716, the plotting control unit 1246 plots the map image 1510 in the first plotting mode.

For example, in a state where acquisition processing of the latest map data corresponding to the basic parcel belonging to some parcel level, among the basic parcels including a specific location or geographic range, is not completed due to an influence of a communication environment or the like, when the movement of the vehicle 180 continues, a part of the determination area 1722 can be arranged inside the basic parcel 1716. Further, even when the input/output control unit 1222 receives an instruction for scrolling the map displayed on the touch display 1212, a part of the determination area 1722 can be arranged inside the basic parcel 1716.

Figure 19:
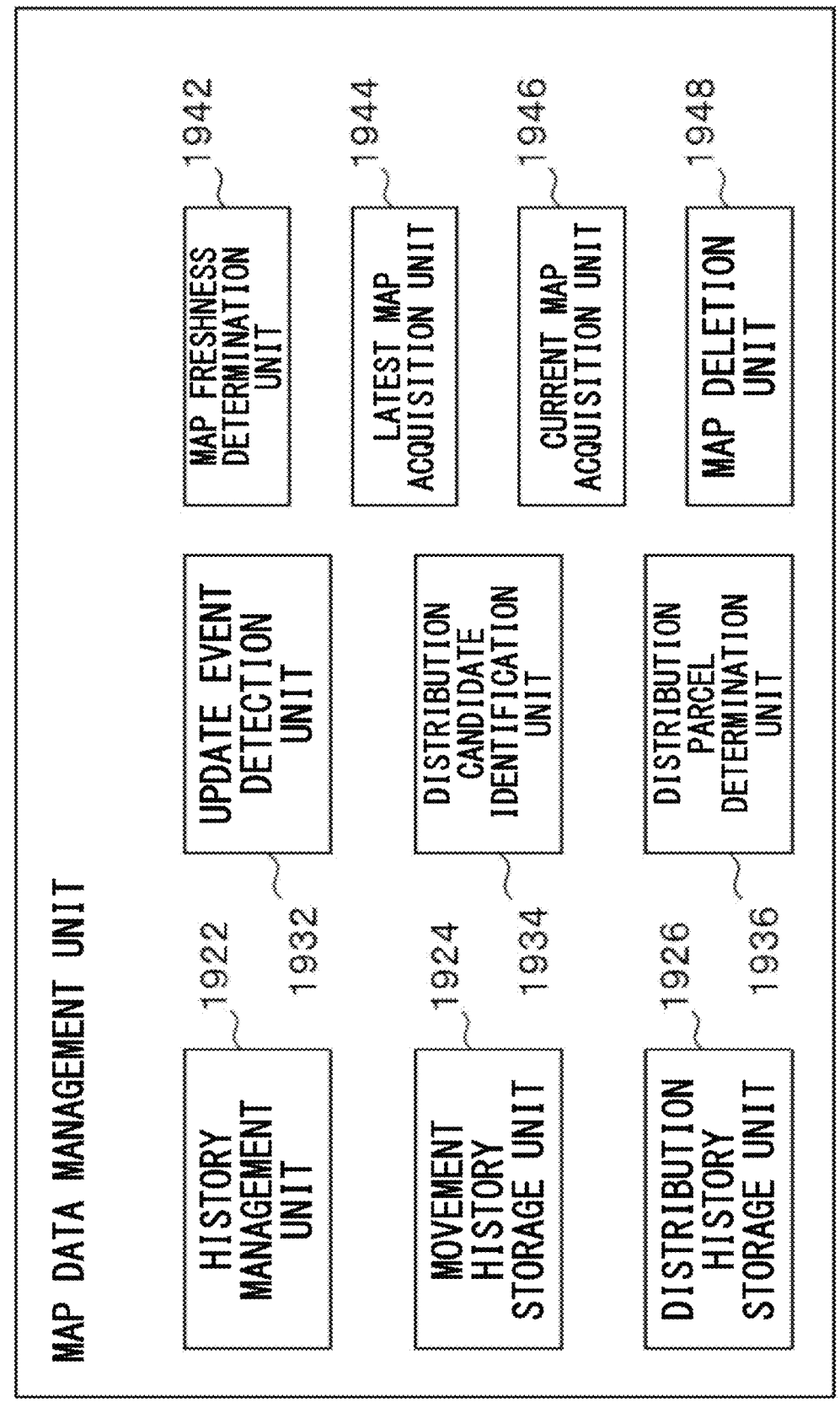
FIG. 19 schematically shows an example of an internal configuration of a map data management unit 1234.

FIG. 19 schematically shows an example of an internal configuration of a map data management unit 1234. In the present embodiment, the map data management unit 1234 includes, for example, a history management unit 1922, a movement history storage unit 1924, and a distribution history storage unit 1926. The map data management unit 1234 may include an update event detection unit 1932, a distribution candidate identification unit 1934, and a distribution parcel determination unit 1936. The map data management unit 1234 may include a map freshness determination unit 1942, a latest map acquisition unit 1944, a current map acquisition unit 1946, and a map deletion unit 1948.

In the present embodiment, the history management unit 1922 manages history information indicating various types of history in relation to the navigation device 182. In the present embodiment, the movement history storage unit 1924 stores movement history information indicating a history of the location change of the navigation device 182. In the present embodiment, the distribution history storage unit 1926 stores distribution history information indicating various types of history in relation to the distribution data acquired from the map distribution server 120 by the navigation device 182.

In one embodiment, the history management unit 1922 acquires information indicating the estimated location of the navigation device 182 from the location estimation unit 1242. The history management unit 1922 associates and stores, in the movement history storage unit 1924, the information indicating the time and the information indicating the estimated location of the navigation device 182 at the time. The history management unit 1922 may determine the road link ID of the road on which the vehicle 180 is traveling based on the estimated location of the navigation device 182. The history management unit 1922 may associate and store, in the movement history storage unit 1924, (i) the information indicating the time, and (ii) at least one of the information indicating the estimated location of the navigation device 182 at the time, and the road link ID of the road on which the vehicle 180 is traveling at the time.

In another embodiment, the history management unit 1922 associates and stores, in the distribution history storage unit 1926, (i) identification information of data acquired from the map distribution server 120 by at least one of the latest map acquisition unit 1944 and the current map acquisition unit 1946, from among the data constituting the distribution map data set stored in the map distribution server 120, and (ii) information indicating the acquisition time when the data is acquired, or information indicating the creation time or the update time of the data. The history management unit 1922 may associate and store, in the distribution history storage unit 1926, (i) identification information of data acquired from the map distribution server 120 by at least one of the latest map acquisition unit 1944 and the current map acquisition unit 1946, from among the data constituting the distribution map data set stored in the map distribution server 120, (ii) information indicating the acquisition time when the data is acquired, or information indicating the creation time or the update time of the data, and (iii) information indicating the communication state of the communication network 10 of when the data is acquired.

In the present embodiment, the update event detection unit 1932 detects various events that trigger the update processing of the map. An example of the above-mentioned events includes facts that: the navigation device 182 has been started; the location of the navigation device 182 has been moved; the scale change button 1580 has been manipulated on the screen 1500; the map update button 1582 has been selected on the screen 1500; a predetermined period has passed since the previous update; and a rerouting processing has started, or the like.

When the update event is detected, the update event detection unit 1932 may output, to the distribution candidate identification unit 1934, information indicating that the update event has been detected. When the update event is detected, the update event detection unit 1932 may output, to the distribution candidate identification unit 1934, information indicating that the update event has been detected, and information indicating a type of the update event.

In the present embodiment, the distribution candidate identification unit 1934 identifies a basic parcel which is a candidate for a basic parcel that requests the map distribution server 120 for the transmission. In one embodiment, when the determination processing of the set route 1610 is executed, or when path guidance processing based on the set route 1610 is executed, the distribution candidate identification unit 1934 identifies the various basic parcels described with reference to FIG. 16 as the candidates for the basic parcel that requests the map distribution server 120 for the transmission.

In another embodiment, when the determination processing of the set route 1610 is not executed, or when the path guidance processing based on the set route 1610 is not executed, the distribution candidate identification unit 1934 identifies a basic parcel for which the map data has been acquired during a specific period in the past as the candidate for the basic parcel that requests the map distribution server 120 for the transmission.

In the present embodiment, the distribution parcel determination unit 1936 determines one or more basic parcels that request the map distribution server 120 for the transmission from among one or more basic parcels identified by the distribution candidate identification unit 1934. For example, the distribution parcel determination unit 1936 may determine, from among the one or more basic parcels identified by the distribution candidate identification unit 1934, the one or more basic parcels that request the map distribution server 120 for the transmission by excluding at least one of (i) a basic parcel for which the latest map data has already been acquired, and (ii) a basic parcel which belongs to a specific parcel level.

In one embodiment, for example, when the distribution candidate identification unit 1934 identifies, as the above-mentioned candidate, a basic parcel located around the vehicle 180, a basic parcel located around the path of vehicle 180, and a basic parcel located around the designated place, the distribution parcel determination unit 1936 determines, from among the parcel levels from level 5 to level −1, a basic parcel belonging to parcel levels that include the map data represented by the vector data as the basic parcel that requests the map distribution server 120 for the transmission.

As described above, in the present embodiment, the parcel levels including the map data represented by the vector data are the parcel levels from level 5 to level 0. Thereby, it is possible to reduce an amount of the communication, and to effectively use resources of the navigation device 182.

In another embodiment, when the scale change button 1580 on the screen 1500 is manipulated and the data of the parcel level of level-1 is requested, the distribution parcel determination unit 1936 determines the basic parcel belonging to the parcel level of level-1 as the basic parcel that requests the map distribution server 120 for the transmission. This enables detailed map data represented by the raster data to be acquired as needed.

In the present embodiment, the map freshness determination unit 1942 determines whether the map distribution server 120 has stored map data newer than the map data stored in the distribution data storage unit 1316. For example, the map freshness determination unit 1942 refers to the distribution history storage unit 1926 to acquire information indicating the acquisition time, or the creation time or the update time of the map data stored in the distribution data storage unit 1316. The map freshness determination unit 1942 transmits the generation transmission request described above to the map distribution server 120. When receiving the generation transmission request, the map distribution server 120 transmits, as a response to the generation transmission request, information on the generation of the map data in the state in which the distribution is possible in the map distribution server 120.

The map freshness determination unit 1942 compares the generation of the map data that can be distributed in the map distribution server 120 with the acquisition time, or the creation time or the update time of the map data stored in the distribution data storage unit 1316. This enables the map freshness determination unit 1942 to determine whether the map distribution server 120 has stored a distribution data set (sometimes referred to as the latest data set) created or updated at a time later than the acquisition time, or the creation time or the update time of the map data stored in the distribution data storage unit 1316.

In the present embodiment, the latest map acquisition unit 1944 accesses the map distribution server 120 to acquire data constituting the latest data set stored in the map distribution server 120. When the map freshness determination unit 1942 determines that the map distribution server 120 has stored the latest data set, the latest map acquisition unit 1944 may acquire the data of the basic parcel determined by the distribution parcel determination unit 1936.

For example, the distribution candidate identification unit 1934 may identify the basic parcel for which the map data has been acquired during the specific period in the past as the candidate for the basic parcel that requests the map distribution server 120 for the transmission. This enables the latest map acquisition unit 1944 to acquire the map data of the above-mentioned basic parcel prior to the movement of the vehicle 180.

Further, even at a point for which the map data has been acquired during the specific period in the past, when the communication state at the point is unstable, there is a possibility that the map data during current traveling cannot be acquired. However, with the present embodiment, the distribution candidate identification unit 1934 acquires, in advance, the data of the point for which the map data has been acquired during the specific period in the past, and thus the map data can be acquired more reliably.

Note that in a case where the information indicating a communication state when the map data was acquired during the specific period in the past is stored, the distribution candidate identification unit 1934 may not acquire, from among the data constituting the latest data set, data of a region where the communication state when the map data was acquired during the specific period in the past satisfies a predetermined communication condition. An example of the above-mentioned communication condition includes a case where the communication state is not poor, a case where the communication state is good, or the like.

In this case, a probability that the distribution candidate identification unit 1934 can acquire the data also during the current traveling is comparatively high. Therefore, the distribution candidate identification unit 1934 may consider a possibility that the data cannot be acquired and a possibility that the data acquired in advance becomes useless, and determine whether to acquire the data of the region where the communication state when the map data was acquired during the specific period in the past satisfies a predetermined communication condition.

In the present embodiment, the current map acquisition unit 1946 accesses the map distribution server 120 to acquire data constituting a distribution data set (sometimes referred to as a current data set) of the same generation or the version as the map data stored in the distribution data storage unit 1316. In a case where the map distribution server 120 has stored the current data set as a data set that can be distributed, the current map acquisition unit 1946 may acquire the data of the basic parcel determined by the distribution parcel determination unit 1936. The current map acquisition unit 1946 may acquire, from the map freshness determination unit 1942, information indicating whether the map distribution server 120 has stored the current data set.

The current map acquisition unit 1946 may acquire the data of the basic parcel determined by the distribution parcel determination unit 1936. The basic parcel for which the data is to be acquired by the current map acquisition unit 1946 may be the same as the basic parcel for which the data is to be acquired by the latest map acquisition unit 1944. Some of one or more basic parcels for which the data is to be acquired by the current map acquisition unit 1946 may be the same as the basic parcels for which the data is to be acquired by the latest map acquisition unit 1944.

In one embodiment, for example, when an amount of the map data to be acquired by the latest map acquisition unit 1944 is great, it takes time for the plotting control unit 1246 to plot the map image by using the latest distribution data. In this case, the plotting control unit 1246 plots the map image by using the pre-installed data set stored in the pre-installed data storage unit 1314 until download of the latest distribution data is completed.

However, for example, when the number of the basic parcels for which the current distribution data has not been acquired is small among the basic parcels determined by the distribution parcel determination unit 1936, the current map acquisition unit 1946 acquires the current data of the basic parcel for which the current distribution data has not been acquired. This enables the plotting control unit 1246 to plot the map image by using the current distribution data. Even the current distribution data is newer than the pre-installed data set, and thus the user experience is enhanced.

In another embodiment, when the path guidance processing based on the set route 1610 is not executed, the distribution candidate identification unit 1934 identifies the basic parcel for which the map data has been acquired during the specific period in the past as the candidate for the basic parcel that requests the map distribution server 120 for the transmission. The basic parcel for which the map data has been acquired during the specific period in the past is, for example, a basic parcel located around the past travel route of the vehicle 180.

For example, in a case where the vehicle 180 travels back and forth between two points, the vehicle 180 that has been traveling along the past travel route may deviate, on a return route, from the past travel route and keep on traveling. In such a case, distribution candidate identification unit 1934 identifies, as the candidate for the basic parcel that requests the map distribution server 120 for the transmission, (i) not only the basic parcel for which the map data has been acquired during the specific period in the past, (ii) but also a basic parcel corresponding to a geographic range where a location relationship with the navigation device 182 satisfies a predetermined condition (sometimes referred to as a second location condition).

The basic parcel corresponding to the above geographic range may be (i) a basic parcel including the geographic range, or may be (ii) a basic parcel which belongs to a specific parcel level among the basic parcels including the geographic range. An example of the above-mentioned second location condition includes a condition as a geographic range having a predetermined shape and size with respect to the navigation device 182.

In this case, the latest map acquisition unit 1944 acquires, from among the data constituting the latest data set, data corresponding to the data of the distribution map data set acquired by the map data management unit 1234 during the specific period in the past. Further, the latest map acquisition unit 1944 acquires, from among the data constituting the latest data set, data corresponding to the geographic range where the location relationship with the navigation device 182 satisfies the second location condition.

On the other hand, the current map acquisition unit 1946 acquires, from among the data constituting the current data set, the data corresponding to the geographic range where the location relationship with the navigation device 182 satisfies the second location condition. This enables the plotting control unit 1246 to continue plotting the map image based on the current distribution data until the download of the data by the latest map acquisition unit 1944 is completed. Therefore, for example, even when the vehicle 180 that has once deviated from the past travel route returns to the past travel route, a switching frequency for the plotting mode of the plotting control unit 1246 is reduced.

In the present embodiment, the map deletion unit 1948 deletes at least a part of the distribution data stored in the distribution data storage unit 1316. For example, it is also conceivable that the map deletion unit 1948 deletes the entire distribution data stored in the distribution data storage unit 1316 when the map freshness determination unit 1942 determines that the map distribution server 120 has stored the latest data set. However, as described above, in the present embodiment, the plotting control unit 1246 may continue plotting the map image based on the current distribution data during the download of the data constituting the latest data set.

Then, with the present embodiment, the map deletion unit 1948 deletes, from among the data constituting the latest data set, data of the current data set stored in the distribution data storage unit 1316 at least after acquisition processing of data that satisfies a predetermined acquisition condition is completed. An example of the above-mentioned acquisition condition includes a condition that the data corresponds to an area which is inside a geographic range having a predetermined shape and size with respect to the location of the navigation device 182, and for which the data constituting the current data set has been acquired by the map data management unit 1234 during the specific period in the past.

The size of the above-mentioned geographic range is not particularly limited, but the size of the above-mentioned geographic range may be the same degree as at least one of the target area 1622 and the target area 1652 described with reference to FIG. 16. The size of the above-mentioned geographic range may be greater than at least one of the target area 1622 and the target area 1652 described with reference to FIG. 16. Thereby, from among the basic parcels located to be farther from the vehicle 180 in comparison with the basic parcels around the vehicle 180, data of a basic parcel including a geographic range where the vehicle 180 is likely to travel is acquired prior to the movement of the vehicle 180.

For example, from among the basic parcels located around the past travel route of the vehicle 180, download of the latest data on all basic parcels in which at least some of the basic parcels are included inside a square geographic range that has a side of 20 km and that has the host vehicle location of the vehicle 180 as the center is ended, and then the map deletion unit 1948 deletes the data of the current data set stored in the distribution data storage unit 1316. Note that at this time, the data of the latest data set for which the download has been completed is stored in the distribution data storage unit 1316.

The history management unit 1922 may be an example of a location information acquisition unit or a communication information acquisition unit. The map freshness determination unit 1942 may be an example of a determination unit, a first determination unit, or a second determination unit. The latest map acquisition unit 1944 may be an example of a map acquisition unit. The current map acquisition unit 1946 may be an example of a map acquisition unit. The information indicating the estimated location of the navigation device 182 may be an example of location information. The estimated location of the navigation device 182 may be an example of a location of a user.

Figure 20:
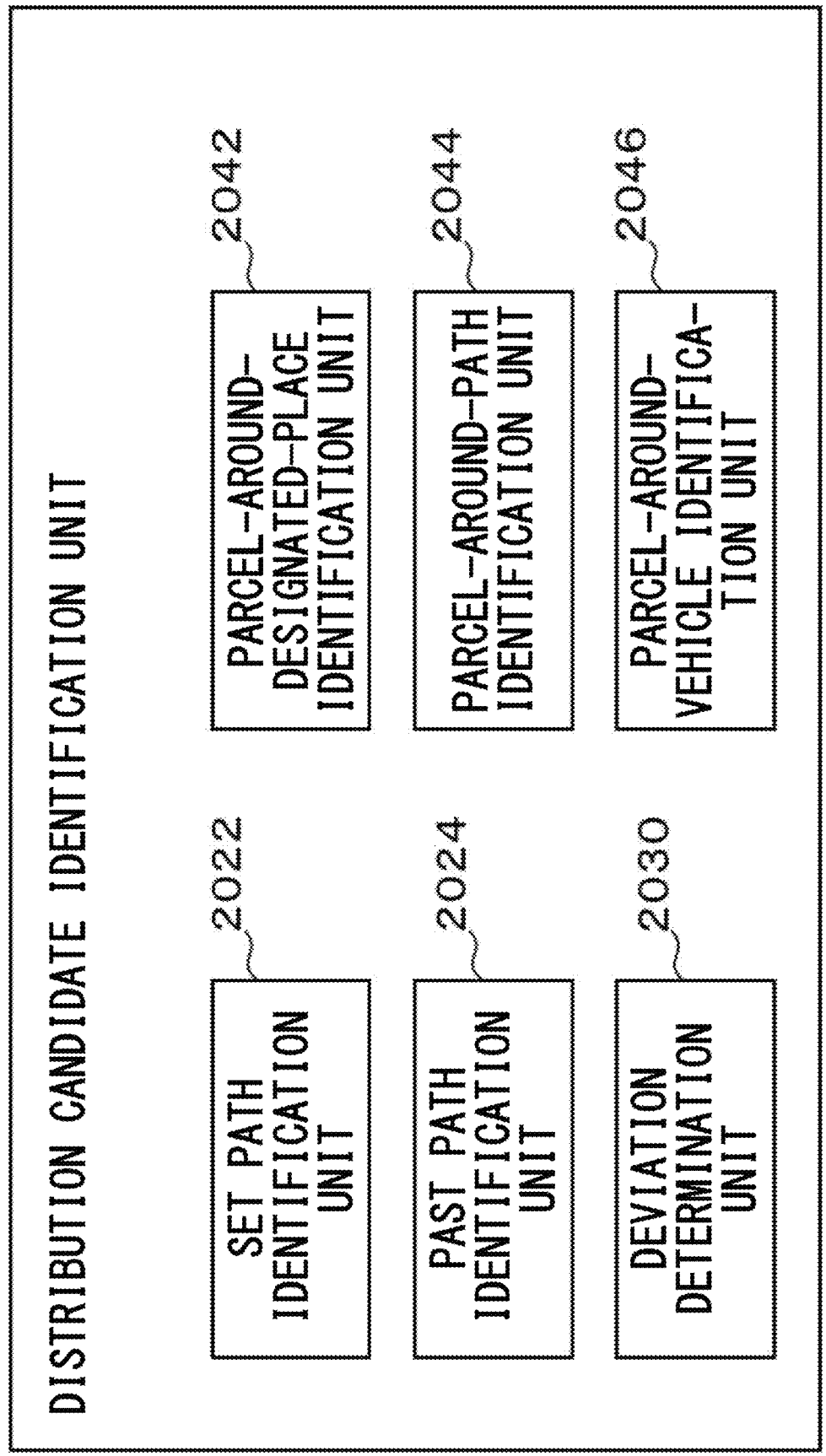
FIG. 20 schematically shows an example of an internal configuration of a distribution candidate identification unit 1934.

FIG. 20 schematically shows an example of an internal configuration of a distribution candidate identification unit 1934. In the present embodiment, the distribution candidate identification unit 1934 includes, for example, a set path identification unit 2022, a past path identification unit 2024, and a deviation determination unit 2030. The distribution candidate identification unit 1934 may include a parcel-around-a designated place identification unit 2042, a parcel-around-a path identification unit 2044, and a parcel-around-a vehicle identification unit 2046.

In the present embodiment, the set path identification unit 2022 identifies the set route 1610 to the destination. For example, the set path identification unit 2022 acquires the information indicating the set route 1610 from the road guidance unit 1244.

In the present embodiment, the past path identification unit 2024 identifies the past travel route of the vehicle 180. For example, the past path identification unit 2024 identifies, as a past travel route, one or more basic parcels for which the data has been acquired by the map data management unit 1234 during the specific period in the past.

In the present embodiment, the deviation determination unit 2030 compares the location of the vehicle 180 estimated by the location estimation unit 1242 with the past travel route identified by the past path identification unit 2024, and determines whether a current travel route of the vehicle 180 deviates from the past travel route. The deviation determination unit 2030 may output information indicating a determination result to the parcel-around-a path identification unit 2044. As described above, the range of the candidate for the basic parcel that requests the map distribution server 120 for the transmission may vary depending on whether the current travel route of the vehicle 180 deviates from the past travel route.

For example, the deviation determination unit 2030 determines whether the current travel route of vehicle 180 deviates from the past travel route by determining whether the location relationship between the location of the vehicle 180, and a location of the vehicle 180 on a movement path during the specific period in the past satisfies a first location condition. An example of the first location condition includes at least one of (i) a condition that a distance between the vehicle 180, and the location of the vehicle 180 on the movement path during the specific period in the past is greater than a predetermined value, and (ii) a condition that a probability that the vehicle 180 moves, from the location of the vehicle 180 estimated by the location estimation unit 1242, onto the movement path of the vehicle 180 during the specific period in the past is smaller than a predetermined value. The above-mentioned probability is determined, for example, based on the location relationship between the vehicle 180 and the past travel route of the vehicle 180, a type of the road on which the vehicle 180 is traveling, an advance direction of the vehicle 180, or the like.

In the present embodiment, the parcel-around-a designated place identification unit 2042 identifies a basic parcel located around a point designated by the occupant 18 (sometimes referred to as a designated place) as the candidate for the basic parcel that requests the map distribution server 120 for the transmission. An example of the points designated by the occupant 18 includes a departure place, a destination, an intermediate place, a POI (point of interest), or the like. The basic parcel located around the designated place may be a basic parcel that includes a geographic range having a predetermined shape and size with respect to the designated place. Thereby, the target parcel 1624 and the target parcel 1634 described with reference to FIG. 16 are, for example, identified as the candidates for the above-mentioned basic parcel.

In the present embodiment, the parcel-around-a path identification unit 2044 identifies a basic parcel located around the set route identified by the set path identification unit 2022 as the candidate for the basic parcel that requests the map distribution server 120 for the transmission. The basic parcel located around the set route may be a basic parcel that includes a geographic range having a predetermined shape and size with respect to each of a plurality of points on the set route. Thereby, the target parcel 1644 described with reference to FIG. 16 is, for example, identified as a candidate for the above-mentioned basic parcel.

In the present embodiment, the parcel-around-a path identification unit 2044 identifies a basic parcel located around the past travel route identified by the past path identification unit 2024 as the candidate for the basic parcel that requests the map distribution server 120 for the transmission. The basic parcel located around the past travel route may be a basic parcel that includes a geographic range having a predetermined shape and size with respect to each of a plurality of points on the past travel route.

As described above, the parcel-around-a path identification unit 2044 may identify, from among the basic parcels located around the past travel route identified by the past path identification unit 2024, a basic parcel in which a communication state of a region corresponding to the basic parcel does not satisfy a predetermined communication condition as the candidate for the basic parcel that requests the map distribution server 120 for the transmission. As described above, an example of the above-mentioned communication condition includes a case where the communication state is not poor, a case where the communication state is good, or the like.

The parcel-around-a vehicle identification unit 2046 identifies a basic parcel located around the current location of the vehicle 180 as the candidate for the basic parcel that requests the map distribution server 120 for the transmission. The basic parcel located around the current location of the vehicle 180 may be a basic parcel that includes a geographic range having a predetermined shape and size with respect to the location of the vehicle 180 estimated by the location estimation unit 1242.

The deviation determination unit 2030 may be an example of a deviation determination unit. The location of the vehicle 180 may be an example of the location of the user. The movement path of the vehicle 180 may be an example of a movement path of the user. The location of the navigation device 182 may be an example of the location of the user. The movement path of the navigation device 182 may be an example of the movement path of the user.

Figure 21:
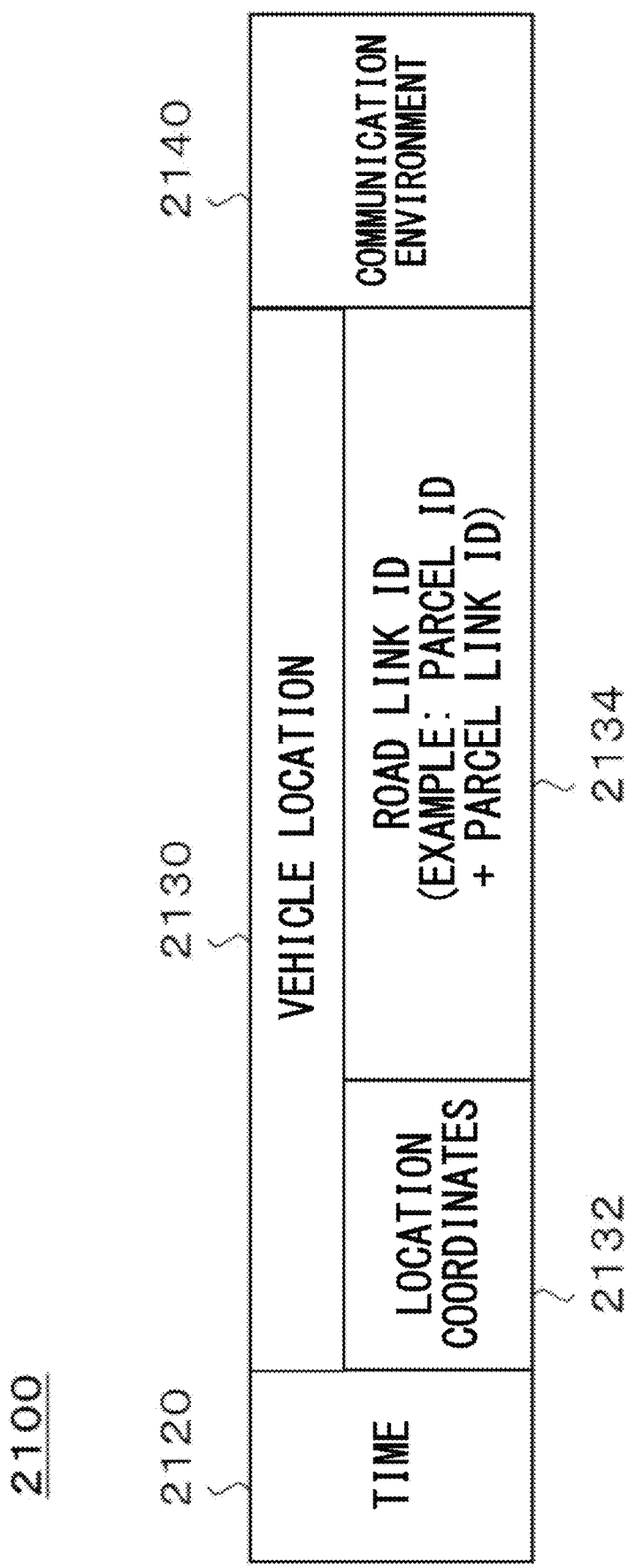
FIG. 21 schematically shows an example of a data structure of movement history data 2100.

FIG. 21 schematically shows an example of a data structure of movement history data 2100. In the movement history data 2100 in the present embodiment, a time 2120, a vehicle location 2130, and a communication environment 2140 are associated with each other and stored. The vehicle location 2130 may be represented by location coordinates 2132 of the location of the vehicle 180 estimated by the location estimation unit 1242, or may be represented by a road link ID 2134 of the road on which the vehicle 180 is traveling.

FIG. 22 schematically shows an example of a data structure of distribution history data 2200. In the distribution history data 2200 in the present embodiment, a distribution time 2220 at which each piece of the data is distributed, generation information 2230 indicating the generation or the version of each piece of the data, a parcel level 2240 of each piece of the data, and a parcel ID 2250 of each piece of the data are associated with each other and stored.

In FIG. 22, a record 2262 shows a distribution history of data constituting the n−1th generation data set 324 updated in December 2019. Further, the record 2262 shows a distribution history of data constituting the nth generation data set 322 updated in February 2020. For example, the distribution data storage unit 1316 can refer to the distribution history data 2200 to associate and store the data acquired from the map distribution server 120 by the map data management unit 1234, and the acquisition time of the data, or the creation time or the update time of the data.

The distribution time 2220 may be an example of the acquisition time. The distribution time included in the record 2262 may be an example of the first acquisition time. The distribution time included in a record 2264 may be an example of the second acquisition time. The generation information 2230 may be an example of the information indicating the creation time or the update time.

Figure 23:
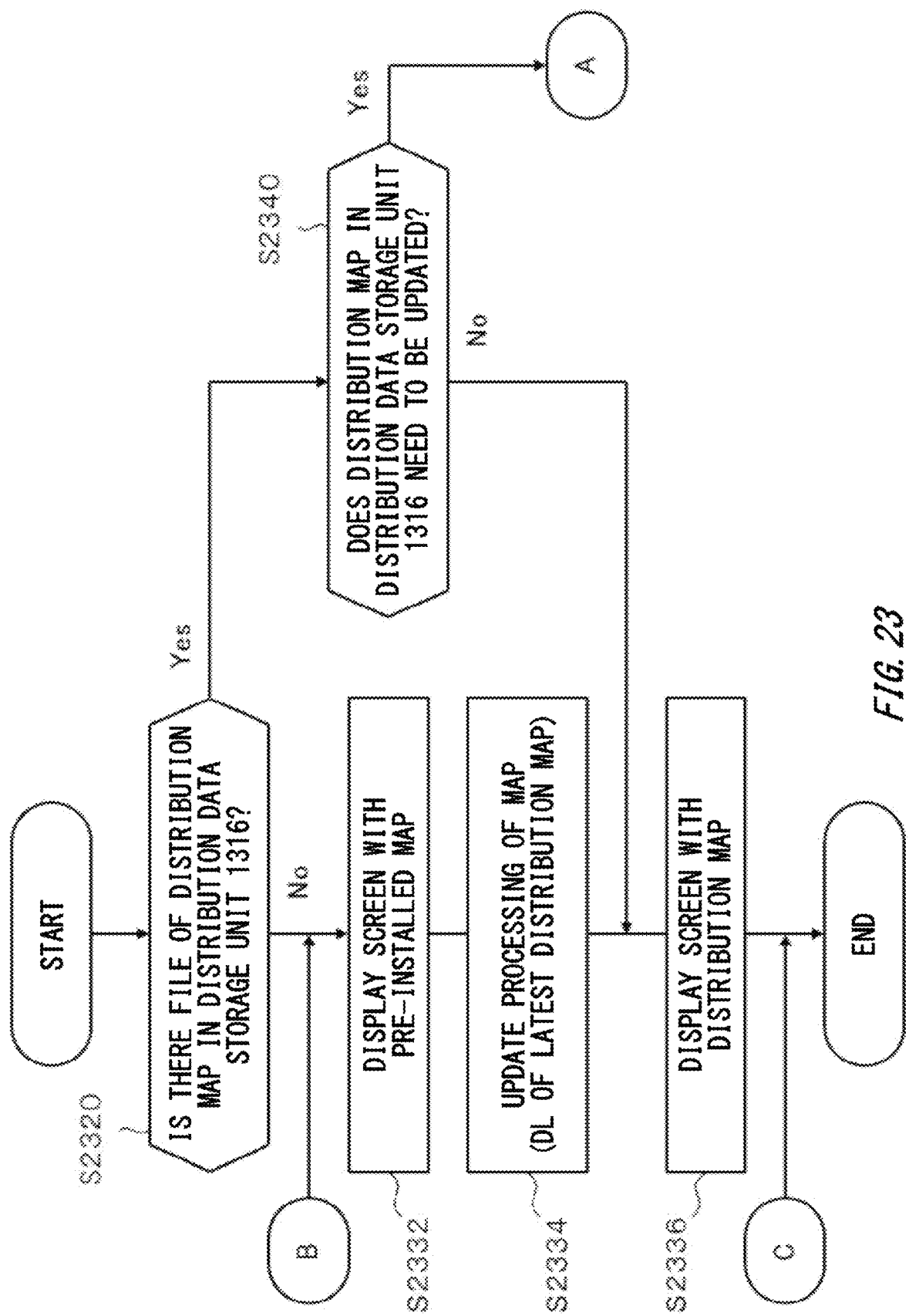
FIG. 23 schematically shows examples of map update processing and map display processing.

An example of map update processing and map display processing in the navigation device 182 will be described by using FIG. 23 and FIG. 24. Note that in the descriptions of FIG. 23 and FIG. 24, a step may be abbreviated as s.

With the present embodiment, the above-mentioned processing starts, for example, in response to the update event detection unit 1932 detecting the update event. As shown in FIG. 23, in S2320, for example, the map data management unit 1234 determines whether the data constituting the distribution data set acquired from the map distribution server 120 in the past is stored in the distribution data storage unit 1316.

If it is determined that the data constituting the distribution data set acquired from the map distribution server 120 in the past is not stored in the distribution data storage unit 1316 (if No in S2320), the plotting control unit 1246 plots the map image 1510 in S2332 in the first plotting mode in which the map image 1510 of the screen 1500 is plotted based on the map data stored in the pre-installed data storage unit 1314. The plotting control unit 1246 causes the touch display 1212 to display the screen 1500 including the map image 1510 plotted in the first plotting mode via the input/output control unit 1222.

The plotting control unit 1246 may cause the screen 1500 including the map image 1510 plotted in the first plotting mode to be displayed until the acquisition processing of the data satisfying the predetermined acquisition condition is completed. An example of the above-mentioned acquisition condition includes (i) a condition that the data corresponds to an area inside a geographic range having a predetermined shape and size with respect to the location of the navigation device 182, (ii) a condition that the data corresponds to an area which is inside a geographic range having a predetermined shape and size with respect to the location of the navigation device 182, and for which the data constituting the current data set has been acquired by the map data management unit 1234 during the specific period in the past, or the like.

After the acquisition processing of the data is completed, the plotting control unit 1246 may cause the touch display 1212 to display the screen 1500 including the map image 1510 plotted in the first plotting mode until a predetermined switching condition is established. An example of the above-mentioned switching condition includes at least one of (i) a condition that the road guidance unit 1244 does not provide the guidance through the path to the destination designated by the occupant 18, and (ii) a condition that in a case where the road guidance unit 1244 provides the guidance through the path to the destination designated by the occupant 18, and a distance between the vehicle 180, and a predetermined point or a predetermined type of point is smaller than a predetermined value, a condition that the occupant 18 is not manipulating the navigation device 182, (iv) a condition that the navigation device 182 is running, and (v) a condition that a degree of a difference between the screen based on the pre-installed data set and the screen based on the latest distribution data set acquired by the data acquisition processing is smaller than a predetermined reference. The condition that the navigation device 182 is running may include a condition that a start manipulation by the occupant 18 is detected.

As described above, with the present embodiment, after the data acquisition processing is completed, a timing when switching processing of the data used to plot the map screen is executed is adjusted. This suppresses, for example, a sudden switch of the map while the navigation device 182 provides the guidance through the path to the destination. As a result, it is possible to prevent a confusion of the occupant 18, and to provide the guidance through the path more safely.

Further, with the present embodiment, for example, the switching processing of the map data is not executed until the condition that the occupant 18 is not manipulating the navigation device 182 is established. This enables suppression of a sudden switch of the map while the occupant 18 is manipulating the navigation device 182. As a result, usability of the navigation device 182 is enhanced.

In particular, when the map is suddenly switched while the occupant 18 is manipulating the screen of the navigation device 182, the usability of the navigation device 182 is reduced. For example, when the map suddenly switches while the occupant 18 scrolls and browses the map displayed on the touch display 1212, the usability of the navigation device 182 is greatly reduced. With the present embodiment, the switching processing of the map data is executed when the occupant 18 is not manipulating the screen, and thus it is possible to greatly suppress the reduction of the usability of the navigation device 182.

Note that even during the period when the road guidance unit 1244 provides the guidance through the path to the destination designated by the occupant 18, for example, in a case where a distance between the vehicle 180 and an intersection is greater than a predetermined value, even executing the switching processing of the data which is used to plot the map screen does not significantly affect a determination of occupant 18. Therefore, the latest data can be used at an earlier timing while safety of the occupant 18 is ensured. The above-mentioned intersection may be an intersection on which the guidance image is displayed.

The plotting control unit 1246 may verify, before executing the switching processing of the map data, the degree of the difference between the screen based on the pre-installed data set and the screen based on the latest distribution data set acquired by the data acquisition processing. When the above-mentioned difference is smaller than a predetermined reference, even executing the switching processing of the data which is used to plot the map screen does not significantly affect a determination of occupant 18. Therefore, the latest data can be used at an earlier timing while safety of the occupant 18 is ensured. The above-mentioned intersection may be an intersection on which the guidance image is displayed.

Then, in S2334, the update processing of the map is executed. For example, the distribution candidate identification unit 1934 identifies, according to the situation of the navigation device 182, the basic parcel which is the candidate for the basic parcel that requests the map distribution server 120 for the transmission. Further, the distribution parcel determination unit 1936 determines the basic parcel that requests the map distribution server 120 for the transmission from among the basic parcels that are the candidates for the basic parcel and that are identified by the distribution candidate identification unit 1934. The map data management unit 1234 generates the map transmission request based on a determination result of the distribution parcel determination unit 1936, and transmits the map transmission request, to the map distribution server 120.

When acquiring the map transmission request from the navigation device 182, the map distribution server 120 transmits the data of the basic parcel indicated by the map transmission request, to the navigation device 182. When acquiring data from the map distribution server 120, the map data management unit 1234 stores the data in the distribution data storage unit 1316. Further, the map data management unit 1234 creates the distribution history information and stores the distribution history information in the distribution history storage unit 1926.

Then, in S2336, when the acquisition processing of the data satisfying the above-mentioned acquisition condition is completed, the plotting control unit 1246 plots the map image 1510 in the second plotting mode in which the map image 1510 of the screen 1500 is plotted based on the map data stored in the distribution data storage unit 1316. The plotting control unit 1246 causes the touch display 1212 to display the screen 1500 including the map image 1510 plotted in the second plotting mode via the input/output control unit 1222.

Note that in S2336, the plotting control unit 1246 may cause the touch display 1212 to display the screen 1500 including the map image 1510 plotted in the second plotting mode after the acquisition processing of the data satisfying the above-mentioned acquisition condition is completed and the above-mentioned switching condition is established. This ends the process.

On the other hand, if it is determined that the data constituting the distribution data set acquired from the map distribution server 120 in the past is stored in the distribution data storage unit 1316 (if Yes in S2320), the map data management unit 1234 determines, in S2340, whether the data stored in the distribution data storage unit 1316 needs to be updated. If it is determined that the data stored in the distribution data storage unit 1316 does not need to be updated (if No in S2340), the processing of S2336 is executed. If it is determined that the data stored in the distribution data storage unit 1316 needs to be updated (if Yes in S2340), processing of A described with reference to FIG. 24 is executed.

Figure 24:
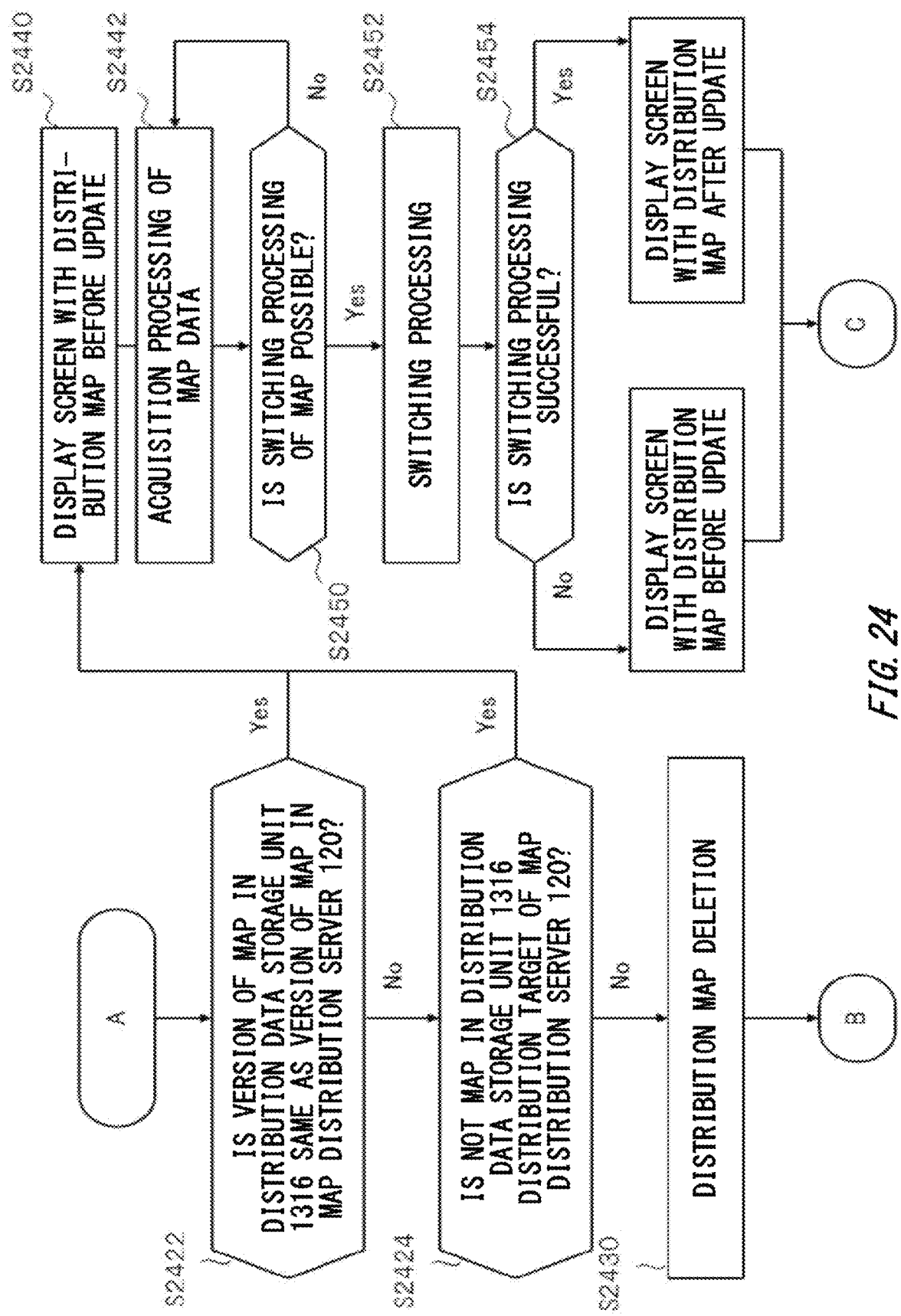
FIG. 24 schematically shows examples of map update processing and map display processing.

As shown in FIG. 24, in S2422, the map freshness determination unit 1942 compares the generation or the version of the current data stored in the distribution data storage unit 1316 with the generation or the version of the latest data set stored in the map distribution server 120. If both do not match (if No in S2422), the map freshness determination unit 1942 determines, in S2424, whether the generation or the version of the current data is a generation or a version that can be distributed by the map distribution server 120. The generation or the version that can be distributed by the map distribution server 120 may be referred to as the coverage of the map distribution server 120.

For example, when the generation or the version that can be distributed by the map distribution server 120 is older than the generation or the version of the current data, the map freshness determination unit 1942 determines that the generation or the version of the current data is not the generation or the version that can be distributed by the map distribution server 120. Further, when the generation or the version of the current data is older than the oldest generation or version among the generations or the versions that can be distributed by the map distribution server 120, the map freshness determination unit 1942 determines that the generation or the version of the current data is not the generation or the version that can be distributed by the map distribution server 120.

If it is determined that the generation or the version of the current data is not the generation or the version that can be distributed by the map distribution server 120 (if YES in S2424), that is, when it is determined that the map distribution server 120 has stored the latest data set and that the map distribution server 120 has not stored the current data set, the map deletion unit 1948 deletes, in 52430, the data stored in the distribution data storage unit 1316. Further, the map deletion unit 1948 may update the distribution history data 2200 stored in the distribution history storage unit 1926 to delete a record corresponding to the data deleted at this time.

After the above-mentioned deletion processing is completed, the processing of S2332 may be executed. Thereby, among the data constituting the latest data set stored in the map distribution server 120, the acquisition processing of the data on at least some basic parcel identified by the distribution candidate identification unit 1934 according to the situation of the navigation device 182 is executed. For example, the acquisition processing of the data on at least some of basic parcel located around the set route, the basic parcel located around the past travel route, the basic parcel located around the host vehicle location, and the basic parcel located around the designated place is executed.

On the other hand, if Yes in S2422 or if No in S2424, the plotting control unit 1246 plots, in S2440, the map image 1510 of the screen 1500 based on the current map data stored in the distribution data storage unit 1316. The plotting control unit 1246 causes the touch display 1212 to display the screen 1500 including the map image 1510 via the input/output control unit 1222.

The plotting control unit 1246 may cause the screen 1500, including the map image 1510 plotted based on the current map data stored in the distribution data storage unit 1316, to be displayed until the acquisition processing of the data satisfying a predetermined acquisition condition is completed. An example of the above-mentioned acquisition condition includes (i) a condition that the data corresponds to an area inside a geographic range having a predetermined shape and size with respect to the location of the navigation device 182, (ii) a condition that the data corresponds to an area which is inside a geographic range having a predetermined shape and size with respect to the location of the navigation device 182, and for which the data constituting the current data set has been acquired by the map data management unit 1234 during the specific period in the past, or the like.

Then, in S2442, the acquisition processing of the map data is executed. For example, the distribution candidate identification unit 1934 identifies, according to the situation of the navigation device 182, the basic parcel which is the candidate for the basic parcel that requests the map distribution server 120 for the transmission. Further, the distribution parcel determination unit 1936 determines the basic parcel that requests the map distribution server 120 for the transmission from among the basic parcels that are the candidates for the basic parcel and that are identified by the distribution candidate identification unit 1934. The map data management unit 1234 generates the map transmission request based on the determination result of the distribution parcel determination unit 1936, and transmits the map transmission request, to the map distribution server 120.

When acquiring the map transmission request from the navigation device 182, the map distribution server 120 transmits the data of the basic parcel indicated by the map transmission request, to the navigation device 182. When acquiring data from the map distribution server 120, the map data management unit 1234 stores the data in the distribution data storage unit 1316. Further, the map data management unit 1234 creates the distribution history information and stores the distribution history information in the distribution history storage unit 1926.

Note that in S2442, the latest map acquisition unit 1944 acquires the data constituting the latest data set. Further, when the current data set can be distributed by the map distribution server 120, the current map acquisition unit 1946 may acquire the data constituting the current data set in parallel with the acquisition processing of the data constituting the latest data set by the latest map acquisition unit 1944.

Then, in S2450, when the acquisition processing of the data satisfying the above-mentioned acquisition condition is completed, the plotting control unit 1246 determines whether the above-mentioned switching condition is established. If it is determined that the switching condition is not established (if No in S2450), the processing of S2442 continues.

If it is determined that the switching condition is established (if Yes in S2450), the plotting control unit 1246 switches, in S2452, the plotting mode of the plotting control unit 1246 from the plotting mode in which the map image 1510 is plotted based on the current map data stored in the distribution data storage unit 1316 to the plotting mode in which the map image 1510 is plotted based on the latest map data stored in the distribution data storage unit 1316. Then, in S2454, the plotting control unit 1246 determines whether the switching of the plotting mode is successful.

If the switching of the plotting mode fails (if No in S2454), the plotting control unit 1246 continues the plotting mode in which the map image 1510 is plotted based on the current map data stored in the distribution data storage unit 1316. Further, the plotting control unit 1246 causes the touch display 1212 to display the screen 1500 including the map image 1510 plotted based on the current map data.

On the other hand, if the switching of the plotting mode is successful (if Yes in S2454), the plotting control unit 1246 plots the map image 1510 based on the latest map data stored in the distribution data storage unit 1316. Further, the plotting control unit 1246 causes the touch display 1212 to display the screen 1500 including the map image 1510 plotted based on the latest map data.

As described with reference to FIG. 3, the map distribution server 120 manages the generation of the data set, and at least a part of the data sets of the multiple generations stored in the storage unit 230 is in the state in which the distribution is possible. However, when the navigation device 182 accesses the map distribution server 120 to acquire the map data or the like, in a case where a long period of time has passed since the navigation device 182 previously acquired the map data or the like, there is a possibility that the data set of the generation stored in the navigation device 182 has already been excluded from the distribution target in the map distribution server 120.

For example, in the embodiment described with reference to FIG. 3, the map distribution server 120 manages the nth generation data set 322 as a data set having a data ID of 0, and manages the n−1th generation data set. 324 as a data set having a data ID of 1. However, it is also conceivable that at a timing when the navigation device 182 previously acquired the map data or the like, the map distribution server 120 managed, for example, the n−5th generation data set as the data set having the data ID of 0.

In such a case, when the map distribution server 120 simply manages the data set by using the data ID, there is a possibility that an inconsistency occurs in the data which is transmitted to the navigation device 182. In contrast, with the present embodiment, for example, in S2424, it is determined whether the generation or the version of the current data stored in the navigation device 182 is the generation or the version that can be distributed by the map distribution server 120. This suppresses the above-mentioned data inconsistency.

FIG. 25 schematically shows an example of a parcel that is a distribution target. As shown in FIG. 25, in the present embodiment, the distribution parcel determination unit 1936 adjusts the level of the parcel that is the distribution target according to the situation of the navigation device 182 and the location relationship between the navigation device 182 and the basic parcel.

With the embodiment described with reference to FIG. 25, when the road guidance unit 1244 provides the guidance through the path to the destination (that is, when the set route 1610 is determined), the distribution parcel determination unit 1936 determines to acquire the data of the basic parcels which are located around the host vehicle location, the set route, and the designated place, and which belong to the parcel levels 0 to 5. Note that in this case, the data of the basic parcel located around the past travel route may not be acquired.

Similarly, in a case where the destination is not set, when the host vehicle location is on the past travel route, or when the deviation between the host vehicle location and the past travel route is moderate, the distribution parcel determination unit 1936 determines to acquire the data of the basic parcels which are located around the host vehicle location, and the designated place, and which belong to the parcel levels 0 to 5. Further, the distribution parcel determination unit 1936 determines to acquire the data of the basic parcel which is located around the past travel route, and which belongs to the parcel level 0.

Similarly, in a case where the destination is not set, when the deviation between the host vehicle location and the past travel route is comparatively great, the distribution parcel determination unit 1936 determines to acquire the data of the basic parcels which are located around the host vehicle location, and the designated place, and which belong to the parcel levels 0 to 5. In this case, since a possibility that the vehicle 180 returns to the past travel route is comparatively small, the distribution parcel determination unit 1936 may not acquire the data of the basic parcel located around the past travel route.

Figure 26:
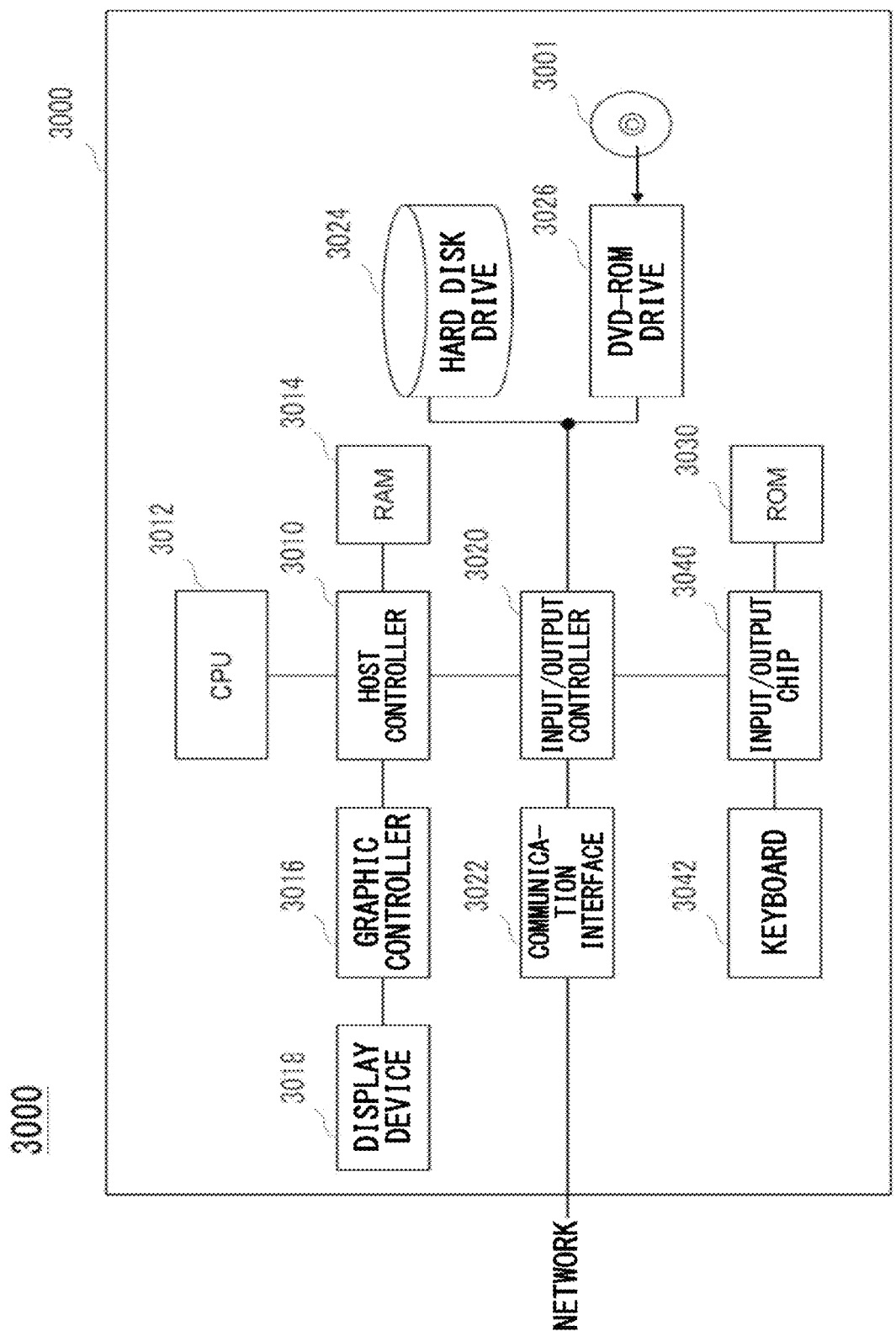
FIG. 26 schematically shows an example of a system configuration of a computer 3000.

FIG. 26 shows an example of a computer 3000 in which a plurality of aspects of the present invention may be embodied entirely or partially. A part of the vehicle 180 may be realized by the computer 3000. A part of the navigation device 182 may be realized by the computer 3000. For example, a controller of the navigation device 182 is realized by the computer 3000. The controller of the navigation device 182 includes, for example, at least one of the input/output control unit 1222, the communication control unit 1224, the storage unit 1232, the map data management unit 1234, the location estimation unit 1242, the road guidance unit 1244, and the plotting control unit 1246.

A program that is installed in the computer 3000 can cause the computer 3000 to function as one or more "sections" in an operation or an apparatus associated with the embodiment of the present invention, or cause the computer 3000 to perform the operation or the one or more sections thereof, and/or cause the computer 3000 to perform processes of the embodiment of the present invention or steps thereof. Such a program may be performed by a CPU 3012 so as to cause the computer 3000 to perform certain operations associated with some or all of the blocks of flowcharts and block diagrams described herein.

The computer 3000 in accordance with the present embodiment includes a CPU 3012, a RAM 3014, a graphic controller 3016, and a display device 3018, which are mutually connected by a host controller 3010. The computer 3000 also includes input/output units such as a communication interface 3022, a hard disk drive 3024, a DVD-ROM drive 3026 and an IC card drive, which are connected to the host controller 3010 via an input/output controller 3020. The computer also includes legacy input/output units such as a ROM 3030 and a keyboard 3042, which are connected to the input/output controller 3020 via an input/output chip 3040.

The CPU 3012 operates according to programs stored in the ROM 3030 and the RAM 3014, thereby controlling each unit. The graphic controller 3016 obtains image data generated by the CPU 3012 on a frame buffer or the like provided in the RAM 3014 or in itself, and causes the image data to be displayed on a display device 3018.

The communication interface 3022 performs communication with other electronic devices via a network. The hard disk drive 3024 stores programs and data that are used by the CPU 3012 within the computer 3000. The DVD-ROM drive 3026 reads the programs or the data from the DVD-ROM 3001, and provides the hard disk drive 3024 with the programs or the data via the RAM 3014. The IC card drive reads programs and data from an IC card, and/or writes programs and data into the IC card.

The ROM 3030 stores therein a boot program or the like that is performed by the computer 3000 at the time of activation, and/or a program depending on the hardware of the computer 3000. The input/output chip 3040 may also connect various input/output units to the input/output controller 3020 via a parallel port, a serial port, a keyboard port, a mouse port or the like.

A program is provided by computer-readable media such as the DVD-ROM 3001 or the IC card. The program is read from the computer-readable media, installed into the hard disk drive 3024, RAM 3014, or ROM 3030, which are also examples of computer-readable media, and performed by the CPU 3012. The information processing described in these programs is read into the computer 3000, resulting in cooperation between a program and the above-mentioned various types of hardware resources. An apparatus or method may be constituted by realizing the operation or processing of information in accordance with the usage of the computer 3000.

For example, when communication is performed between the computer 3000 and an external device, the CPU 3012 may perform a communication program loaded onto the RAM 3014 to instruct communication processing to the communication interface 3022, based on the processing described in the communication program. The communication interface 3022, under control of the CPU 3012, reads transmission data stored on a transmission buffer region provided in a recording medium such as the RAM 3014, the hard disk drive 3024, the DVD-ROM 3001, or the IC card, and transmits the read transmission data to a network or writes reception data received from a network into a reception buffer region or the like provided on the recording medium.

In addition, the CPU 3012 may cause all or a necessary portion of a file or a database to be read into the RAM 3014, the file or the database having been stored in an external recording medium such as the hard disk drive 3024, the DVD-ROM drive 3026 (DVD-ROM 3001), the IC card, etc., and perform various types of processing on the data on the RAM 3014. The CPU 3012 may then write back the processed data to the external recording medium.

Various types of information, such as various types of programs, data, tables, and databases, may be stored in the recording medium to undergo information processing. The CPU 3012 may perform various types of processing on the data read from the RAM 3014, which includes various types of operations, processing of information, condition judging, conditional branch, unconditional branch, search/replace of information, etc., as described throughout this disclosure and designated by an instruction sequence of programs, and writes the result back to the RAM 3014. In addition, the CPU 3012 may search for information in a file, a database, etc., in the recording medium. For example, when a plurality of entries, each having an attribute value of a first attribute associated with an attribute value of a second attribute, are stored in the recording medium, the CPU 3012 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-explained program or software modules may be stored in the computer-readable media on or near the computer 3000. In addition, a recording medium such as a hard disk or a RAM provided in a server system connected to a dedicated communication network or the Internet can be used as the computer-readable media, thereby providing the program to the computer 3000 via the network.

Blocks in the flowcharts and block diagrams of the above-described embodiment may represent steps of processes in which operations are performed or "units" of devices responsible for performing operations. Certain steps and "units" may be implemented by dedicated circuitry, programmable circuitry supplied with computer-readable instructions stored on computer-readable storage media, and/or processors supplied with computer-readable instructions stored on computer-readable storage media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

Computer-readable storage media may include any tangible device that can store instructions for execution by a suitable device. As a result, the computer-readable storage medium having instructions stored in the tangible device comprises an article of manufacture including instructions which can be executed to create means for performing operations specified in the flowcharts or block diagrams. Examples of computer-readable storage media may include an electronic storage medium, a magnetic storage medium, an optical storage medium, an electromagnetic storage medium, a semiconductor storage medium, etc. More specific examples of computer-readable storage media may include a floppy (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY (registered trademark) disc, a memory stick, an integrated circuit card, etc.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, JAVA (registered trademark), C++, etc., and conventional procedural programming languages, such as the "C" programming language or similar programming languages.

Computer-readable instructions may be provided to a processor of a general purpose computer, special purpose computer, or other programmable data processing apparatus, or to programmable circuitry, locally or via a local area network (LAN), wide area network (WAN) such as the Internet, etc., such that it is possible for a processor of a general purpose computer, special purpose computer, or other programmable data processing apparatus, or for programmable circuitry to execute the computer-readable instructions to create means for performing operations specified in the flowcharts or block diagrams. Examples of processors include computer processors, processing units, microprocessors, digital signal processors, controllers, microcontrollers, etc.

While the embodiments of the present invention have been described, the technical scope of the invention is not limited to the above-described embodiments. It is apparent to persons skilled in the art that various alterations and improvements can be added to the above-described embodiments. Further, to the extent that there is no technical contradiction, the matters described for the specific embodiment can be applied to other embodiments. Further, each component may have the feature similar to those of other components having the same names but different reference signs and numerals. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES 10 communication network, 18 occupant, 22 VICS signal, 24 GPS signal, 100 navigation system, 120 map distribution server, 140 path search server, 160 Center, 162 VICS information transmission device, 180 vehicle, 182 navigation device, 184 communication device, 186 receiving device, 188 in-vehicle sensor, 220 communication unit, 230 storage unit, 240 map data management unit, 242 request receiving unit, 244 request response unit, 320 map data storage unit, 322 nth generation data set, 324 n−1th generation data set, 330 navigation guidance data storage unit, 340 highway data storage unit, 350 parameter data storage unit, 360 guidance search data storage unit, 370 management information storage unit, 372 generation management information, 420 parcel-based data set, 440 region-based data set, 510 block, 512 basic parcel, 520 block, 522 basic parcel, 530 block, 532 basic parcel, 540 block, 542 basic parcel, 550 block, 552 basic parcel, 560 block, 562 basic parcel, 572 basic parcel, 600 vector map data, 620 header data, 640 main map data, 642 basic data, 644 extended data, 652 road data, 654 background data, 656 name data, 658 VICS conversion table, 660 path navigation data, 720 parcel level, 730 road link ID, 732 parcel ID, 734 parcel link ID, 740 shape information, 750 attribute information, 840 VICS link ID, 900 raster map data, 940 main map data, 952 city map data, 1020 communication unit, 1030 storage unit, 1040 path search unit, 1042 request receiving unit, 1044 request response unit, 1212 touch display, 1214 speaker, 1222 input/output control unit, 1224 communication control unit, 1232 storage unit, 1234 map data management unit, 1242 location estimation unit, 1244 road guidance unit, 1246 plotting control unit, 1312 management information storage unit, 1314 pre-installed data storage unit, 1316 distribution data storage unit, 1320 map data storage unit, 1322 mth generation data set, 1330 navigation guidance data storage unit, 1340 highway data storage unit, 1350 parameter data storage unit, 1360 guidance search data storage unit, 1420 distribution data, 1422 map data, 1423 navigation guidance data, 1424 highway data, 1440 distribution data, 1442 map data, 1500 screen, 1510 map image, 1520 basic function selection area, 1540 function-dependent area, 1542 manipulation selection area, 1544 gap, 1560 basic function selection button, 1570 manipulation selection button, 1572 demarcation line, 1580 scale change button, 1582 map update button, 1584 map discrimination icon, 1610 set route, 1612 departure point, 1614 destination point, 1622 target area, 1624 target parcel, 1632 target area, 1634 target parcel, 1640 point, 1642 target area, 1644 target parcel, 1650 host vehicle location, 1652 target area, 1654 target parcel, 1664 target parcel, 1712 basic parcel, 1714 basic parcel, 1716 basic parcel, 1722 determination area, 1724 screen display area, 1922 history management unit, 1924 movement history storage unit, 1926 distribution history storage unit, 1932 update event detection unit, 1934 distribution candidate identification unit, 1936 distribution parcel determination unit, 1942 map freshness determination unit, 1944 latest map acquisition unit, 1946 current map acquisition unit, 1948 map deletion unit, 2022 set path identification unit, 2024 past path identification unit, 2030 deviation determination unit, 2042 parcel-around-a designated place identification unit, 2044 parcel-around-a path identification unit, 2046 parcel-around-a vehicle identification unit, 2100 movement history data, 2120 time, 2130 vehicle location, 2132 location coordinates, 2134 road link ID, 2140 communication environment, 2200 distribution history data, 2220 distribution time, 2230 generation information, 2240 parcel level, 2250 parcel ID, 2262 record, 2264 record, 3000 computer, 3001 DVD-ROM, 3010 host controller, 3012 CPU, 3014 RAM, 3016 graphic controller, 3018 display device, 3020 input/output controller, 3022 communication interface, 3024 hard disk drive, 3026 DVD-ROM drive, 3030 ROM, 3040 input/output chip, 3042 keyboard

What is claimed is:

1. An information processing device comprising:
at least one processor;
a first storage unit configured to store a local map data set created or updated at a first time;
a map information acquisition section of the at least one processor, when executed by the at least one processor, configured to acquire at least a part of a distribution map data set from a map data distribution section of the at least one processor via a wireless communication network, the map data distribution section of the at least one processor, when executed by the at least one processor, being configured to associate and store (i) the distribution map data set created or updated at a time which is later than the first time, and (ii) information indicating a creation time or an update time of the distribution map data set;
a second storage unit configured to associate and store (i) data that is acquired from the map data distribution section of the at least one processor by the map information acquisition section of the at least one processor, from among data constituting a first distribution map data set created or updated at a second time which is later than the first time, and (ii) information indicating a first acquisition time when the data is acquired or information indicating the second time; and
a second determination section of the at least one processor, when executed by the at least one processor, configured to determine whether the map data distribution section of the at least one processor has stored a second distribution map data set created or updated at a third time which is later than the first acquisition time and the second time, wherein
(A) when it is determined that the map data distribution section of the at least one processor has stored the second distribution map data set,
(a) the map information acquisition section of the at least one processor acquires, from among data constituting the second distribution map data set stored in the map data distribution section of the at least one processor, data corresponding to the data of the first distribution map data set acquired by the map information acquisition section of the at least one processor during a specific period in the past, and
(b) the second storage unit deletes, from among the data constituting the second distribution map data set, the data of the first distribution map data set stored in the second storage unit at least after acquisition processing of data that satisfies a predetermined acquisition condition is completed.

2. The information processing device according to claim 1, further comprising:
a location information acquisition section of the at least one processor, when executed by the at least one processor, configured to acquire location information indicating a location of a user; and a deviation determination section of the at least one processor, when executed by the at least one processor, configured to determine whether a location relationship between the location of the user indicated by the location information, and a location on a movement path of the user during the specific period in the past satisfies a first location condition, wherein when it is determined that the location relationship satisfies the first location condition, the map information acquisition section of the at least one processor acquires, from among the data constituting the second distribution map data set stored in the map data distribution section of the at least one processor, (i) the data corresponding to the data of the first distribution map data set acquired by the map information acquisition section of the at least one processor during the specific period in the past, and (ii) data corresponding to a geographic range where a location relationship with the location of the user indicated by the location information satisfies a second location condition, the first location condition is at least one of (i) a condition that a distance between the location of the user indicated by the location information, and the location on the movement path of the user during the specific period in the past is greater than a predetermined value, and (ii) a condition that a probability that the user moves from the location of the user indicated by the location information onto the movement path of the user during the specific period in the past is smaller than a predetermined value, and the second location condition is a condition that the geographic range has a predetermined shape and size with respect to the location of the user indicated by the location information.

3. The information processing device according to claim 2, further comprising:

a first determination section of the at least one processor, when executed by the at least one processor, configured to determine whether the map data distribution section of the at least one processor has stored the first distribution map data set, wherein when it is determined that the map data distribution section of the at least one processor has stored the first distribution map data set and that the location relationship satisfies the first location condition, the map information acquisition section of the at least one processor acquires, (a) from among the data constituting the second distribution map data set stored in the map data distribution section of the at least one processor, (i) the data corresponding to the data of the first distribution map data set acquired by the map information acquisition section of the at least one processor during the specific period in the past, and (ii) the data corresponding to the geographic range where the location relationship with the location of the user indicated by the location information satisfies the second location condition, and (b) from among the data constituting the first distribution map data set stored in the map data distribution section of the at least one processor, the data corresponding to the geographic range where the location relationship with the location of the user indicated by the location information satisfies the second location condition.

4. The information processing device according to claim 3, wherein the acquisition condition is a condition that the data corresponds to an area which is inside a first geographic range having a predetermined shape and size with respect to the location of the user indicated by the location information, and for which the data of the first distribution map data set has been acquired by the map information acquisition section of the at least one processor during the specific period in the past.

5. The information processing device according to claim 3, further comprising:

a communication information acquisition section of the at least one processor, when executed by the at least one processor, configured to acquire communication information indicating a communication state of the wireless communication network of when the map information acquisition section of the at least one processor acquires the first distribution map data set, wherein the second storage unit associates and stores (i) the data that is acquired, from among the data constituting the first distribution map data set, by the map information acquisition section of the at least one processor, (ii) the information indicating the first acquisition time when the data is acquired, and (iii) the communication information acquired by the communication information acquisition section of the at least one processor unit at the first acquisition time, and when it is determined that the location relationship satisfies the first location condition, the map information acquisition section of the at least one processor does not acquire, (a) from among the data constituting the second distribution map data set, data corresponding to data of the first distribution map data set acquired by the map information acquisition section of the at least one processor during the specific period in the past in a region where the communication state indicated by the communication information satisfies a predetermined communication condition.

6. The information processing device according to claim 3, wherein the first distribution map data set includes a plurality of pieces of first distribution map data, each of the plurality of pieces of first distribution map data includes first map data indicating a map of a geographic range allocated to each piece of the first distribution map data, and first drive support information which is information on a road included in the geographic range allocated to each piece of the first distribution map data, and which is used for an autonomous driving system or a drive support system of a moving object to control the moving object, the second distribution map data set includes a plurality of pieces of second distribution map data, and each of the plurality of pieces of second distribution map data includes second map data indicating a map of a geographic range allocated to each piece of the second distribution map data, and second drive support information which is information on a road included in the geographic range allocated to each piece of the second distribution map data, and which is used for the autonomous driving system or the drive support system of the moving object to control the moving object.

7. The information processing device according to claim 3,
wherein the second storage unit
(i) associates and stores the data that is acquired by the map information acquisition section of the at least one processor and that constitutes the second distribution map data set, and information indicating a second acquisition time when the data is acquired or information indicating the third time, and
(ii) deletes, from among the data constituting the second distribution map data set, the data of the first distribution map data set stored in the second storage unit at least after the acquisition processing of the data that satisfies the predetermined acquisition condition is completed.

8. The information processing device according to claim 2,
wherein the acquisition condition is a condition that the data corresponds to an area which is inside a first geographic range having a predetermined shape and size with respect to the location of the user indicated by the location information, and for which the data of the first distribution map data set has been acquired by the map information acquisition section of the at least one processor during the specific period in the past.

9. The information processing device according to claim 8, further comprising:
a communication information acquisition section of the at least one processor, when executed by the at least one processor, configured to acquire communication information indicating a communication state of the wireless communication network of when the map information acquisition section of the at least one processor acquires the first distribution map data set, wherein
the second storage unit associates and stores (i) the data that is acquired, from among the data constituting the first distribution map data set, by the map information acquisition section of the at least one processor, (ii) the information indicating the first acquisition time when the data is acquired, and (iii) the communication information acquired by the communication information acquisition section of the at least one processor at the first acquisition time, and
when it is determined that the location relationship satisfies the first location condition, the map information acquisition section of the at least one processor does not acquire, (a) from among the data constituting the second distribution map data set, data corresponding to data of the first distribution map data set acquired by the map information acquisition section of the at least one processor during the specific period in the past in a region where the communication state indicated by the communication information satisfies a predetermined communication condition.

10. The information processing device according to claim 8, wherein
the first distribution map data set includes a plurality of pieces of first distribution map data,
each of the plurality of pieces of first distribution map data includes
first map data indicating a map of a geographic range allocated to each piece of the first distribution map data, and
first drive support information which is information on a road included in the geographic range allocated to each piece of the first distribution map data, and which is used for an autonomous driving system or a drive support system of a moving object to control the moving object,
the second distribution map data set includes a plurality of pieces of second distribution map data, and
each of the plurality of pieces of second distribution map data includes
second map data indicating a map of a geographic range allocated to each piece of the second distribution map data, and
second drive support information which is information on a road included in the geographic range allocated to each piece of the second distribution map data, and which is used for the autonomous driving system or the drive support system of the moving object to control the moving object.

11. The information processing device according to claim 8,
wherein the second storage unit
(i) associates and stores the data that is acquired by the map information acquisition section of the at least one processor and that constitutes the second distribution map data set, and information indicating a second acquisition time when the data is acquired or information indicating the third time, and
(ii) deletes, from among the data constituting the second distribution map data set, the data of the first distribution map data set stored in the second storage unit at least after the acquisition processing of the data that satisfies the predetermined acquisition condition is completed.

12. The information processing device according to claim 2, further comprising:
a communication information acquisition section of the at least one processor, when executed by the at least one processor, configured to acquire communication information indicating a communication state of the wireless communication network of when the map information acquisition section of the at least one processor acquires the first distribution map data set, wherein
the second storage unit associates and stores (i) the data that is acquired, from among the data constituting the first distribution map data set, by the map information acquisition section of the at least one processor, (ii) the information indicating the first acquisition time when the data is acquired, and (iii) the communication information acquired by the communication information acquisition section of the at least one processor at the first acquisition time, and
when it is determined that the location relationship satisfies the first location condition, the map information acquisition section of the at least one processor does not acquire, (a) from among the data constituting the second distribution map data set, data corresponding to data of the first distribution map data set acquired by the map information acquisition section of the at least one processor during the specific period in the past in a region where the communication state indicated by the communication information satisfies a predetermined communication condition.

13. The information processing device according to claim 2, wherein
the first distribution map data set includes a plurality of pieces of first distribution map data,
each of the plurality of pieces of first distribution map data includes first map data indicating a map of a geographic range allocated to each piece of the first distribution map data, and first drive support information which is information on a road included in the geographic range allocated to each piece of the first distribution map data, and which is used for an autonomous driving system or a drive support system of a moving object to control the moving object, the second distribution map data set includes a plurality of pieces of second distribution map data, and each of the plurality of pieces of second distribution map data includes second map data indicating a map of a geographic range allocated to each piece of the second distribution map data, and second drive support information which is information on a road included in the geographic range allocated to each piece of the second distribution map data, and which is used for the autonomous driving system or the drive support system of the moving object to control the moving object.

14. The information processing device according to claim 2, wherein the second storage unit (i) associates and stores the data that is acquired by the map information acquisition section of the at least one processor and that constitutes the second distribution map data set, and information indicating a second acquisition time when the data is acquired or information indicating the third time, and (ii) deletes, from among the data constituting the second distribution map data set, the data of the first distribution map data set stored in the second storage unit at least after the acquisition processing of the data that satisfies the predetermined acquisition condition is completed.

15. The information processing device according to claim 1, wherein the first distribution map data set includes a plurality of pieces of first distribution map data, each of the plurality of pieces of first distribution map data includes first map data indicating a map of a geographic range allocated to each piece of the first distribution map data, and first drive support information which is information on a road included in the geographic range allocated to each piece of the first distribution map data, and which is used for an autonomous driving system or a drive support system of a moving object to control the moving object, the second distribution map data set includes a plurality of pieces of second distribution map data, and each of the plurality of pieces of second distribution map data includes second map data indicating a map of a geographic range allocated to each piece of the second distribution map data, and second drive support information which is information on a road included in the geographic range allocated to each piece of the second distribution map data, and which is used for the autonomous driving system or the drive support system of the moving object to control the moving object.

16. The information processing device according to claim 15, wherein each of the first drive support information and the second drive support information includes information on at least one of a type of the road, a structure of the road, laws and regulations applied to the road, and statistics on a speed of the moving object moving on the road.

17. The information processing device according to claim 1, wherein the second storage unit (i) associates and stores the data that is acquired by the map information acquisition section of the at least one processor and that constitutes the second distribution map data set, and information indicating a second acquisition time when the data is acquired or information indicating the third time, and (ii) deletes, from among the data constituting the second distribution map data set, the data of the first distribution map data set stored in the second storage unit at least after the acquisition processing of the data that satisfies the predetermined acquisition condition is completed.

18. A path guidance device comprising:

the information processing device according to claim 1; and a display device configured to display a map screen based on any one of data constituting the local map data set stored in the first storage unit and the data constituting the distribution map data set acquired by the map information acquisition section of the at least one processor.

19. A non-transitory computer-readable storage medium that stores a program to cause a computer to execute operations comprising:

at least one processor;

acquiring at least a part of a distribution map data set from a map data distribution section of the at least one processor via a wireless communication network, the map data distribution section of the at least one processor being configured to associate and store (i) the distribution map data set created or updated at a second time which is later than a first time when a local map data set is created or updated to be stored in a first storage device, and (ii) information indicating a creation time or an update time of the distribution map data set;

secondly associating and storing (i) the distribution map data set, from among data constituting a first distribution map data set created or updated at the second time which is later than the first time, and (ii) information indicating a first acquisition time when the distribution map data set is acquired or information indicating the second time; and secondly determining whether the map data distribution section of the at least one processor has stored a second distribution map data set created or updated at a third time which is later than the first acquisition time and the second time, wherein (a) the acquiring the at least the part of the distribution map data set includes, when it is determined that the map data distribution section of the at least one processor has stored the second distribution map data set, acquiring, from the second distribution map data set stored in the map data distribution section of the at least one processor, data corresponding to the data of the first distribution map data set, and (b) the secondly associating and storing includes, when it is determined that the map data distribution section of the at least one processor has stored the second distribution map data set,
(i) associating and storing the second distribution map data set, and information indicating a second acquisition time when the second distribution map data set is acquired or information indicating the third time, and
(ii) deleting, from the second distribution map data set, the first distribution map data set at least after acquisition processing of data that satisfies a predetermined acquisition condition is completed.

20. An information processing method comprising:
at least one processor;
acquiring at least a part of a distribution map data set from a map data distribution section of the at least one processor via a wireless communication network, the map data distribution section of the at least one processor being configured to associate and store (i) the distribution map data set created or updated at a second time which is later than a first time when a local map data set is created or updated to be stored in a first storage device, and (ii) information indicating a creation time or an update time of the distribution map data set;
secondly associating and storing (i) the distribution map data set, from among data constituting a first distribution map data set created or updated at the second time which is later than the first time, and (ii) information indicating a first acquisition time when the distribution map data set is acquired or information indicating the second time; and
secondly determining whether the map data distribution section of the at least one processor has stored a second distribution map data set created or updated at a third time which is later than the first acquisition time and the second time, wherein (a) the acquiring the at least the part of the distribution map data set includes,
(A) when it is determined that the map data distribution section of the at least one processor has stored the second distribution map data set,
acquiring, from the second distribution map data set stored in the map data distribution section of the at least one processor, data corresponding to the data of the first distribution map data set, and
(b) the secondly associating and storing includes,
(A) when it is determined that the map data distribution section of the at least one processor has stored the second distribution map data set,
(i) associating and storing the second distribution map data set, and information indicating a second acquisition time when the second distribution map data set is acquired or information indicating the third time, and
(ii) deleting, from the second distribution map data set, the first distribution map data set at least after acquisition processing of data that satisfies a predetermined acquisition condition is completed.

* * * * *